United States Patent
Shimizu et al.

(10) Patent No.: US 6,740,297 B2
(45) Date of Patent: May 25, 2004

(54) COMBUSTION EXHAUST GAS TREATMENT SYSTEM

(75) Inventors: Taku Shimizu, Tokyo (JP); Kazuaki Kimura, Tokyo (JP); Kiyoshi Okazoe, Tokyo (JP); Atsushi Tatani, Tokyo (JP); Naohiko Ukawa, Hiroshima (JP); Masao Hino, Hiroshima (JP); Susumu Okino, Hiroshima (JP); Takashi Haruki, Hiroshima (JP); Toru Takashina, Hiroshima (JP); Eiji Ochi, Tokyo (JP)

(73) Assignee: Mitsubishi Jukogyo Kabushiki Kaisha

( * ) Notice: Subject to any disclaimer, the term of this patent is extended or adjusted under 35 U.S.C. 154(b) by 0 days.

(21) Appl. No.: 10/294,204

(22) Filed: Nov. 14, 2002

(65) Prior Publication Data

US 2003/0072692 A1 Apr. 17, 2003

Related U.S. Application Data

(62) Division of application No. 09/407,042, filed on Sep. 27, 1999, now Pat. No. 6,511,636, which is a division of application No. 09/059,675, filed on Apr. 13, 1998, now abandoned, which is a division of application No. 08/592,116, filed on Jan. 26, 1996, now Pat. No. 6,113,863.

(30) Foreign Application Priority Data

| Mar. 30, 1995 | (JP) | ................................. | 7/72778 |
| Mar. 30, 1995 | (JP) | ................................. | 7/72779 |
| Apr. 7, 1995 | (JP) | ................................. | 7/82460 |
| May 30, 1995 | (JP) | ................................. | 7/131991 |
| Aug. 29, 1995 | (JP) | ................................. | 7/219970 |

(51) Int. Cl.$^7$ .............................. B01J 8/08; B01J 8/50; B01D 53/14

(52) U.S. Cl. ...................... 422/177; 422/139; 422/168; 422/211

(58) Field of Search ................................ 422/139, 140, 422/145, 147, 168, 169, 172, 177, 211, 217; 423/510, 210, 215.5, 508

(56) References Cited

U.S. PATENT DOCUMENTS 3,933,635 A    1/1976   Marchant ..................... 210/50

(List continued on next page.)

FOREIGN PATENT DOCUMENTS

| EP | 0 304 412 A3 | 2/1989 |
| EP | 0 285 023 A1 | 10/1998 |
| FR | 2 547 210 | 3/1984 |
| GB | 1 382 232 | 1/1975 |
| GB | 1 534 225 | 8/1976 |
| WO | WO 89/08493 | 9/1989 |

OTHER PUBLICATIONS

Patent Abstracts of Japan, Publication No. 60–143891, Jul. 30, 1985.

(List continued on next page.)

*Primary Examiner*—Jerry D. Johnson
*Assistant Examiner*—Alexa Doroshenk
(74) *Attorney, Agent, or Firm*—Trop, Pruner & Hu, P.C.

(57) ABSTRACT

Five combustion exhaust gas treatment systems capable of removing dust and selenium (Se) in combustion exhaust gas and making harmless are proposed: (1) combustion exhaust gas is cooled to 350° C. or less, dust is separated, Se is transformed into insoluble compound, and Se is separated; (2) combustion exhaust gas is cooled to 350° C. or less, dust is separated, Se elution preventive agent is added, and dust is formed into scale; (3) dust in combustion exhaust gas is collected by dust collector, dust is formed into slurry by making use of part of circulation liquid in desulfurization apparatus, and tetravalent Se in dust slurry is transformed into insoluble compound, which is separated into solid and liquid; (4) dust is separated from combustion exhaust gas by dust collector, and it is heated to gasify Se, and is led into desulfurization apparatus, etc., and formed into slurry, and Se is made into insoluble compound; and (5) a treating agent for making tetravalent Se insoluble is added to part of circulation liquid in desulfurization apparatus, and it is sprayed into combustion exhaust gas to make Se insoluble.

3 Claims, 25 Drawing Sheets

U.S. PATENT DOCUMENTS

| | | | |
|---|---|---|---|
| 3,966,889 A | 6/1976 | Kakuta et al. | 423/510 |
| 4,617,180 A | 10/1986 | Vogg | 423/240 |
| 4,620,492 A | 11/1986 | Vogg et al. | 110/345 |
| 4,696,804 A | 9/1987 | Shinoda et al. | 423/242 |
| 4,873,065 A | 10/1989 | Braun et al. | 423/210 |
| 4,917,732 A | 4/1990 | Baker | 106/85 |
| 4,994,246 A | 2/1991 | Moser et al. | 423/242 |
| 5,192,514 A | 3/1993 | Dismukes | 423/210 |
| 5,266,210 A | 11/1993 | McLaughlin | 210/710 |
| 5,512,072 A | 4/1996 | Laslo | 55/250 |
| 5,686,053 A | 11/1997 | Kikkawa et al. | 423/243.01 |
| 5,756,052 A | 5/1998 | Suzumura et al. | 422/171 |
| 5,965,095 A | 10/1999 | Owens et al. | 423/210 |

OTHER PUBLICATIONS

Patent Abstracts of Japan, Publication No. 06–086966, Mar. 29, 1994.

Patent Abstracts of Japan, Publication No. 63–072340, Apr. 2, 1998.

Patent Abstracts of Japan, Publication No. 04–061907 A, Feb. 27, 1992.

Patent Abstracts of Japan, Publication No. 06–277646, Oct. 4, 1994.

Patent Abstracts of Japan, Publication No. 06–154723, Jun. 3, 1994.

Patent Abstracts of Japan, Publication No. 06–079254, Mar. 22, 1994.

Patent Abstracts of Japan, Publication No. 02–139016, May 29, 1990.

Patent Abstracts of Japan, Publication No. 63–072340, Apr. 2, 1988.

Japanese Patent Provisional Publication 48–66016/1973.

Patent Abstracts of Japan 01–94920/1989.

Patent Abstracts of Japan 63–28491/1988.

Patent Abstacts of Japan 62–244426/1987.

Patent Abstracts of Japan 63–42791/1988.

Kuivala et al., "Entfernung von Quecksilber und Selen aus Röostgasen", Evzmetall., vol. 30, No. 12, Dec. 1977, pp. 555–558, XP002008799.

COMBUSTION EXHAUST GAS TREATMENT SYSTEM

This is a divisional of prior U.S. patent application Ser. No. 09/407,042, filed Sep. 27, 1999, which issued on Jan. 28, 2003 as U.S. Pat. No. 6,511,636, which is a divisional of prior U.S. patent application Ser. No. 09/059,675, filed Apr. 13, 1998, now abandoned, which is a divisional of prior U.S. patent application Ser. No. 08/592,116, filed Jan. 26, 1996, which issued on Sep. 5, 2000 as U.S. Pat. No. 6,113,863.

FIELD OF THE INVENTION AND RELATED ARTS

The present invention relates to a combustion exhaust gas treatment system, more particularly to a combustion exhaust gas treatment system capable of easily removing dust and selenium (Se) in combustion exhaust gas containing dust and Se components, and making harmless.

Hitherto, as the combustion exhaust gas treatment system installed in a thermal power plant or the like, a combustion exhaust gas treatment system comprising a dust collector (usually an electrostatic precipitator) for removing fly ash and other dust from the combustion exhaust gas, and a combustion exhaust gas desulfurization apparatus for absorbing sulfurous acid in the combustion exhaust gas is generally employed.

Moreover, conventionally, as the combustion exhaust gas treatment system installed in a thermal power plant or the like, a combustion exhaust gas treatment system comprising a dry dust collector (usually an electrostatic precipitator) for removing fly ash and other dust from the combustion exhaust gas, and a wet combustion exhaust gas desulfurization apparatus for absorbing sulfurous gas in the combustion exhaust gas by contacting with an absorbent slurry (for example, slurry containing calcium compound) in the absorption column, and separating and recovering gypsum as byproduct from the slurry in the absorption column is generally employed.

Recently, handling of harmful impurities contained in the combustion exhaust gas aside from sulfur oxides is posing a problem. In particular, in the combustion exhaust gas treatment system for coal fired boiler, the harmfulness of selenium (Se) contained at a maximum level of about 10 mg/kg in coal is a problem lately, and its harmless treatment is demanded.

Meanwhile, Se exists as tetravalent Se (main form: selenious acid $SeO_3^{2-}$) which is easy to treat by making insoluble by treating agent, and hexavalent Se (main form: selenic acid $SeO_4^{2-}$) which is hard to treat by making insoluble, and in particular the hexavalent Se is high in solubility (solubility at 20° C. is 95%) and is easy to elute. Besides, this Se has a toxicity similar to that of arsenic compound, and disaster cases and emission regulations are known overseas, and it is newly added to the list of regulated items also in Japan, and is controlled by the environmental standard (0.01 mg/liter), discharge standard (0.1 mg/liter), and elution standard in landfill (0.3 mg/liter).

FIG. 24 shows an example of prior art of combustion exhaust gas treatment system of this type (an example of combustion exhaust gas treatment system for coal fired boiler). In FIG. 24 and FIG. 25, the combustion exhaust gas A emitted from a coal fired boiler 1 is sent into a denitration apparatus 2 installed downstream of the boiler 1 to be rid of nitrogen oxides (NOx), and passes through an air heater 3 and a heat recovery unit 4 of gas-gas heater (GGH), and is introduced into an electrostatic precipitator (EP) 5, in which fly ash and dust are removed. In succession, the combustion exhaust gas is guided into a wet combustion exhaust gas desulfurization apparatus 7 by a fan 6, and sulfurous gas is removed in this desulfurization apparatus 7, and after passing through a reheater 8 of the gas-gas heater (GGH), it is led into a stack 10 by a fan 9, and is released into the atmosphere through the stack 10 (FIG. 25).

On the other hand, fly ash and dust removed in the electrostatic precipitator 5 are discharged from plural hoppers 5a (dust recovery units) formed in the electrostatic precipitator 5, and are conveyed and collected in batch by a conveyor 11. Thus collected dust B is either recycled as cement material or the like, or discarded in an ash disposal yard (FIG. 24).

Herein, the desulfurization apparatus 7 comprises an absorption column, for example, in which combustion exhaust gas is introduced, and by contact of combustion exhaust gas with absorbent slurry (usually slurry containing calcium compound) in this absorption column, the sulfurous acid in the combustion exhaust gas is absorbed in wet process, and usually from the slurry in the absorption column, gypsum is separated and collected as byproduct.

Incidentally, the heat recovery unit 4 of the gas-gas heater (GGH) may be also disposed immediately before the desulfurization apparatus 7 as shown in FIG. 26.

In these combustion exhaust gas treatment systems, most of Se in coal (Se in combustion exhaust gas) is condensed at the downstream side of the air heater 3 (that is, the position before introduction into the electrostatic precipitator 5), and is removed by the electrostatic precipitator 5 in a state being contained in the dust in combustion exhaust gas, and is directly mixed in the refuse in the ash disposal yard or in the cement material. To render Se harmless by conforming to the elution standard, it requires a complicated and costly aftertreatment of, for example, diluting the ash removed by the electrostatic precipitator 5 in a huge volume of water.

OBJECTS AND SUMMARY OF THE INVENTIONS

In the light of the prior arts, it is an object of the invention to present a combustion exhaust gas treatment system capable of easily removing and making harmless the Se components contained in combustion exhaust gas.

To achieve the object, five inventions are proposed.

A. First Invention (1) A combustion exhaust gas treatment system for treating combustion exhaust gas containing dust and Se components, comprising means for cooling combustion exhaust gas to 350° C. or less, dust collecting means for separating dust in the combustion exhaust gas, and Se treating means for transforming the existent form of Se in the dust into an insoluble compound by adding water and treating agent to the dust separated by the dust collecting means.

(2) A combustion exhaust gas treatment system for treating combustion exhaust gas containing dust and Se components, comprising means for cooling combustion exhaust gas to 350° C. or less, dust collecting means for separating dust in the combustion exhaust gas, Se treating means for transforming the existent form of Se in the dust into an insoluble compound by adding water and treating agent to the dust separated by the dust collecting means, and solid-liquid separating means for separating the slurry containing insoluble Se compound discharged from the Se treating means into solid and liquid.

Preferred embodiments of the first invention includes the following combustion exhaust gas treatment systems (3) to (6).

(3) A combustion exhaust gas treatment system of (1) or (2), wherein the dust collecting means is a dust collecting apparatus constituted by forming a plurality of recovery units for separating and collecting dust from the inlet side to the outlet side of the combustion exhaust gas, separating and collecting the dust collected from the recovery unit at the inlet side of the combustion exhaust gas and the dust collected at the outlet side separately, and introducing only the dust collected at the outlet side into the Se treating means.

(4) A combustion exhaust gas treatment system of (1) or (2), further comprising sorting means for sorting the dust separated by the dust collecting means into large particle size group and small particle size group, wherein only the small particle size dust sorted by the sorting means is introduced into the Se treating means to make Se insoluble.

(5) A combustion exhaust gas treatment system of (3) or (4), further comprising means for mixing the dust making Se insoluble by the Se treating means, and the remaining dust not making Se insoluble, so that the moisture content may be 20% or less.

(6) A combustion exhaust gas treatment system of (5), further comprising means for forming the dust mixed by the mixing means into scale.

In the combustion exhaust gas treatment system of the first invention, the method of making Se insoluble may be realized in various forms, and representative forms include a method of forming slurry by adding water to the dust containing Se components separated and recovered by the dust collecting means, adding treating agent to the slurry to make Se insoluble, and separating into solid and liquid, and a method of spraying a solution of treating agent to the dust to immerse uniformly, and making Se insoluble.

In the combustion exhaust gas treatment system of the first invention, most of the Se in the combustion exhaust gas is condensed as being cooled by the cooling means, and is removed by the dust collecting means in a state being contained in the dust. In consequence, the treating agent is added by the Se treating means to the dust separated by the dust collecting means, and the existent form of the Se in dust is transformed into an insoluble compound. Accordingly, if the dust is discarded same as in the prior art, the Se elution standard is satisfied, and the Se is made harmless easily without requiring complicated aftertreatment.

By making Se insoluble only in the dust separated and collected from the specific recovery unit at the outlet side of the combustion exhaust gas in the dust collecting means, the required amount of treating agent and capacity of Se treating means can be reduced, and the Se is made harmless easily and at low cost.

That is, according to the study by the present inventors, it is known that more Se is contained (deposited) in the smaller particle size dust (ash) separated and collected from the specific recovery unit at the outlet side, and the Se is made harmless on the whole only by applying insoluble treatment on the dust of smaller particle size.

Moreover, by the same reason, by making Se insoluble only in the dust of smaller particle size sorted by the sorting means, the required amount of treating agent and capacity of Se treating means can be reduced, and the Se is made harmless more easily and economically.

Incidentally, in the case of the apparatus for making Se insoluble only in part of the dust, by further comprising the mixing means, the dust making Se insoluble, and the remaining dust without Se insoluble treatment are mixed so that the moisture content may be 20% or less, and therefore the moisture content in the dust can be easily lowered and handling is made easier in the disposal process of dust, without installing any huge equipment such as solid-liquid separator that requires wastewater (filtrate) treatment.

Moreover, by further comprising means for making the dust mixed by the mixing means into scale form, handling in dust disposal process is much easier.

The combustion exhaust gas treatment system of the first invention is intended to separate Se components contained in the combustion exhaust gas from the combustion exhaust gas together with dust, and making harmless by further making it insoluble. The dust being rid of dust including Se components is further led into the wet combustion exhaust gas desulfurization apparatus, and $SO_2$ is removed, and is made completely harmless by proper treatment by ordinary method, and is released into the atmosphere.

B. Second Invention

According to the system by the first invention, although the Se in the flue can be easily made harmless, but in order to form slurry by adding water to the separated and collected dust, and to make Se insoluble by adding and mixing insoluble treating agent to separated into solid and liquid, it requires wastewater treatment apparatus, solid-liquid separating apparatus, and other devices.

A second invention presents a combustion exhaust gas treatment system capable of easily making harmless the Se contained in the combustion exhaust gas.

(1) A combustion exhaust gas treatment system for removing harmful matter in combustion exhaust gas, comprising means for cooling combustion exhaust gas to 350° C. or less, dust collecting means for separating dust in the combustion exhaust gas, and mixing means for adding and mixing Se elution preventive agent and humidifying liquid or solution of Se elution preventive agent to the dust separated by the dust collecting means.

(2) A combustion exhaust gas treatment system for removing harmful matter in combustion exhaust gas, comprising means for cooling combustion exhaust gas to 350° C. or less, dust collecting means for separating dust in the combustion exhaust gas, mixing means for adding and mixing Se elution preventive agent and humidifying liquid or solution of Se elution preventive agent to the dust separated by the dust collecting means, and means for forming the dust mixed with the Se elution preventive agent and humidifying agent or solution of Se elution preventive agent by the mixing means into scale form.

Preferred embodiments of the second invention involve the combustion exhaust gas treatment systems (3) and (4).

(3) A combustion exhaust gas treatment system of (1) or (2), wherein the dust collecting means is a dust collecting apparatus constituted by forming a plurality of recovery units for separating and collecting dust from the inlet side to the outlet side of the combustion exhaust gas, separating and collecting the dust collected from the recovery unit at the inlet side of the combustion exhaust gas and the dust collected at the outlet side separately, and introducing only the dust collected at the outlet side into the mixing means.

(4) A combustion exhaust gas treatment system of (1) or (2), further comprising sorting means for sorting the dust separated by the dust collecting means into large particle size group and small particle size group, wherein only the small particle size dust sorted by the sorting means is introduced into the mixing means.

In the combustion exhaust gas treatment system of the first invention, most of the Se in the combustion exhaust gas is condensed as being cooled by the cooling means, and is removed by the dust collecting means in a state being contained in the dust. In consequence, the Se elution preventive agent and humidifying liquid or solution of Se elution preventive agent are added by the mixing means to the dust separated by the dust collecting means, and the existent form of the Se in dust is transformed into an insoluble compound. Accordingly, if the dust is discarded same as in the prior art, the Se elution standard is satisfied, and the Se is made harmless easily without requiring complicated aftertreatment. Still more, because of the constitution of adding humidifying liquid, Se elution preventive agent or solution of Se elution preventive agent, and mixing the dust and Se elution preventive agent, or further forming the mixture into scale, as compared with the constitution of forming the dust into slurry and mixing Se insoluble treating agent and the separating into solid and liquid and discarding, it does not require large equipment or apparatus for wastewater (filtrate) treating facility or solid-liquid separator, and handling in disposal of dust is much easier.

By making insoluble only in the dust separated and collected from the specific recovery unit at the outlet side of the combustion exhaust gas in the dust collecting means by introducing into the mixing means, the required amount of Se elution preventive agent and capacity of mixing means and scale forming means can be reduced, and the Se is made harmless easily and at low cost.

That is, according to the study by the present inventors, it is known that more Se is contained (deposited) in the smaller particle size dust (ash) separated and collected from the specific recovery unit at the outlet side, and the Se is made harmless on the whole only by applying insoluble treatment on the dust of smaller particle size.

Moreover, by the same reason, by making Se insoluble only in the dust of smaller particle size sorted by the sorting means, the required amount of treating agent and capacity of Se treating means can be reduced, and the Se is made harmless more easily and economically.

C. Third Invention (1) A combustion exhaust gas treatment system for treating combustion exhaust gas containing sulfurous acid, dust and Se components, comprising a dry dust collector for removing dust in the combustion exhaust gas, a desulfurization apparatus having a desulfurization column for circulating an absorbent slurry for absorbing and removing sulfurous acid, repulping means for dissolving the dust removed by the dry dust collector in water to form into slurry, treating agent feeding means for feeding a treating agent for making tetravalent Se insoluble into the dust slurry obtained in the repulping means, means for separating the dust slurry containing Se made insoluble into solid and liquid, and a piping system for introducing the separation liquid discharged from the separating means into the absorbent slurry.

(2) A combustion exhaust gas treatment system of (1), wherein part of the circulating liquid forming the slurry of the desulfurization system is introduced into the repulping means, and is used as the solvent in the repulping means.

(3) A combustion exhaust gas treatment system of (1) or (2), further comprising means for feeding filter additive to the dust slurry.

(4) A combustion exhaust gas treatment system for treating combustion exhaust gas containing sulfurous acid, dust and Se components, comprising a dry dust collector for removing dust in the combustion exhaust gas, a desulfurization apparatus having a desulfurization column for circulating an absorbent slurry for absorbing and removing sulfurous acid, means for introducing the dust removed by the dry dust collector into the absorbent slurry, and treating agent feeding means for feeding a treating agent for making tetravalent Se insoluble into the absorbent slurry.

(5) A combustion exhaust gas treatment system for treating combustion exhaust gas containing sulfurous acid, dust and Se components, comprising a desulfurization apparatus having a desulfurization column for circulating an absorbent slurry for absorbing and removing sulfurous acid in the combustion exhaust gas, and treating agent feeding means for feeding a treating agent for making tetravalent Se insoluble into the absorbent slurry, wherein the combustion exhaust gas is introduced directly into the desulfurization column.

(6) A combustion exhaust gas treatment system of any one of (1) to (5), further comprising oxidation-reduction reaction control means for controlling the oxidation-reduction reaction in the desulfurization apparatus, so that the hexavalent Se mixed in the slurry in the desulfurization apparatus may be reduced by the sulfurous acid in the slurry to be tetravalent.

(7) A combustion exhaust gas treatment system for treating combustion exhaust gas containing sulfurous acid, dust and Se components, comprising a dry dust collector for removing dust in the combustion exhaust gas, a desulfurization apparatus having a cooling and dust collecting column disposed upstream of an absorption column, and possessing a desulfurization column for circulating an absorbent slurry for absorbing and removing sulfurous acid, means for feeding the dust removed by the dry dust collector into the circulating slurry in the cooling and dust collecting column, and means for feeding a treating agent for making tetravalent Se insoluble into the circulating slurry in the cooling and dust collecting column.

(8) A combustion exhaust gas treatment system for treating combustion exhaust gas containing sulfurous acid, dust and Se components, comprising a desulfurization apparatus having a cooling and dust collecting column disposed upstream of an absorption column, and possessing a desulfurization column for circulating an absorbent slurry for absorbing and removing sulfurous acid, and means for feeding a treating agent for making tetravalent Se insoluble into the circulating slurry in the cooling and dust collecting column, wherein the combustion exhaust gas is introduced directly into the cooling and dust collecting column.

(9) A combustion exhaust gas treatment system of any one of (1) to (8), further comprising a wastewater treatment apparatus for treating wastewater from the desulfurization apparatus, and treating agent feeding means for feeding a treating agent for making tetravalent Se insoluble to the impurity slurry separated by this wastewater treatment apparatus.

Any combustion exhaust gas treatment system of the second invention comprises means for feeding a treating agent for making insoluble the tetravalent Se dissolved in the slurry. The treating agent for making tetravalent Se insoluble includes, for example, $FeCl_3$, $Fe_2(SO_4)_3$, chelating agent (e.g. Epolus MX-7 of Miyoshi Resin), and high molecular heavy metal capturing agent (e.g. Epofloc L-1 of Miyoshi Resin). The reaction of these treating agent for making insoluble tetravalent Se is described later.

In the combustion exhaust gas treatment system of (1), most of Se in the combustion exhaust gas is removed by the dry dust collector in a state being included in the dust, and the dust contacts with water or liquid (solvent) in the repulping means, and is dissolved into the liquid in the process of forming into slurry. As the slurry forming liquid (solvent), aside from the water supplied from outside the system, the treated water or slurry coming from each process in the system may be used. Of the Se components dissolved in the dust slurry, at least tetravalent Se is made insoluble by treating agent, and is discharged to the solid phase side by the separating means (into the dust cake). On the other hand, the filtrate separated by the separating means is introduced into the slurry in the desulfurization apparatus. Accordingly, hexavalent Se is also included in the combustion exhaust gas, and if it is not made insoluble by the treating agent and is dissolved in the filtrate, most of the hexavalent Se is introduced into the slurry in the desulfurization apparatus, and reacts with the sulfurous acid absorbed from the combustion exhaust gas into the slurry, and is reduced to return to tetravalent Se.

Therefore, if hexavalent Se is contained in the combustion exhaust gas, in the stationary state, Se components dissolved in the slurry in the desulfurization apparatus or the circulation liquid composing this slurry are mainly tetravalent Se components, and in the wastewater treatment apparatus for treating discharge of circulating liquid of the desulfurization apparatus, only by making this tetravalent Se insoluble, the Se elution standard may be easily satisfied, and the desulfurization apparatus can be used as reduction reaction apparatus for hexavalent Se, so that the constitution of the entire system may be simplified.

In the combustion exhaust gas treatment system of (2), since part of the circulating liquid for composing the slurry of the desulfurization apparatus in the combustion exhaust gas treatment system of (1) is used as solvent in the repulping means, as compared with the constitution of feeding water separately, the quantity (circulation) and consumption of water can be reduced.

In the combustion exhaust gas treatment system of (3), since filter additive is charged into the mixing means or separating means, the dehydrating performance in the separating means is enhanced, and a solid matter (dust cake) low in moisture content and easy to handle is obtained. As the filter additive, gypsum used in the desulfurization process or the like may be used.

In the combustion exhaust gas treatment system of (4), most of Se in combustion exhaust gas is removed by the dry dust collector in a state being contained in the dust, and is directly led into the slurry in the desulfurization apparatus, repulped in the desulfurization apparatus, and mixed with a treating agent for making insoluble. Accordingly, at least tetravalent Se components of the Se components contained in the combustion exhaust gas are mostly made insoluble directly by the treating agent in the desulfurization apparatus, and mixed in the solid matter (gypsum, etc.) separated and formed from the slurry in the desulfurization apparatus and discharged, and the remaining Se components are also easily made insoluble and solidified by the insoluble treating agent in the wastewater treatment apparatus for treating discharge of circulating liquid in the desulfurization apparatus. Besides, if hexavalent Se components are contained in the combustion exhaust gas, most of hexavalent Se reacts with the sulfurous acid absorbed from the combustion exhaust gas in the slurry in the desulfurization apparatus to be reduced to change to tetravalent Se, which is also made insoluble by the treating agent in the desulfurization apparatus and is mixed into the solid matter (gypsum, etc.) separated and formed from the slurry in the desulfurization apparatus and discharged, or easily made insoluble and solidified in the wastewater treatment apparatus.

Therefore, in this treatment system, too, the Se elution standard can be easily satisfied, and moreover since the desulfurization apparatus functions both as reducing reaction apparatus of hexavalent Se and as repulping means of dust, the constitution of the entire system may be further simplified.

In the combustion exhaust gas treatment system of (5), most of Se in combustion exhaust gas is directly introduced into the desulfurization apparatus together with the combustion exhaust gas in a state being contained in dust, and is mixed into the absorbent slurry in, for example, the absorption column of the desulfurization apparatus, and is repulped and mixed with the treating agent. Accordingly, at least tetravalent Se components of the Se components contained in the combustion exhaust gas are mostly made insoluble directly by the treating agent in the desulfurization apparatus, and mixed in the solid matter (gypsum, etc.) separated and formed from the slurry in the desulfurization apparatus and discharged, or easily made insoluble and solidified by adding an insoluble treating agent in the wastewater treatment apparatus for treating discharge of circulating liquid in the desulfurization apparatus. Besides, if hexavalent Se components are contained in the combustion exhaust gas, most of hexavalent Se reacts with the sulfurous acid absorbed from the combustion exhaust gas in the slurry in the desulfurization apparatus to be reduced to change to tetravalent Se, which is also made insoluble by the treating agent in the desulfurization apparatus and is mixed into the solid matter (gypsum, etc.) separated and formed from the slurry in the desulfurization apparatus and discharged, or easily made insoluble and solidified in the wastewater treatment apparatus.

Therefore, in this treatment system, too, the Se elution standard can be easily satisfied, and moreover since the desulfurization apparatus functions as the dust collector, reducing reaction apparatus of hexavalent Se, and repulping means of dust, the constitution of the entire system may be further simplified, as compared with the constitution for installing the dust collector, repulping means and others separately.

In the combustion exhaust gas treatment system of (6), the oxidation-reduction reaction control means controls the oxidation-reduction reaction in the desulfurization apparatus so that the hexavalent Se mixing in the slurry in the desulfurization apparatus may be reduced almost completely by sulfurous acid in the slurry to be tetravalent. Accordingly, if hexavalent Se is contained in the combustion exhaust gas, this hexavalent Se can be almost completely changed into tetravalent form in the desulfurization apparatus, so that the Se in the combustion exhaust gas may be made insoluble more easily and completely.

In the combustion exhaust gas treatment system of (7), most of Se in combustion exhaust gas is removed by the dry dust collector in a state being contained in the dust, and is directly introduced into the liquid in the cooling and dust collecting column of the desulfurization apparatus, and is repulped in the cooling and dust collecting column. In the dust slurry formed by feeding the dust containing Se into the liquid in the cooling and dust collecting column and repulsing, a treating agent for making tetravalent Se insoluble is mixed. Accordingly, at least tetravalent Se components of Se components contained in the combustion exhaust gas are directly made insoluble by the treating agent in the desulfurization apparatus, and discharged into the solid-phase side by separating means (into the dust cake), or are easily made insoluble by addition of insoluble treating agent in the subsequent treatment of the separated water, so as to be discharged. Ig hexavalent Se components are contained in the Se components in the combustion exhaust gas, most of hexavalent Se components react with sulfurous acid absorbed from the combustion exhaust gas into the liquid in the cooling and dust collecting column to changed to reduced tetravalent Se components, which are also made insoluble by the treating agent, and discharged into the solid-phase side by separating means (into the dust cake), so as to be treated to be harmless.

Therefore, in this treatment system, too, the Se elution standard may be easily satisfied. Moreover, since the desulfurization apparatus functions also as reducing reaction apparatus of hexavalent Se or as repulping means of dust, the constitution of the entire system may be further simplified. In this treatment system, since dust is not mixed into the slurry in the absorption column of the desulfurization apparatus, the performance of the desulfurization apparatus such as desulfurization rate may be maintained high.

In the combustion exhaust gas treatment system of (8), most of Se in combustion exhaust gas is directly fed in the cooling and dust collecting column of the desulfurization apparatus together with the combustion exhaust gas in a state being contained in the dusts in the combustion exhaust gas, and is repulped in this cooling and dust collecting column. In the dust slurry repulped as the dust containing Se is fed into the liquid in the cooling and dust collecting column, a treating agent for making tetravalent Se insoluble is mixed. Accordingly, at least tetravalent Se components of Se components contained in the combustion exhaust gas are directly made insoluble by the treating agent in the desulfurization apparatus, and discharged to the solid-phase side (in the dust cake) by the separating means for separating the dust slurry into solid and liquid, or is easily made insoluble by the addition of insoluble treating agent in the subsequent treatment of separated water so as to be discarded. If hexavalent Se components are contained in the combustion exhaust gas, most of these hexavalent Se components react with the sulfurous acid absorbed from the combustion exhaust gas in the liquid in the cooling and dust collecting column to transform to reduced tetravalent Se, which is also made insoluble by the treating agent, and is discharged to the solid-phase side (in the dust cake) by the separating means, and is made harmless.

Therefore, in this treatment system, too, the Se elution standard can be easily satisfied, and moreover since the desulfurization apparatus functions as the dust collector, reducing reaction apparatus of hexavalent Se, and repulping means of dust, the constitution of the entire system may be further simplified, as compared with the constitution for installing the dust collector, repulping means and others separately. In addition, in this treatment system, dust is not mixed into the slurry in the absorption column of the desulfurization apparatus, and the performance of the desulfurization apparatus such as desulfurization rate may be maintained high.

In the combustion exhaust gas treatment system of (9), in a prior stage of treatment by solidifying the impurities in the wastewater treating device in the desulfurization apparatus, a treating agent for making tetravalent Se insoluble is added, and the Se eluting in the wastewater can be made insoluble to change into disposable form. In the combustion exhaust gas treatment system of (1) to (8), Se in the combustion exhaust gas can be almost completely made insoluble, but this system is effective in the case where Se is not to be made insoluble, for example, it is necessary to treat Se concentrated in the circulation, being dissolved in the absorption liquid slurry due to reduction of hexavalent Se, mixing of Se into the gypsum to be collected in the desulfurization process must be avoided. In the apparatus of (4) to (8), depending on the conditions of treatment, the insoluble treating agent may be supplied only in the wastewater treating apparatus.

D. Fourth Invention (1) A combustion exhaust gas treatment system for treating combustion exhaust gas containing dust and Se components, comprising a dust collector for removing dust from the combustion exhaust gas, and means for heating the dust removed by the dust collector to a temperature for gasification of Se in the dust.

(2) A combustion exhaust gas treatment system for treating combustion exhaust gas containing sulfurous acid, dust and Se components, comprising a dust collector for removing dust from the combustion exhaust gas, a desulfurization apparatus having an absorption column for circulating an absorbent slurry for absorbing and removing sulfurous acid, and means for heating the dust removed by the dust collector to a temperature for gasification of Se in the dust, wherein the gas generated by heating the dust by the heating means is fed into the desulfurization apparatus together with the combustion exhaust gas, and Se is dissolved and captured in the slurry in the desulfurization apparatus, and a treating agent for making the tetravalent Se insoluble is mixed in the treating process of slurry.

(3) A combustion exhaust gas treatment system of (2), further comprising oxidation-reduction reaction control means for controlling the oxidation-reduction reaction in the desulfurization apparatus, so that the hexavalent Se mixed in the slurry in the desulfurization apparatus may be reduced by sulfurous acid in the slurry to be tetravalent Se.

(4) A combustion exhaust gas treatment system for treating combustion exhaust gas containing sulfurous acid, dust and Se components, comprising a dust collector for removing dust from the combustion exhaust gas, a desulfurization apparatus having an absorption column for circulating an absorbent slurry for absorbing and removing sulfurous acid and a cooling and dust collecting column disposed upstream of the absorption column, and means for heating the dust removed by the dust collector to a temperature for gasification of Se in the dust, wherein the gas generated by heating the dust by the heating means is fed into the desulfurization apparatus together with the combustion exhaust gas, and Se is dissolved and captured in the circulation liquid in the cooling and dust collecting column, and a treating agent for making the tetravalent Se insoluble is mixed in the treating process of the circulation liquid.

(5) A combustion exhaust gas treatment system of any one of (1) to (4), wherein the dust collecting means comprises a plurality of recovery units for separating and collecting dust, from the inlet side to the outlet side of the combustion exhaust gas, the dust collected from the recovery unit at the inlet side of the combustion exhaust gas and the dust collected from the outlet side are individually separated and collected, and only the dust separated and collected from the recovery unit at the outlet side is fed into the heating means.

(6) A combustion exhaust gas treatment system of any one of (1) to (4), further comprising sorting means for sorting the dust separated by the dust collecting means into large particle size group and small particle size group, wherein only the small particle size dust sorted by the sorting means is introduced into the heating means.

(7) A combustion exhaust gas treatment system of any one of (1) to (6), wherein the heating means is capable of heating the dust to any temperature in a range of 100 to 1200° C.

In the combustion exhaust gas treatment system of (1), most of Se in combustion exhaust gas is removed by the dust collector in a state of being contained in fly ash or dust, and is heated and gasified by the heating means. Accordingly, almost no Se is left over in the dust after treatment, and the Se elution standard is satisfied, and hence it can be directly recycled as cement material or discarded.

In the combustion exhaust gas treatment system of (2), most of Se in combustion exhaust gas is removed by the dust collector in a state of being contained in fly ash or dust, and is heated and gasified by the heating means. The gasified Se is fed into the desulfurization apparatus together with the combustion exhaust gas being rid of dust, and is dissolved and captured in the absorbent slurry. In the treating process of the absorbent slurry, it is mixed with a treating agent for making tetravalent Se insoluble, and is made insoluble. That is, at least tetravalent Se is directly made insoluble by the treating agent in the desulfurization apparatus, and is discharged as being mixed in the solid matter (gypsum, etc.) separated and formed from the slurry in the desulfurization apparatus, or is made insoluble by the treating agent in the wastewater treating apparatus for treating the discharge of circulation liquid in the desulfurization apparatus, and is easily solidified.

Therefore, when the content of hexavalent Se is small in the absorption liquid in the desulfurization apparatus, only by making tetravalent Se insoluble, the Se elution standard can be satisfied without releasing Se into the atmosphere. Moreover, in the constitution where Se is separated from the dust by the heating means and is introduced into the desulfurization apparatus, without feeding the entire dust into the desulfurization apparatus, the dust can be recycled easily, and lowering of desulfurization performance in the desulfurization apparatus can be avoided.

In the combustion exhaust gas treatment system of (3), the oxidation-reduction reaction control means controls the oxidation-reduction reaction of the slurry in the desulfurization apparatus so that the hexavalent Se mixed in the slurry in the desulfurization apparatus may be almost completely reduced by the sulfurous acid in the slurry to become tetravalent. Accordingly, the hexavalent Se can be changed to tetravalent almost completely in the desulfurization apparatus, and the Se in combustion exhaust gas can be easily and completely made insoluble.

In the combustion exhaust gas treatment system of (4), most of Se in combustion exhaust gas is removed by the dust collector in a state of being contained in fly ash or dust, and is heated and gasified by the heating means. The gasified Se is fed into the cooling and dust collecting column of the desulfurization apparatus together with the combustion exhaust gas being rid of dust, and is dissolved and captured in the circulation liquid. In the treating process of the circulation liquid, it is mixed with a treating agent for making tetravalent Se insoluble, and is made insoluble. That is, at least tetravalent Se is directly discharged to the solid-phase side by solid-liquid separating means or the like connected to the cooling and dust collecting column of the desulfurization apparatus, or is made insoluble by the treating agent in the wastewater treating apparatus for treating the discharge of circulation liquid in the desulfurization apparatus, and is easily solidified. Besides, most hexavalent Se reacts with sulfurous acid absorbed from the combustion exhaust gas in the liquid in the cooling and dust collecting column and is reduced to be tetravalent Se, and is made insoluble by the treating agent, and is discharged to the solid-phase side by the separating means so as to be made harmless.

Therefore, in this system, too, the Se elution standard can be satisfied easily without releasing Se into the atmosphere, and the cooling and dust collecting column of the desulfurization apparatus functions also as hexavalent Se reduction reaction facility, so that the constitution of the entire system may be simplified. Also in this system, Se or other dust rarely mixes into the slurry in the absorption column of the desulfurization apparatus, and the desulfurization performance in the desulfurization apparatus can be maintained high, and moreover gypsum of high quality can be collected as byproduct.

In the combustion exhaust gas treatment system of (5), only the dust separated and collected from a specific recovery unit at the outlet side of the combustion exhaust gas in the dust collecting means is fed into the heating means, and Se is gasified and removed, and therefore the required capacity of the heating means may be reduced. Moreover, in the subsequent desulfurization apparatus and others, the required amount of the treating agent for making Se insoluble is also reduced, so that Se is made harmless more easily and inexpensively.

That is, according to the study by the present inventors, it is known that more Se is contained (deposited) in the smaller particle size dust (ash) separated and collected from the specific recovery unit at the outlet side, and the Se is made harmless on the whole only by heating dust of smaller particle size, and applying insoluble treatment on gasified Se.

In the combustion exhaust gas treatment system of (6), Se is gasified and separated by feeding only the dust of small particle size sorted by the sorting means into the heating means, and therefore the required capacity of the heating means may be reduced. Moreover, in the subsequent desulfurization apparatus and others, the required amount of the treating agent for making Se insoluble is also reduced, so that Se is made harmless more easily and inexpensively.

That is, according to the study by the present inventors, it is known that more Se is contained (deposited) in the smaller particle size dust (ash), and the Se is made harmless on the whole only by heating dust of smaller particle size, and applying insoluble treatment on gasified Se.

In the combustion exhaust gas treatment system of (7), the heating temperature of dust by the heating means is 100 to 1200° C., and therefore recondensation of gasified Se into dust is prevented, and Se can be easily removed from dust, and the Se elution standard of dust is satisfied.

E. Fifth Invention (1) A combustion exhaust gas treatment system for treating combustion exhaust gas containing sulfurous acid, dust and Se components, comprising a dust collector for removing dust in the combustion exhaust gas, a desulfurization apparatus having an absorption column for circulating an absorbent slurry for absorbing and removing sulfurous acid, means for mixing a treating agent for making at least tetravalent Se insoluble, to a circulation liquid composing the absorbent slurry extracted from the desulfurization apparatus, and means for spraying the circulation liquid mixed with the treating agent by the mixing agent, into a combustion exhaust gas lead-in passage upstream of the dust collector.

(2) A combustion exhaust gas treatment system for treating combustion exhaust gas containing sulfurous acid, dust and Se components, comprising a desulfurization apparatus having an absorption column for circulating an absorbent slurry for absorbing and removing sulfurous acid in the combustion exhaust gas, means for mixing a treating agent for making at least tetravalent Se insoluble, to a circulation liquid composing the absorbent slurry extracted from the desulfurization apparatus, and means for spraying the circulation liquid mixed with the treating agent by the mixing agent, into a combustion exhaust gas lead-in passage upstream of the desulfurization apparatus, wherein the combustion exhaust gas is directly fed into the desulfurization apparatus.

(3) A combustion exhaust gas treatment system for treating combustion exhaust gas containing sulfurous acid, dust and Se components, comprising a desulfurization apparatus having an absorption column for circulating an absorbent slurry for absorbing and removing sulfurous acid in the combustion exhaust gas, with a cooling and dust collecting column disposed upstream of the absorption column, means for separating the circulation slurry extracted from the cooling and dust collecting column into solid and liquid, means for mixing a treating agent for making at least tetravalent Se insoluble, to the separated liquid discharged from the separating means, and means for spraying the separated liquid mixed with the treating agent by the mixing agent, into a combustion exhaust gas lead-in passage upstream of the desulfurization apparatus, wherein the combustion exhaust gas is directly fed into the cooling and dust collecting column of the desulfurization apparatus.

(4) A combustion exhaust gas treatment system of any one of (1) to (3), further comprising oxidation-reduction reaction control means for controlling the oxidation-reduction reaction in the desulfurization apparatus so that the hexavalent Se mixed in the slurry in the desulfurization apparatus may be reduced by the sulfurous acid in the slurry to become tetravalent.

In the combustion exhaust gas treatment system of (1), most of Se in combustion exhaust gas is removed by the dust collector in a state being contained in the dust, but at least tetravalent Se thereof is, before being removed by the dust collector, made insoluble by reacting with the treating agent for making at least tetravalent Se insoluble (hereinafter merely called treating agent) mixed in the circulation liquid of the desulfurization apparatus sprayed into the combustion exhaust gas lead-in passage by the spraying means. Accordingly, when the other Se content than tetravalent Se is less, the Se elution standard may be satisfied if the dust after treatment may be directly recycled or discarded.

If hexavalent and other Se or other impurities mix into the slurry in the desulfurization apparatus, most of hexavalent Se reacts with sulfurous acid absorbed from the combustion exhaust gas in the slurry in the desulfurization apparatus, and is reduced to change to tetravalent Se, and mainly tetravalent Se exists in the circulation liquid in the desulfurization apparatus. Consequently, this Se and other impurities are led into the mixing means as the circulation liquid is extracted, and mixed with the treating agent, and sprayed into the combustion exhaust gas lead-in passage, and most Se is removed by the dust collector, together with dust, in an insoluble state. If Se and other impurities are slightly mixed into the desulfurization apparatus without being removed by the dust collector, the Se and other impurities are prevented from being accumulated excessively in the circulation liquid of the desulfurization apparatus by the functions of the mixing means and spraying means, so that the wastewater treating apparatus for treating the wastewater of the desulfurization apparatus is not needed.

Moreover, by using the desulfurization apparatus having a cooling and dust collecting column upstream of the absorption column, fine dust particles not captured by the electrostatic precipitator can be captured in the cooling and dust collecting column, and hardly mix into the slurry of the absorption column, and therefore higher desulfurization performance is achieved, and the collected gypsum is higher in quality.

In the combustion exhaust gas treatment system of (2), most Se in combustion exhaust gas is directly fed into the desulfurization apparatus, together with the combustion exhaust gas, in a state being contained in the dust, but at least tetravalent Se thereof is made insoluble by reacting with the treating agent mixed in the circulation liquid of the desulfurization apparatus sprayed into the combustion exhaust gas lead-in passage by the spraying means. Accordingly, at least tetravalent Se contained in the combustion exhaust gas is directly discharged as being mixed into the solid matter (gypsum, etc.) separated and formed from the slurry in the desulfurization apparatus.

If hexavalent Se mixed into the desulfurization apparatus, most of the hexavalent Se reacts with sulfurous acid absorbed in the slurry in the desulfurization apparatus, and is reduced to be tetravalent Se, and also finally reacts with the treating agent added by the mixing means to be insoluble, and is discharged as being mixed in the solid matter (dust cake, etc.) separated and formed in the desulfurization apparatus.

Therefore, in this system, too, the Se elution standard ban be easily satisfied, and without requiring wastewater treating apparatus, the Se and others are prevented from being accumulated excessively in the absorption liquid in the desulfurization apparatus.

In the combustion exhaust gas treatment system of (3), most Se in combustion exhaust gas is directly fed into the cooling and dust collecting column of the desulfurization apparatus, together with the combustion exhaust gas, in a state being contained in the dust, but at least tetravalent Se thereof is made insoluble by reacting with the treating agent mixed in the circulation liquid of the desulfurization apparatus sprayed into the combustion exhaust gas lead-in passage by the spraying means. Accordingly, at least tetravalent Se contained in the combustion exhaust gas is directly discharged as being mixed into the solid matter (gypsum, etc.) separated and formed by the separating means for separating the circulation slurry in the cooling and dust collecting column into solid and liquid.

If hexavalent Se mixed into the cooling and dust collecting column of the desulfurization apparatus, most of the hexavalent Se reacts with sulfurous acid absorbed in the liquid in the cooling and dust collecting column, and is reduced to be tetravalent Se, and also finally reacts with the treating agent added by the mixing means to be insoluble, and is discharged as being mixed in the solid matter separated and formed by the separating means.

Therefore, in this system, too, the Se elution standard ban be easily satisfied. Moreover, without requiring wastewater treating apparatus, the Se and others are prevented from being accumulated excessively in the circulation liquid in the desulfurization apparatus. Still more, in this system, since dust does not mix into the slurry in the absorption column of the desulfurization apparatus, the desulfurization rate in the desulfurization apparatus, the purity of gypsum, and other performances may be kept high.

In the combustion exhaust gas treatment system of (4), the oxidation-reduction reaction control means controls the oxidation-reduction reaction of the slurry in the desulfurization apparatus so that the hexavalent Se mixed in the slurry in the desulfurization apparatus may be almost completely reduced by the sulfurous acid in the slurry to become tetravalent. Accordingly, if existing in the combustion exhaust gas, the hexavalent Se can be changed to tetravalent almost completely in the desulfurization apparatus, and the Se in combustion exhaust gas can be easily and completely treated. When the desulfurization apparatus comprises cooling and dust collecting column, most of hexavalent Se is removed in the cooling and dust collecting column, but where the cooling and dust collecting column is not provided, the installation of this oxidation-reduction reaction control means is particularly effective.

DETAILED DESCRIPTION OF THE PREFERRED EMBODIMENTS

A: First Invention

Figure 1:
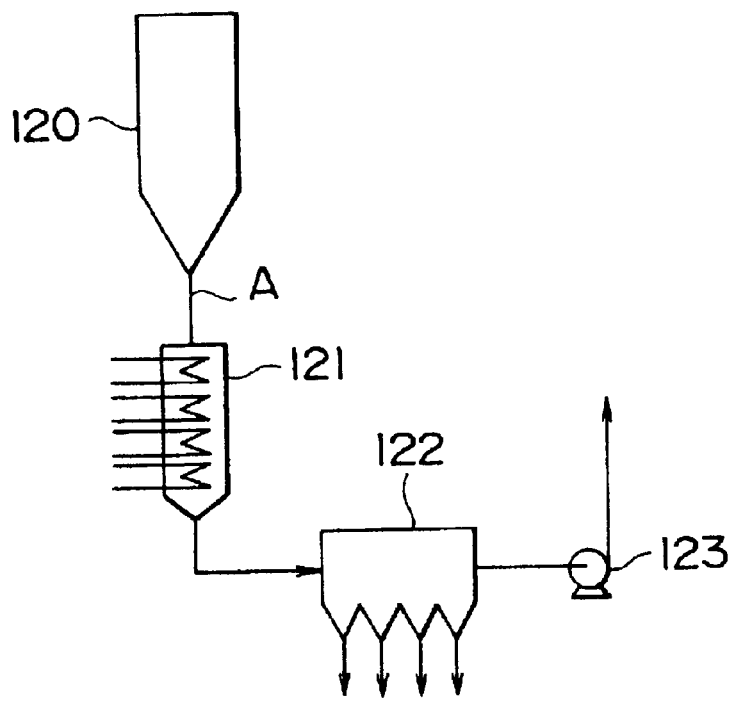
FIG. 1 is a schematic explanatory diagram showing a constitution of a combustion exhaust gas passing area of a combustion exhaust gas treatment system in embodiment 1 of the first invention.

Referring now to the drawings, embodiments of the first invention are described below.

Embodiment 1

Figure 2:
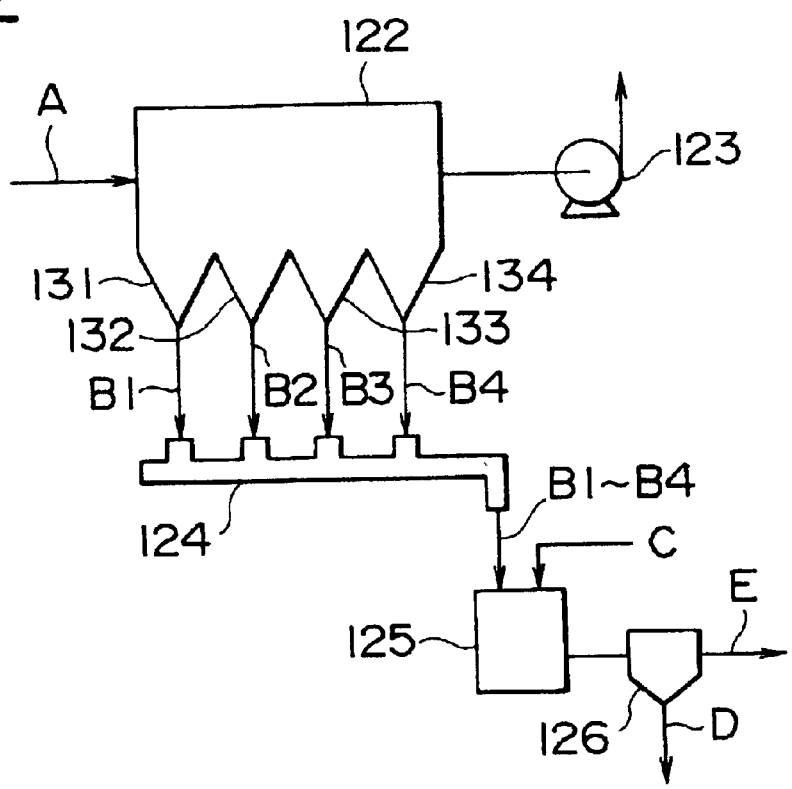
FIG. 2 is a schematic explanatory diagram showing an essential constitution of the combustion exhaust gas, treatment system in FIG. 1.

FIG. 1 is a schematic explanatory diagram showing a constitution of a combustion exhaust gas passing area in an example of a combustion exhaust gas treatment system of the first invention, and FIG. 2 is a schematic explanatory diagram showing an essential constitution of the combustion exhaust gas treatment system. This combustion exhaust gas treatment system comprises, as shown in FIG. 1, a cooler 121 (cooling means) for cooling combustion exhaust gas A released from a coal fired boiler 120, an electrostatic precipitator 122 (dust collecting means, sorting means) disposed downstream of the cooler 121 for collecting dust such as fly ash in the combustion exhaust gas A and separating from the combustion exhaust gas, and a fan 123 for feeding the combustion exhaust gas (being rid of dust) discharged from the electrostatic precipitator 122 into a later process such as a wet combustion exhaust gas desulfurization apparatus. At the dust discharge side of the electrostatic precipitator 122, as shown in FIG. 2, a dust conveyor 124, an Se treating apparatus 125 (Se treating means) for making Se insoluble, and a solid-liquid separator 126 for separating the dust slurry after Se insoluble treatment into solid and liquid are disposed sequentially.

Figure 24:
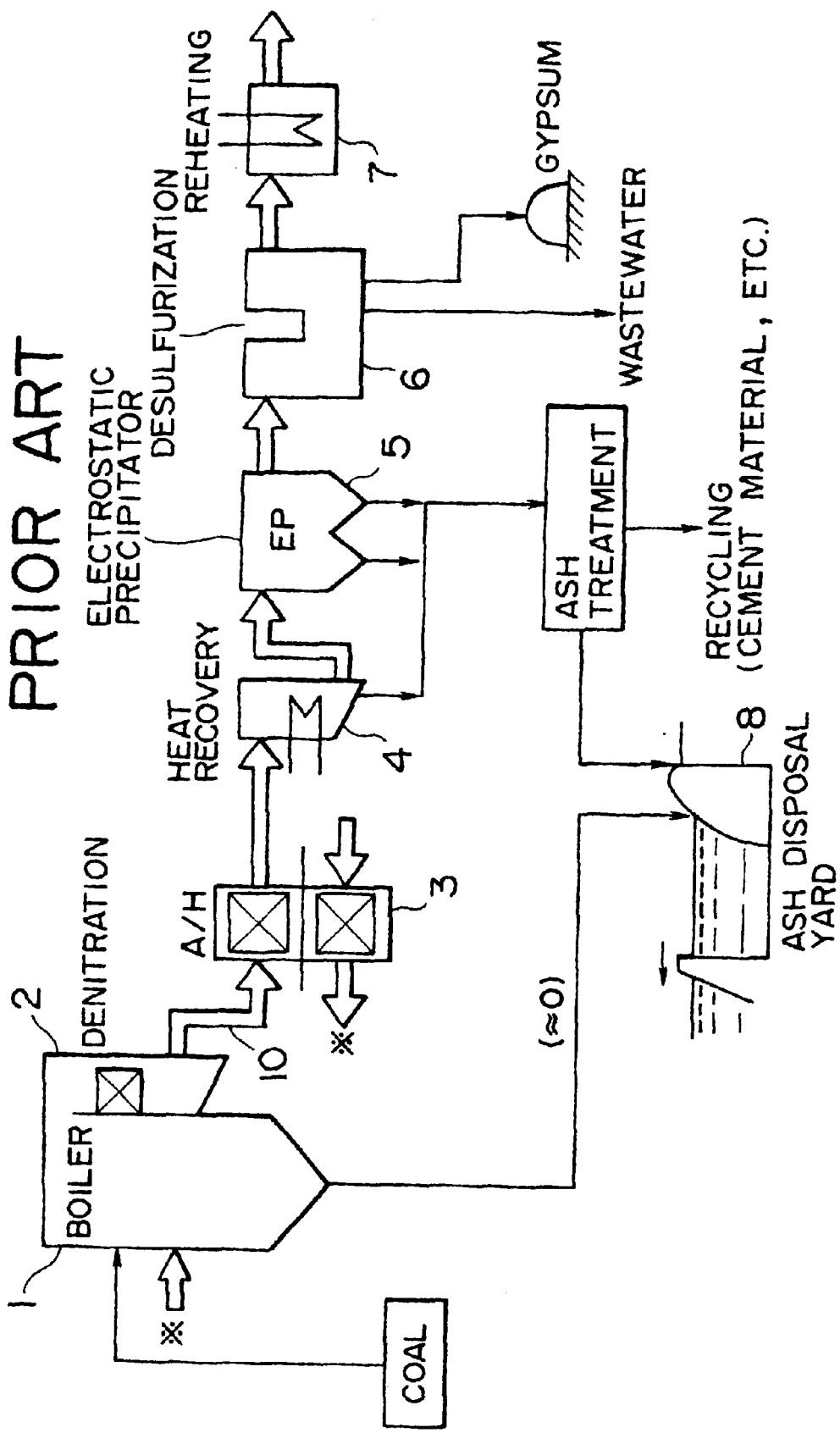
FIG. 24 is a schematic structural diagram showing an example of a conventional combustion exhaust gas treatment system.
Figure 25:
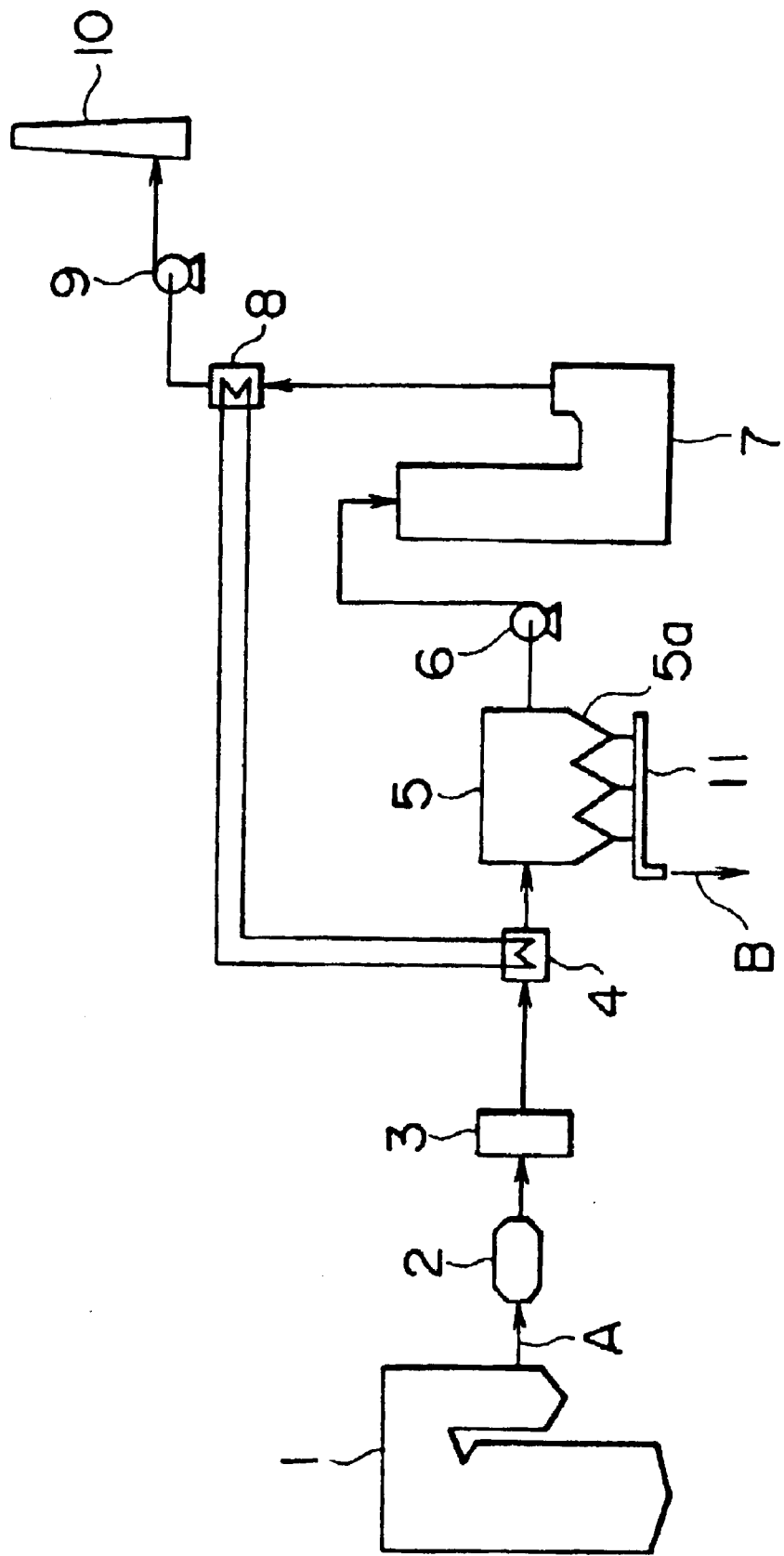
FIG. 25 is a schematic structural diagram showing other example of a conventional combustion exhaust gas treatment system.
Figure 26:
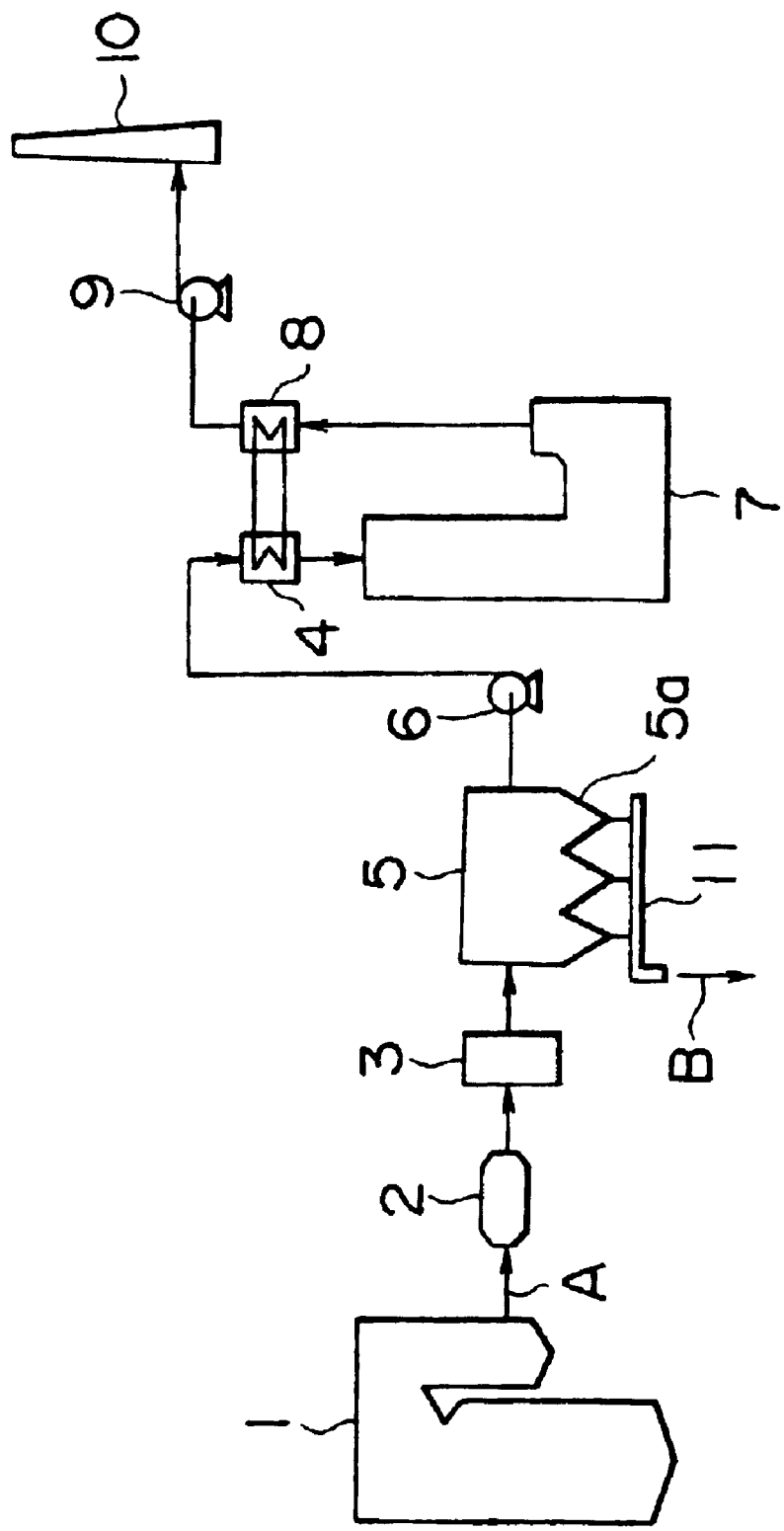
FIG. 26 is a schematic structural diagram showing a different example of a conventional combustion exhaust gas treatment system.

This system may be incorporated, for example, in the conventional combustion exhaust gas treatment system shown in FIGS. 24, 25, 26, and connected to the desulfurization apparatus for removing sulfurous acid from the combustion exhaust gas sent by the fan 123. Of course, the conventional air heater or gas heater can be function as the cooler 121.

The cooler 121 can set the outlet gas temperature, for example, in a range of 150 to 400° C., and the temperature may be set so that the combustion exhaust gas may be cooled to a temperature sufficient for condensing the Se in the combustion exhaust gas. More specifically, the temperature is set so that the combustion exhaust gas may be cooled to 350° C. or less, or preferably 310° C. or less. The lower limit of the cooling temperature is not particularly specified, but practically it is about 90° C.

The electrostatic precipitator 122 has plural hoppers 131 to 134 (recovery units) for separating and collecting dust, and these hoppers 131 to 134 are formed sequentially from the inlet side (upstream side) to the outlet side (downstream side) of the combustion exhaust gas. In such constitution, dust of larger particle size is collected from the inlet side hopper, and dust of smaller particle size is collected from the outlet side hopper.

The conveyor 124 is design to convey dust B1 to B4 collected and discharged from the hoppers 311 to 134 of the electrostatic precipitator 122 into one place in batch (Se treating apparatus 125).

The Se treating apparatus 125 has a function of adding water or other liquid to the dust to form into slurry, and adding a treating agent C thereto to mix, and, for example, the repulping tank for forming slurry and the mixing tank for adding and mixing the treating agent C may be separately disposed, or these functions may be realized by a single tank.

As the treating agent C, a chemical reacting with SE to make it insoluble is necessary, and if there is at least tetravalent Se (main form: selenious acid $SeO_3^{2-}$) among Se components to be removed, for example, $FeCl_3$ or $Fe_2(SO_4)_3$ may be used.

If there is hexavalent Se (main form: selenic acid $SeO_4^{2-}$) in the combustion exhaust gas and it is needed to make it insoluble in order to conform to the elution standard, as the treating agent, a reducing agent for transforming hexavalent Se into tetravalent Se (e.g. $Na_2SO_3$) and the above chemical may be charged. In this case, a pretreatment tank for reduction reaction of hexavalent Se into tetravalent Se may be provided aside from the mixing tank as the constitution of the Se treating apparatus 125.

In this Se treating apparatus 125, if it is necessary to repulp the dust, the circulation water of the desulfurization apparatus may be used as the solvent.

The charging amount of the treating agent C may be set slightly more than the stoichiometric equivalent for making Se in the dust completely insoluble determined from the reaction mentioned below (reaction formulas 1, 2, or 3, 4).

In thus constituted combustion exhaust gas treatment system, dust removal treatment and harmless treatment of Se contained much in the dust are performed as follows.

That is, the combustion exhaust gas A leaving the boiler 120 is first cooled by the cooler 121 to 350° C. or less, and therefore at least at the downstream side of the cooler 121, the Se in the combustion exhaust gas is condensed and the majority deposits on the ash which composes the dust. This dust is separated and collected by the electrostatic precipitator 122, and all the separated and collected dust is fed into the Se treating apparatus 125 in batch by the conveyor 124.

In the Se treating apparatus 125, the tetravalent Se (main form: selenious acid $SeO_3^{2-}$) contained in the slurry formed by repulsing of the supplied dust (hereinafter called dust slurry) reacts with the treating agent ($FeCl_3$ or $Fe_2(SO_4)_3$) as shown in the following reaction formulas 1, 2, or 3, 4, and is made insoluble in a form of iron selenite ($Fe_2(SeO_3)_3$).

When hexavalent Se (main form: selenic acid $SeO_4^{2-}$) is present, the reducing agent as mentioned above is charged, and this hexavalent Se reacts with the reducing agent to be tetravalent Se, which similarly reacts as shown in the following reaction formulas 1, 2, or 3, 4 to be insoluble.

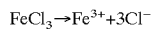

$$FeCl_3 \rightarrow Fe^{3+} + 3Cl^- \quad (1)$$

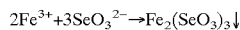

$$2Fe^{3+} + 3SeO_3^{2-} \rightarrow Fe_2(SeO_3)_3 \downarrow \quad (2)$$

or

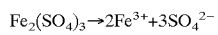

$$Fe_2(SO_4)_3 \rightarrow 2Fe^{3+} + 3SO_4^{2-} \quad (3)$$

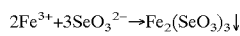

$$2Fe^{3+} + 3SeO_3^{2-} \rightarrow Fe_2(SeO_3)_3 \downarrow \quad (4)$$

Accordingly, when the dust slurry making Se insoluble is separated into solid and liquid in the solid-liquid separator 126, most of Se is separated to the solid-phase side as iron selenite, and is mixed in insoluble form into the dust cake D discharged from the solid-liquid separator 126. Therefore, if the dust cake D is directly discarded in the ash disposal yard, it conforms to the elution standard. Incidentally, since the filtrate E from the solid-liquid separator 126 is extremely low in Se concentration, it can be easily treated as wastewater. Or it may be used as addition water for dust slurry, or returned to the desulfurization apparatus as circulation water for absorbent slurry of the desulfurization apparatus.

The result of combustion exhaust gas treatment experiment by the test apparatus constructed as shown in FIGS. 1 and 2 is explained below. In the experiment, coal containing 3 mg/kg of Se was supplied into a combustion furnace at a rate of 25 kg/h, and combustion exhaust gas of 200 m³ N/h discharged from the combustion furnace was cooled to 150° C., and fed into an electrostatic precipitator. As a result, more than 99% of dust was captured by the electrostatic precipitator (Se capturing rate about 99.4%), and the amount of dust collected by the conveyor (the total collected from the hoppers) was 3.4 kg/h. As a result of analysis of the Se concentration in the dust (B1 to B4) collected by the conveyor according to the elution test and atomic absorption method by hydrogen compound generating method conforming to the ordinance No. 13 of Environmental Agency of Japan, the concentration (Se components contained in the dust and eluting by elution test) was 0.33 mg/liter, which was over the landfill elution standard (0.3 mg/liter). However, in 30 minutes after mixing by adding treating agent C (using $FeCl_3$) in the Se treating apparatus 125, by separating into solid and liquid by the solid-liquid separator 126, the Se concentration was measured in the solid-phase side (dust cake D) and liquid phase side (filtrate E), and the results are shown in Table 1, which sufficiently satisfied the elution standard (0.3 mg/liter). That is, the eluting Se concentration in the solid-phase side (Se components contained in the solid phase and eluting by the elution test) was 0.04 to 0.1 mg/liter, and the eluting Se concentration in the liquid-phase side was all 0.01 mg/liter or less.

TABLE 1

| Slurry concentration (wt. %) | FeCl₃ concentration (wt. %) | Eluting selenium concentration from solid phase after solid-liquid separation (mg/liter) | Selenium concentration in liquid phase after solid-liquid separation (mg/liter) |
| --- | --- | --- | --- |
| 25 | 0.1 | 0.10 | All 0.01 or less |
| 25 | 0.25 | 0.08 | |
| 25 | 0.5 | 0.07 | |
| 25 | 1.0 | 0.05 | |
| 25 | 2.5 | 0.04 | |
| 25 | 5.0 | 0.04 | |
| 50 | 0.5 | 0.08 | |
| 50 | 1.0 | 0.06 | |
| 50 | 5.0 | 0.05 | |

As described herein, according to the combustion exhaust gas treatment system of the embodiment, the Se in the combustion exhaust gas is removed together with the dust, without requiring the complicated aftertreatment needed in the prior art, and is finally contained in the dust cake D in insoluble form, so as to be discarded directly. In this combustion exhaust gas treatment system, only by adding the Se treating apparatus 125 and solid-liquid separator 126 to the conventional combustion exhaust gas treatment system shown in FIGS. 24 to 26, the combustion exhaust gas treatment system incorporating the system of the invention can be realized, and the Se in the combustion exhaust gas is made harmless, and modification of the existing combustion exhaust gas treatment system is easy, and when newly installing this system, the conventional design or equipment may be used as it is.

Embodiment 2

Figure 3:
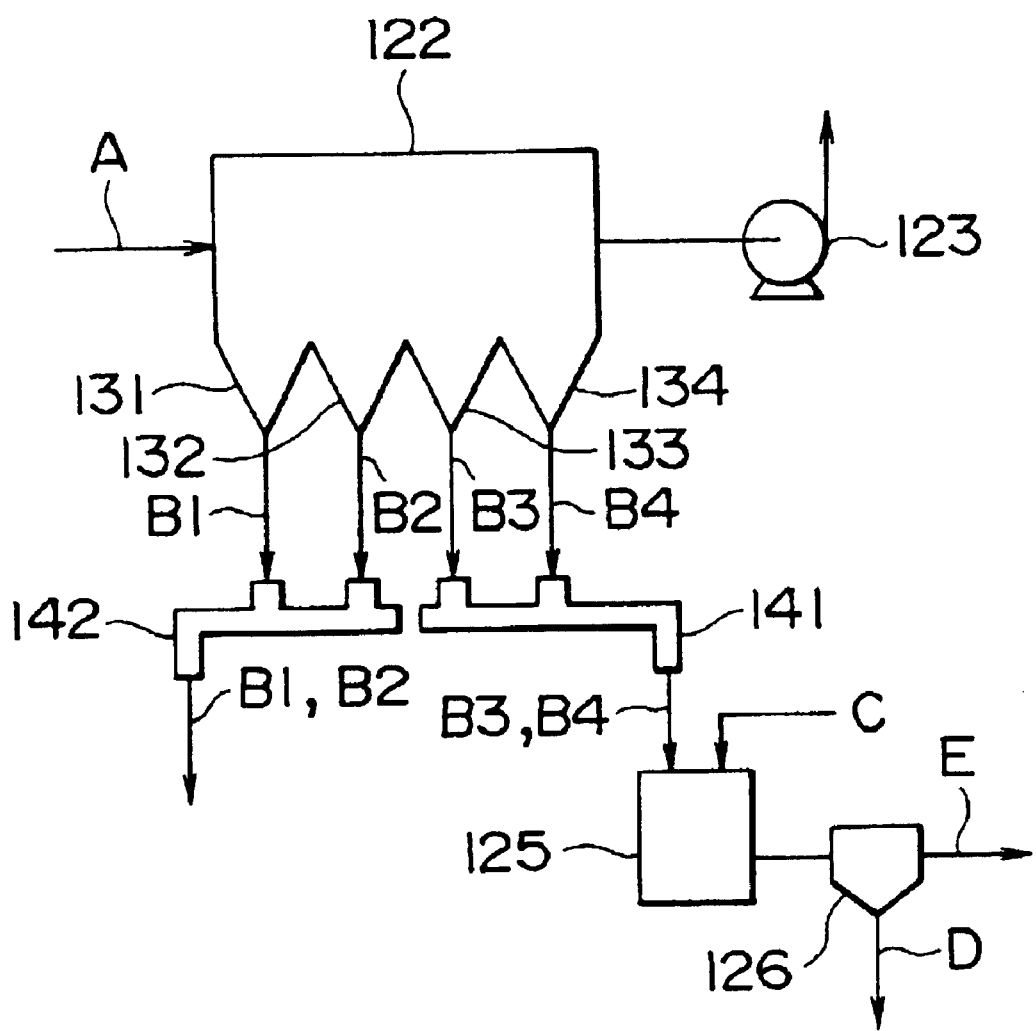
FIG. 3 is a schematic explanatory diagram showing a constitution of a combustion exhaust gas treatment system in embodiment 2 of the first invention.

FIG. 3 is a schematic explanatory diagram showing a constitution of a second example of a combustion exhaust gas treatment system of the first invention. Same constituent elements as in embodiment 1 are identified with same reference numerals, and their explanations are omitted. This combustion exhaust gas treatment system possesses, as shown in FIG. 3, a conveyor 141 for feeding only dust B3, B4 separated and collected from specific hoppers 133, 134 at the outlet side of the combustion exhaust gas, out of plural hoppers 131 to 134 in the electrostatic precipitator 122, into the Se treating apparatus 125, and a conveyor 142 for conveying and treating the dust B1, B2 separated and collected from specific hoppers 131, 132 at the inlet side of the combustion exhaust gas, separately from the dust B3, B4, and is characterized by making Se insoluble only in part of the dust B3, B4, and discarding the remaining dust B1, B2. The electrostatic precipitator 122 in this embodiment function as t he dust collecting means and the sorting means in the first invention.

In this case, only the dust B3, B4 separated and collected from the specific hoppers 133, 134 at the outlet side of the combustion exhaust gas undergoes Se insoluble treatment, and therefore the required amount of the treating agent C and the required capacity of the Se treating capacity 125 can be decreased, and the Se is made harmless more easily and inexpensively.

That is, according to the study by the present inventors, it is known that more Se is contained (deposited) in the smaller particle size dust (ash) separated and collected from the specific recovery unit at the outlet side, and the Se is made harmless on the whole only by applying insoluble treatment on the dust of smaller particle size, thereby contributing to reduction of facility cost and running cost.

The result of combustion exhaust gas treatment experiment by the test apparatus in FIG. 3 is described below. In the experiment, coal containing 3 mg/kg of Se was supplied into a combustion furnace at 4 rate of 25 kg/h, and the flue of 200 $m^3$ N/h released from the combustion furnace was cooled to 150° C., and fed into an electrostatic precipitator. In this case, more than 99% of the dust was captured by the electrostatic precipitator (capturing rate of Se about 99.4%), and the amount of dust collected by the conveyors (the total collected from the hoppers) was 3.4 kg/h. The discharge amount of dusts (collected ash) conveyed and collected by the conveyors 141, 142, the mean particle size, and eluting Se concentration (Se components contained in the collected ash and eluting by the elution test) were as shown in Table 2.

More specifically, the discharge amount of the dust B3, B4 separated and collected from the hoppers 133, 134 at the outlet side of the combustion exhaust gas was slight, 1.14 kg/h, but the eluting Se concentration was 0.49 mg/liter, high above the standard. On the other hand, the discharge amount of the dust B1, B2 separated and collected from the hoppers 131, 132 at the inlet side of combustion exhaust gas was large, 2.27 kg/h, but the eluting Se concentration was 0.20 mg/liter, far below the standard. Accordingly, it is known that the dust B1, B2 separated and collected from the hoppers 131, 132 at the inlet side of the combustion exhaust gas can be directly discarded. That is, Se insoluble treatment is not needed in the dust at the inlet side of the combustion exhaust gas which is about twice larger in the discharge amount, and hence it is evident that the required amount of the treating agent C and the required capacity of the Se treating apparatus 125 can be substantially saved.

Incidentally, such difference in eluting Se concentration is regarded to be due to the particle size of dust (ash). That is, when gaseous Se ($SeO_2$) is condensed and deposits on the surface of the ash forming the dust, ash of smaller particle size is greater in the specific surface area per unit weight, and hence more Se deposits. On the other hand, in the dust collector such as the electrostatic precipitator mentioned above, coarse ash particles are likely to be captured at the inlet side of the combustion exhaust gas, and fine ash particles are likely to be captured at the outlet side of the combustion exhaust gas, and in other words there is a sorting function, and it is hence considered that the eluting Se concentration is high in the dust captured at the outlet side of the combustion exhaust gas.

The dust B3, B4 separated and collected from the hoppers 133, 134 at the outlet side of the combustion exhaust gas were fed into the Se treating apparatus 125 by the conveyor 141, and the treating agent C (using $FeCl_3$) was added and mixed, and 30 minutes later, it was separated into solid and liquid in the solid-liquid separator 126, and the Se concentration was measured in the solid-phase side (dust cake D) and liquid-phase side (filtrate E), and the measurements as shown in Table 3 were obtained, which sufficiently satisfied the elution standard (0.3 mg/liter). That is, the eluting Se concentration in the solid-phase side (Se components contained in the solid phase and eluting by the elution test) was 0.05 to 0.09 mg/liter, and the eluting Se concentration in the liquid-phase side was 0.01 mg/liter or less. In embodiments 1 and 2, at the same slurry concentration and treating agent ($FeCl_3$) concentration, the consumption was the treating agent is compared in Table 4, which shows that it is decreased to about ⅓ in embodiment 2 as compared with embodiment 1.

TABLE 2

| | Collected ash | |
| --- | --- | --- |
| | Collected ash discharged from conveyor 142 (combustion exhaust gas inlet side) | Collected ash discharged from conveyor 141 (combustion exhaust gas outlet side) |
| Item | | |
| Discharge amount kg/h | 2.27 | 1.14 |
| Mean particle size of collected ash μm | 12 | 5 |
| Eluting selenium concentration in collected ash mg/liter | 0.20 | 0.49 |

TABLE 3

| Slurry concentration (wt. %) | $FeCl_3$ concentration (wt. %) | Eluting selenium concentration from solid phase after solid-liquid separation (mg/liter) | Selenium concentration in liquid phase after solid-liquid separation (mg/liter) |
| --- | --- | --- | --- |
| 25 | 0.5 | 0.08 | All 0.01 or less |
| 25 | 1.0 | 0.06 | |
| 25 | 2.5 | 0.05 | |
| 50 | 0.5 | 0.09 | |
| 50 | 1.0 | 0.07 | |
| 50 | 5.0 | 0.05 | |

TABLE 4

|  | Embodiment 1 | Embodiment 2 |
|---|---|---|
| Dust amount (kg/h) | 3.4 | 1.14 |
| Slurry concentration (wt. %) | 25 | 25 |
| FeCl₃ concentration (wt. %) | 0.5 | 0.5 |
| Consumption of treating agent (kg/h) | 0.051 | 0.017 |

Embodiment 3

Figure 4:
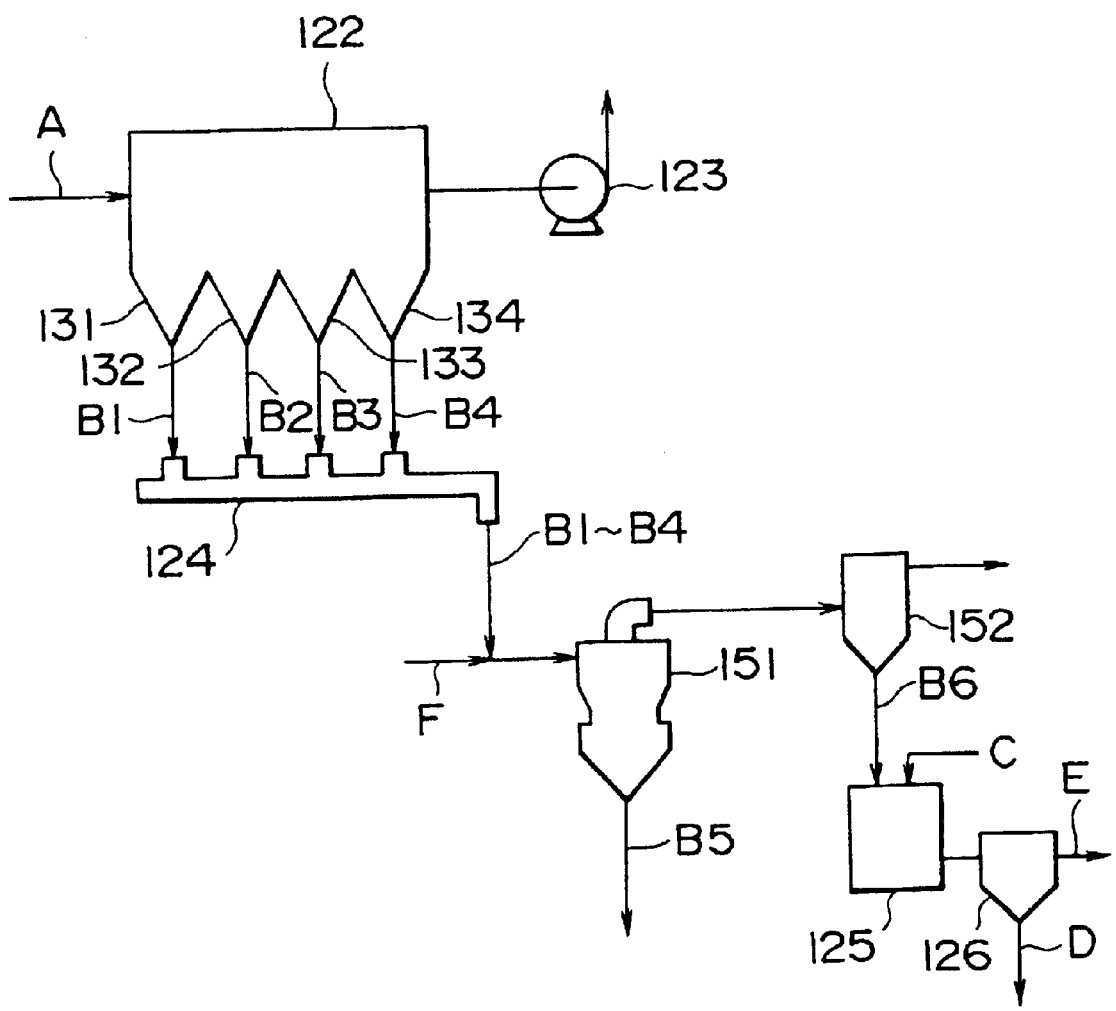
FIG. 4 is a schematic explanatory diagram showing a constitution of a combustion exhaust gas treatment system in embodiment 3 of the first invention.

FIG. 4 is a schematic explanatory diagram showing a constitution of a third example of a combustion exhaust gas treatment system of the first invention. Same constituent elements as in embodiment 1 are identified with same reference numerals and their explanations are omitted. This combustion exhaust gas treatment system, as shown in FIG. 4, comprises a sorter 151 (sorting means) for classifying the dust B1 to B4 captured by the electrostatic precipitator 122 and conveyed in batch by the conveyor 124 into large particle size (coarse ash) B5 and small particle size (fine ash) B6, and only fine ash B6 sorted by the sorter 151 is captured by a fine particle capturing apparatus 152, and fed into the Se treating apparatus 125 to make Se insoluble.

Meanwhile, in this case, the dust B1 to B4 conveyed in batch by the conveyor 124 are conveyed by air F and led into the sorter 151. The sorter 151 may be constituted by, for example, a cyclone, and it is convenient when it is designed to adjust the degree of sorting. As the fine particle capturing apparatus 152, in this case, a bag filter is used.

In this case, only the fine ash B6 is subjected to Se insoluble treatment, and same as in embodiment 2, therefore, the required amount of treating agent C and required capacity of Se treating apparatus 125 can be reduced, so that the Se may be made harmless more easily and inexpensively.

In this combustion exhaust gas treatment system, only by adding the Se treating apparatus 125 and sorter 151 to the conventional combustion exhaust gas treatment system shown in FIGS. 24 to 26, the combustion exhaust gas treatment system incorporating the system of the invention can be realized, while the conveyor and other structures may be the same, and the Se in the combustion exhaust gas is made harmless, and modification of the existing combustion exhaust gas treatment system is easy, and when newly installing this system, the conventional design or equipment may be used as it is.

The result of combustion exhaust gas treatment experiment by the test apparatus shown in FIG. 4 is described below. In the experiment, coal containing 3 mg/kg of Se was supplied into a combustion furnace at a rate of 25 kg/h, and the combustion exhaust gas exhausted from the combustion furnace at a rate of 200 m³ N/h was cooled to 150° C. and fed into the electrostatic precipitator. In this case, more than 99% of the dust was captured by the electrostatic precipitator, and the amount of dust collected by the conveyor (the total collected from the hoppers) was 3.4 kg/h. The capturing amount of coarse ash B5 and fine ash B6, mean particle size, and eluting Se concentration (Se components contained in captured ash and eluting by the elution test) are shown in Table 5.

TABLE 5

| Item | Collected ash | |
|---|---|---|
|  | Coarse ash B5 | Fine ash B6 |
| Capturing amount kg/h | 2.05 | 1.30 |
| Mean particle size of captured ash μm | 13 | 5.4 |
| Eluting selenium concentration in captured ash mg/liter | 0.26 | 0.36 |

That is, in the fine ash B6, the mean particle size was 5.4 μm, and the capturing amount was small, 1.30 kg/h, but the eluting Se concentration exceeded the standard, 0.36 mg/liter. In coarse ash B5, the mean particle size was 13 μm, the capturing amount was large, 2.05 kg/h, but the eluting Se concentration was below the standard, 0.26 mg/liter. Accordingly, it is known that the coarse ash B5 can be directly discarded. Hence, Se insoluble treatment is not needed in the coarse ash B5 which is very large in output, and it is evident that the required amount of treating agent C and required capacity of Se treating apparatus 125 can be saved substantially.

The fine ash B6 was fed into the Se treating apparatus 125, and blended with the treating agent C and mixed for 30 minutes, and it was separated into solid and liquid by the solid-liquid separator 126, and the Se concentration was measured in the solid-phase side (dust cake D) and liquid-phase side (filtrate E), and the same results as in embodiment 2 shown in Table 3 were obtained, and the elution standard (0.3 mg/liter) was sufficiently satisfied.

Embodiment 4

Figure 5:
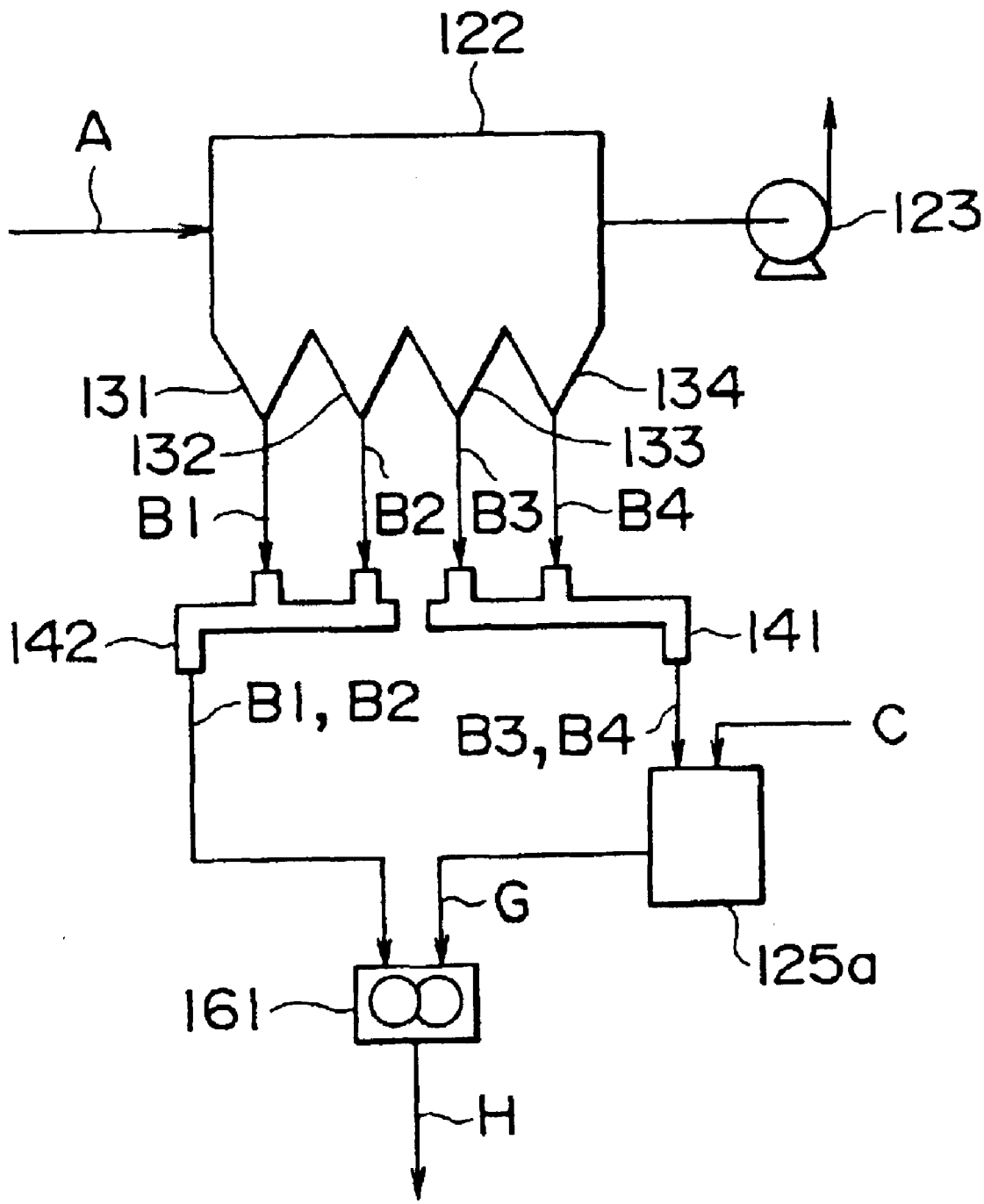
FIG. 5 is a schematic explanatory diagram showing a constitution of a combustion exhaust gas treatment system in embodiment 4 of the first invention.

FIG. 5 is a schematic explanatory diagram showing a constitution of a fourth example of a combustion exhaust gas treatment system of the first invention. Same constituent elements as in embodiment 2 in FIG. 3 are identified with same reference numerals and their explanations are omitted. This combustion exhaust gas treatment system is, as shown in FIG. 5, characterized by comprising a mixer 161 (mixing means) for mixing the dust G undergoing Se insoluble treatment as being fed into the Se treating apparatus 125 from the conveyor 141 after being separated and collected by the hoppers 133, 134 at the outlet side of the combustion exhaust gas, and the other dust B1, B2 not undergoing Se insoluble treating after being separated and collected by the hoppers 131, 132 at the inlet side of the combustion exhaust gas, so that the water content may be 20% or less (preferably 10% or less).

The Se treating means is an Se treating apparatus 125a capable of inducing Se insoluble reaction (for example, reaction formulas 1, 2, or 3, 4), by spraying a liquid containing a treating agent such as $FeCl_3$ or $Fe_2(SO_4)_3$ (concentration about 0.5 to 5.0 wt. %) uniformly into the dust.

In this example, the dust G undergoing Se insoluble treatment, and the other dust B1, B2 not undergoing Se insoluble treatment are mixed by the mixer 161, and a harmless dust cake H (mixed ash) of low water content is formed. Accordingly, without using large-scale equipment such as solid-liquid separator that requires wastewater (filtrate) treatment, the water content in the dust can be easily lowered, and the harmless dust can be handled easily in waste disposal. In the constitution of the embodiment, the water content of the mixed ash H and eluting Se concentration (Se components contained in mixed ash and eluting by the elution test) were measured in the same conditions as in embodiment 2, of which results are shown in Table 6.

TABLE 6

| FeCl₃ concentration in spray liquid (wt. %) | Spray flow rate of FeCl₃ solution (g/h) | Water content in mixed ash (wt. %) | Eluting selenium concentration in mixed ash (mg/liter) |
|---|---|---|---|
| 0.5 | 400 | 9.7 | 0.18 |
| 1.0 | 400 | 10.5 | 0.15 |
| 2.5 | 400 | 10.6 | 0.14 |
| 5.0 | 400 | 9.8 | 0.16 |
| 5.0 | 600 | 15.4 | 0.13 |
| 5.0 | 800 | 19.9 | 0.11 |

Embodiment 5

Figure 6:
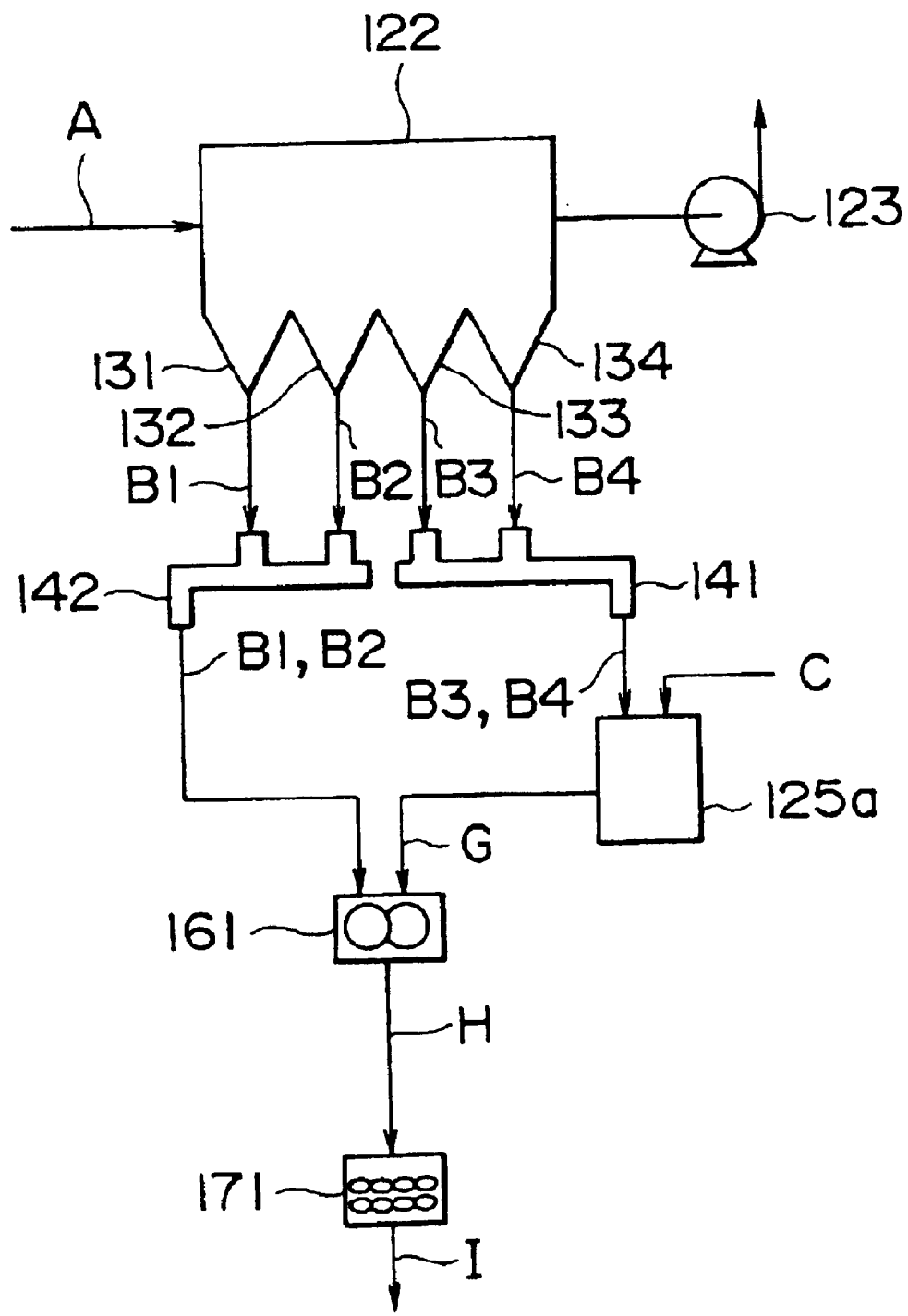
FIG. 6 is a schematic explanatory diagram showing a constitution of a combustion exhaust gas treatment system in embodiment 5 of the first invention.

FIG. 6 is a schematic explanatory diagram showing a constitution of a fifth example of a combustion exhaust gas treatment system of the first invention. Same constituent elements as in embodiment 4 in FIG. 5 are identified with same reference numerals and their explanations are omitted. This combustion exhaust gas treatment system is, as shown in FIG. 6, characterized by comprising a scale forming apparatus 171 (scale forming means) for compacting the dust H mixed by the mixer 161 to form into scale.

In this case, the scale forming apparatus 171 forms the dust H into scale dust (scale ash) I, and the volume of the dust H is further reduced, and handling in waste disposal is much easier. Besides, the water content of the dust H is kept under 20% (preferably under 10%) by the mixer 161, which is effective for making it easier to operate to compact by the scale forming apparatus 171. As a result of experiment in the same running conditions as in embodiment 4, the bulk density of the dust cake H (mixed ash) mixed by the mixer 161 was 0.8 g/cc, whereas the bulk density of the dust (scale ash) I formed into scale by the scale forming apparatus 171 was 1.5 g/cc.

The first invention may be realized also in other various forms than the illustrated embodiments. For example, as the treating agent for making Se insoluble, aside from $FeCl_3$ or $Fe_2(SO_4)_3$, chelating agents (e.g. Miyoshi Resin Epolus MX-7), and high polymer heavy metal capturing agents (e.g. Miyoshi Resin Epofloc L-1) can be used. The dust collecting means and sorting means of the invention are not limited to the electrostatic precipitator and single cyclone connected thereto, but the dust collecting means and sorting means of the invention may be realized, for example, by multiple cyclones.

The combustion exhaust gas treatment system of the first invention may be incorporated in part of the combustion exhaust gas treatment system having a conventional desulfurization apparatus. For example, in embodiment 1, the desulfurization apparatus for removing sulfurous acid from the combustion exhaust gas sent by the fan 123 may be provided, for example, as in the prior art shown in FIGS. 24 to 26. Besides, the conventional air heater or gas-gas heater may be used as the cooling means of the first invention.

Effects of the First Invention

According to the combustion exhaust gas treatment system of the first invention, most of Se in combustion exhaust gas is cooled by the cooling means and condensed, and is removed by the dust collecting means in a state being contained in the dust. To the dust separated by the dust collecting means, a treating agent is added by the Se treating means, and the existent form of Se in the dust is transformed into an insoluble compound. Accordingly, if the dust is discarded same as in the prior art, the Se elution standard is satisfied, and Se is made harmless easily without requiring complicated aftertreatment.

By applying Se insoluble treatment only on the dust separated and collected from the specific recovery unit at the outlet side of combustion exhaust gas in the dust collecting means, the required amount of treating agent and required capacity of the Se treating means can be reduced, and the Se is made harmless more easily and economically.

Also by applying Se insoluble treatment only on the dust of small particle size sorted by the sorting means, the required amount of treating agent and required capacity of the Se treating means can be reduced, and the Se is made harmless more easily and economically.

By installing mixing means, when the dust undergoing Se insoluble treatment and remaining dust not undergoing Se insoluble treatment are mixed so that the water content may be 20% or less, the water content of the dusts may be easily lowered without using large-scale equipment such as solid-liquid separator that requires treatment of wastewater (filtrate), and therefore handling in disposal of dust may be easier.

By installing scale forming means, when the dust mixed by the mixing means is formed into scale, handling in disposal of dusts may be much easier.

B: Second Invention

Referring now to drawings, embodiments of the second invention are described below.

Embodiment 1

Figure 7:
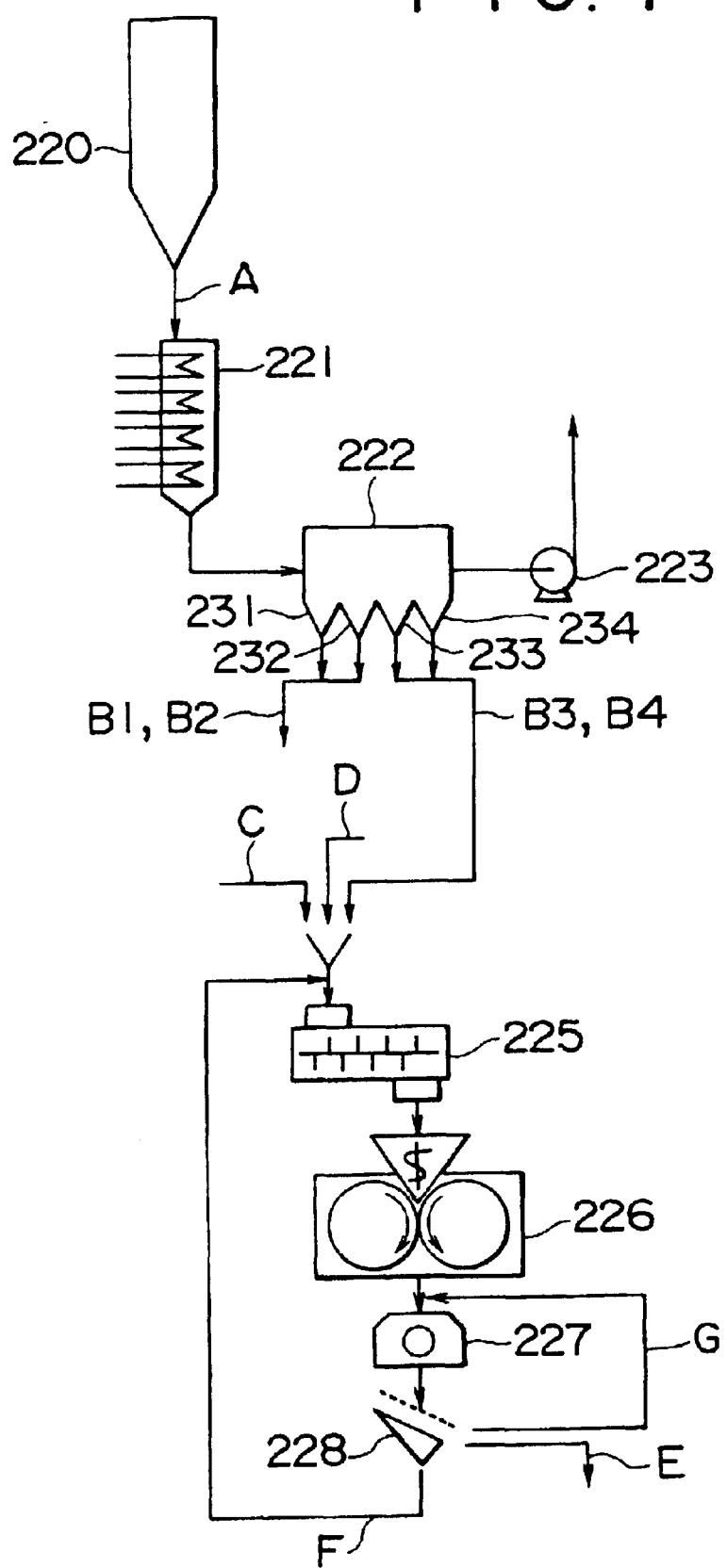
FIG. 7 is a diagram showing an essential constitution of a combustion exhaust gas treatment system in embodiment 1 of the second invention.

FIG. 7 is a diagram showing an essential structure of a combustion exhaust gas treatment system in embodiment 1 of the second invention. This combustion exhaust gas treatment system comprises, as shown in FIG. 7, a cooler 221(cooling means) for cooling combustion exhaust gas A exhausted from a coal fired boiler 220, an electrostatic precipitator 222 (dust collecting means, sorting means) disposed downstream of the cooler 221, for collecting dust such as fly ash in the combustion exhaust gas A, and separating from the combustion exhaust gas, and a fan 223 for supplying the combustion exhaust gas (being rid of dust) discharged from the electrostatic precipitator 222 to a later process.

At the dust discharge side of the electrostatic precipitator 222, there are, as sequentially arranged, a mixer 225 (mixing means) for adding and mixing Se elution preventive agent C and humidifying liquid D to the dust, a briquetting machine 226 (scale forming means) for forming the dust discharged from the mixer 225 into scale, a granulator 227 (granulating means) for granulating the scale formed dust (scale dust) formed by the briquetting machine 226 into a size suited to handling, and a screen 228 (sorting means) for screening a proper size of the scale dust granulated by the granulator 227.

Moreover, a desulfurization apparatus for removing sulfurous acid from the combustion exhaust gas sent by the fan 223 may be provided same as in the prior art shown in FIGS. 24 to 26. Besides, as a matter of course, the conventional air heater or gas-gas heater may be function as the cooler 221.

Of the scale dust sorted by the screen 228, scale dust E of proper size may be directly discarded or recycled, and smaller scale dust F is put back into the mixer 225, and larger scale dust G is sent again into the granulator 227.

The cooler 221 is to set the outlet gas temperature, for example, in a range of 150 to 400° C., and the temperature may be set so that the combustion exhaust gas may be cooled to the temperature for sufficiently condensing the Se in the combustion exhaust gas. Specifically, the temperature is set so as to cool the combustion exhaust gas to 350° C. or less, or preferably 310° C. or less.

The electrostatic precipitator 222 has plural hoppers 231 to 234 (recovery units) for separating and collecting dust, and these hoppers 231 to 234 are formed sequentially from the inlet side (upstream side) to the outlet side (downstream side) of the combustion exhaust gas, and in such constitution, dust of larger particle size is collected from the inlet side hopper, and dust of smaller particle size is collected from the outlet side hopper.

In this case, only the dust B3, B4 separated and collected from the specific hoppers 233, 234 at the outlet side of the combustion exhaust gas, out of the plural hoppers 231 to 234 in the electrostatic precipitator 222, are led into the mixer 225 to make Se insoluble, while the remaining dust B1, B2 are discarded directly.

The mixer 225 has the function of, in this case, mixing and discharging the charged dust, Se elution preventive agent C, and humidifying liquid D, and is provided with, for example, agitation blades inside for sending out the charged matter to the discharge side while agitating it.

Herein, as the Se elution preventive agent, a chemical reacting with Se to make it insoluble is necessary, and for example, $FeCl_3$ or $Fe_2(SO_4)_3$ may be used if at least tetravalent Se (main form: selenious acid $SeO_3^{2-}$) is contained among Se components to be removed.

If there is hexavalent Se (main form: selenic acid $SeO_4^{2-}$) in the combustion exhaust gas and it must be made insoluble in order to conform to the elution standard, a reducing agent for transforming hexavalent Se into tetravalent Se may be added as treating agent, together with the above chemical. As the reducing agent, for example, sulfurous acid water obtained by blowing $SO_2$ into water may be preferably used. When the wet desulfurization apparatus is installed at the same time, it is preferred to absorb $SO_2$ by the desulfurization apparatus, and extract and use the slurry or circulation water containing unreacted sulfurous acid.

The charging amount of the Se elution preventive agent C may be set slightly more than the stoichiometric equivalent for making Se in the dust completely insoluble determined from the reaction formulas 1, 2, or 3, 4.

As the humidifying liquid D, aside from ordinary industrial water, the slurry or circulation water of the desulfurization apparatus may be used, and its charging amount may be a minimum required level for the ease of handling of dust or for compacting and forming into scale. For example, when the dust amount is 15 t/h, $FeCl_3$ may be charged by about 150 kg/h, and humidifying water about 0.79 t/h. Herein, as the humidifying liquid, by absorbing $SO_2$ in the desulfurization apparatus, the slurry or circulation water containing unreacted sulfurous acid may be used, and the dissolved sulfurous acid may act as reducing agent for reducing the hexavalent Se into tetravalent Se.

Instead of adding the Se elution preventive agent C by charging together with the humidifying liquid D, it may be preliminarily mixed in a solution and added In such a case, the solution concentration is preferred to be about 0.05 to 5 wt. %, and the loading may be about 0.5 to 10 wt. % to the dust. By so setting, most of Se is made insoluble, and the dust may be handled easily without discharge of filtrate, and it may be smoothly compacted and formed into scale.

In thus constituted combustion exhaust gas treatment system, dust removal treatment and harmless treatment of Se much contained in dust are executed in the following procedure.

The combustion exhaust gas A released from the boiler 220 is first cooled to 350° C. or less by the cooler 221, and therefore at least at the downstream side of the cooler 221, the Se in combustion exhaust gas is condensed, and mostly deposits on the ash which forms the dust in the combustion exhaust gas. This dust is separated and collected by the electrostatic precipitator 222, and the dust B1, B2 separated and collected from the specific hoppers 231, 232 at the inlet side of the combustion exhaust gas are directly discarded, while only the dust B3, B4 separated and collected from the specific hoppers 233, 234 at the outlet side of the combustion exhaust gas are fed into the mixer 225.

In the mixer 225 or subsequent briquetting machine 226, the tetravalent Se (main form: selenious acid $SeO_3^{2-}$) contained in the charged dust reacts with the Se elution preventive agent ($FeCl_3$ or $Fe_2(SO_4)_3$) as shown in the following reaction formulas 1, 2, or 3, 4, and is made insoluble in a form of iron selenite ($Fe_2(SeO_3)_3$).

When hexavalent Se (main form: selenic acid $SeO_4^{2-}$) is present, the reducing agent as mentioned above is charged, and this hexavalent Se reacts with the reducing agent to be tetravalent Se, which similarly reacts as shown in the following reaction formulas 1, 2, or 3, 4 to be insoluble.

$$FeCl_3 \rightarrow Fe^{3+} + 3Cl^- \qquad (1)$$

$$2Fe^{3+} + 3SeO_3^{2-} \rightarrow Fe_2(SeO_3)_3 \downarrow \qquad (2)$$

or $$Fe_2(SO_4)_3 \rightarrow 2Fe^{3+} + 3SO_4^{2-} \qquad (3)$$

$$2Fe^{3+} + 3SeO_3^{2-} \rightarrow Fe_2(SeO_3)_3 \downarrow \qquad (4)$$

Accordingly, most of Se is made insoluble and mixed in the scale dust E as iron selenite. Therefore, if the scale dust E may be directly discarded in the ash disposal yard, the elution standard can be satisfied. Besides, the dusts B1, B2 separated and collected from the specific hoppers 231, 232 of the electrostatic precipitator 222 are low in Se concentration, and if directly discharged in the ash disposal yard, the elution standard is satisfied.

As described herein, according to the combustion exhaust gas treatment system of embodiment 1, without requiring complicated aftertreatment of the prior art, the Se in combustion exhaust gas can be removed together with dust, and finally most of it is made insoluble and present in the scale dust E so as to be discarded directly. Still more, because of the constitution for adding a humidifying liquid to mix the dust and Se elution preventive agent, and forming into scale, as compared with the constitution for forming the dust into slurry, mixing insoluble treating agent, and separating into solid and liquid to discard, it does not require large-scale equipment or facility such as wastewater (filtrate) treatment apparatus and solid-liquid separator, and handling of dust in waste disposal is much easier. If not particularly needed in waste disposal, the scale forming process may be omitted, so that the system may be further simplified.

In this case, moreover, only the dust B3, B4 separated and collected from the specific hoppers 233, 234 at the outlet side of the combustion exhaust gas are presented to Se insoluble treatment, and therefore the required amount of Se elution preventive agent C, and required capacity of the mixer 225 (mixing means) and briquetting machine 226 (scale forming means) can be reduced, and the Se is made harmless more easily and inexpensively. That is, as mentioned above, since more Se is contained (deposited) on the dust (ash) of smaller particle size separated and collected from the specific recovery unit at the outlet side, only by applying the insoluble treatment on the dust of smaller particle size, the Se is made harmless on the whole, thereby contributing to reduction of facility cost and running cost.

The result of dust collecting experiment by using the electrostatic precipitator in the system of FIG. 7 is described below. In the experiment, coal containing 3 mg/kg of Se was supplied in a combustion furnace at a rate of 25 kg/h, and combustion exhaust gas exhausted from the combustion furnace at a rate of 200 m³ N/h was cooled to 150° C., and fed into the electrostatic precipitator. In this case, more than 99% of the dust was captured by the electrostatic precipitator (Se capturing rate about 99.4%), and the total amount of dust collected from the hoppers was 3.4 kg/h. The discharge amount of dust (collected ash) collected from the hoppers 231, 232, or 233, 234, the mean particle size, and eluting Se concentration are shown in Table 7. Herein, the eluting Se concentration refers to the concentration of Se in the dust analyzed according to the elution test and atomic absorption method conforming to the ordinance No. 13 of Environmental Agency of Japan, and it shows the amount of Se contained in the dust and eluting in the elution test.

TABLE 7

| Item | Collected Ash | |
| --- | --- | --- |
| | Collected ash discharged from hoppers 231, 232 (combustion exhaust gas inlet side) | Collected ash discharged from hoppers 233, 234 (combustion exhaust gas outlet side) |
| Discharge amount (kg/h) | 2.27 | 1.14 |
| Mean particle size of collected ash (μm) | 12 | 5 |
| Selenium eluting concentration in collected ash (mg/liter) | 0.20 | 0.49 |

More specifically, the discharge amount of the dust B3, B4 separated and collected from the hoppers 233, 234 at the outlet side of the combustion exhaust gas was slight, 1.14 kg/h, but the eluting Se concentration was 0.49 mg/liter, high above the landfill standard (0.3 mg/liter). On the other hand, the discharge amount of the dust B1, B2 separated and collected from the hoppers 231, 232 at the inlet side of combustion exhaust gas was large, 2.27 kg/h, but the eluting Se concentration was 0.20 mg/liter, far below the standard. Accordingly, it is known that the dust B1, B2 separated and collected from the hoppers 231, 232 at the inlet side of the combustion exhaust gas can be directly discarded. That is, Se insoluble treatment is not needed in the dust at the inlet side of the combustion exhaust gas which is about twice larger in the discharge amount, and hence it is evident that the required amount of the Se elution preventive agent C and the required capacity of the mixer 225 can be substantially saved.

Incidentally, such difference in eluting Se concentration is regarded to be due to the particle size of dust (ash). That is, when gaseous Se ($SeO_2$) is condensed and deposits on the surface of the ash forming the dust, ash of smaller particle size is greater in the specific surface area per unit weight, and hence more Se deposits. On the other hand, in the dust collector such as the electrostatic precipitator mentioned above, coarse ash particles are likely to be captured at the inlet side of the combustion exhaust gas, and fine ash particles are likely to be captured at the outlet side of the combustion exhaust gas, and in other words there is a sorting function, and it is hence considered that the eluting Se concentration is high in the dust captured at the outlet side of the combustion exhaust gas.

Embodiment 2

As other embodiment of the second invention, embodiment 2 is described below. Same constituent elements as in embodiment 1 are identified with same reference numerals and their explanations are omitted.

Figure 8:
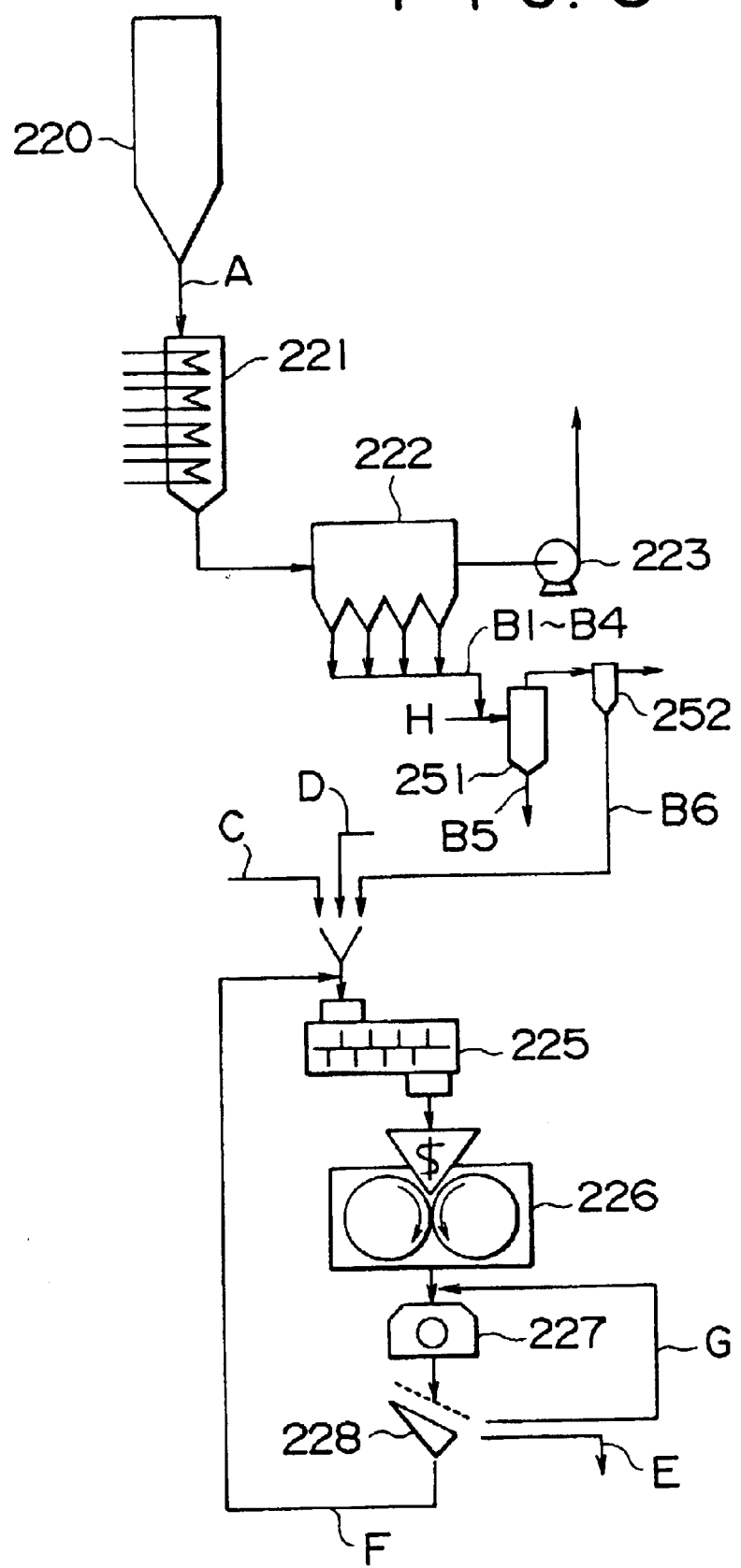
FIG. 8 is a diagram showing an essential constitution of a combustion exhaust gas treatment system in embodiment 2 of the second invention.

FIG. 8 shows an essential structure of a combustion exhaust gas treatment system of embodiment 2. The combustion exhaust gas treatment system of this embodiment comprises a sorter 251 (sorting means) for classifying the dust B1 to B4 captured by the electrostatic precipitator 222 and conveyed in batch into large particle size (coarse ash) B5 and small particle size (fine ash) B6, and only fine ash B6 sorted by the sorter 251 is captured by a fine particle capturing apparatus 252, and fed into a mixer 225 to make Se insoluble. In this case, the dust B1 to B4 conveyed in batch are conveyed by air H and led into the sorter 251. The sorter 251 may be constituted by, for example, a cyclone, and it is convenient when it is designed to adjust the degree of sorting. As the fine particle capturing apparatus 252, in this case, a bag filter is used.

In this case, only the fine ash B6 is subjected to Se insoluble treatment, and same as in embodiment 1, therefore, the required amount of Se elution preventive agent C and required capacity of mixer 225 can be reduced, so that the Se may be made harmless more easily and inexpensively.

In this combustion exhaust gas treatment system, only by adding the mixer 225 and sorter 251 to the conventional combustion exhaust gas treatment system shown in FIGS. 24 to 26, the system can be realized, while the conveyor and other structures for conveying the dust captured by the electrostatic capacitor 222 may be the same, and the Se in the combustion exhaust gas is made harmless, and modification of the existing combustion exhaust gas treatment system is easy, and when newly installing this system, the conventional design or equipment may be used as it is.

The result of dust collecting experiment by the electrostatic precipitator in the structure of the system in FIG. 8 is described below. In the experiment, coal containing 3 mg/kg of Se was supplied into a combustion furnace at a rate of 25 kg/h, and the combustion exhaust gas exhausted from the combustion furnace at a rate of 200 m³ N/h was cooled to 150° C. and fed into the electrostatic precipitator. In this case, more than 99% of the dust was captured by the electrostatic precipitator, and the total amount of dust collected from the hoppers was 3.4 kg/h. The capturing amount of coarse ash B5 and fine ash B6, mean particle size, and eluting Se concentration are shown in Table 8.

TABLE 8

| Item | Collected ash | |
| --- | --- | --- |
| | Coarse ash B5 | Fine ash B6 |
| Capturing amount kg/h | 2.05 | 1.30 |
| Mean particle size of captured ash μm | 13 | 5.4 |
| Eluting selenium concentration in captured ash mg/liter | 0.26 | 0.36 |

That is, in the fine ash B6, the mean particle size was 5.4 μm, and the capturing amount was small, 1.30 kg/h, but the eluting Se concentration exceeded the standard, 0.36 mg/liter. In coarse ash B5, the mean particle size was 13 μm, the capturing amount was large, 2.05 kg/h, but the eluting Se concentration was below the standard, 0.26 mg/liter. Accordingly, it is known that the coarse ash B5 can be directly discarded. Hence, Se insoluble treatment is not needed in the coarse ash B5 which is very large in output, and it is evident that the required amount of Se elution preventive agent C and required capacity of the mixer 225 can be saved substantially.

The second invention may be realized also in other various forms than the illustrated embodiments. For example, as the Se elution preventive agent, aside from $FeCl_3$ or $Fe_2(SO_4)_3$, chelating agents (e.g. Miyoshi Resin Epolus MX-7), and high polymer heavy metal capturing agents (e.g. Miyoshi Resin Epofloc L-1) can be used. The dust collecting means and sorting means of the invention are not limited to the electrostatic precipitator and single cyclone connected thereto, but the dust collecting means and sorting means of the invention may be realized, for example, by multiple cyclones.

The combustion exhaust gas treatment system of the second invention may be incorporated in part of the combustion exhaust gas treatment system having a conventional desulfurization apparatus. For example, in embodiment 1, the desulfurization apparatus for removing sulfurous acid from the combustion exhaust gas sent by the fan 223 may be provided, for example, as in the prior art shown in FIGS. 24 to 26. Besides, the conventional air heater or gas-gas heater may be used as the cooling means of the second invention.

Moreover, all of the dust separated and collected by the electrostatic precipitator 222 may be treated by introducing into the mixer 225 (mixing means).

Effects of the Second Invention

According to the combustion exhaust gas treatment system of the second invention, most of Se in combustion exhaust gas is cooled by the cooling means and condensed, and is removed by the dust collecting means in a state being contained in the dust. To the dust separated by the dust collecting means, Se elution preventive agent and humidifying liquid or a solution of Se elution preventive agent is added by the mixing means, and the existent form of Se in the dust is transformed into an insoluble compound. Accordingly, if the dust is discarded same as in the prior art, the Se elution standard is satisfied, and Se is made harmless easily without requiring complicated aftertreatment. Moreover, by adding the humidifying liquid and Se elution preventive agent, or spraying a solution of Se elution preventive agent to mix with the dust, and forming the dust into scale, as compared with the case of forming the dust into slurry, mixing Se insoluble treating agent, and separating into solid and liquid to discard, it does not require large scale equipment or facility such as wastewater (filtrate) treating facility or solid-liquid separator, and handling is much easier in waste disposal of dust.

Also by feeding only the dust separated and collected from the specific recovery unit at the outlet side of the combustion exhaust gas in the dust collecting means or the dust of small particle size sorted by the sorting means into the mixing means to make insoluble, the required amount of Se elution preventive agent and required capacity of the mixing means and scale forming means can be reduced, and the Se is made harmless more easily and economically.

C: Third Invention

Embodiments of the third invention is described below while referring to the accompanying drawings.

Embodiment 1

Figure 9:
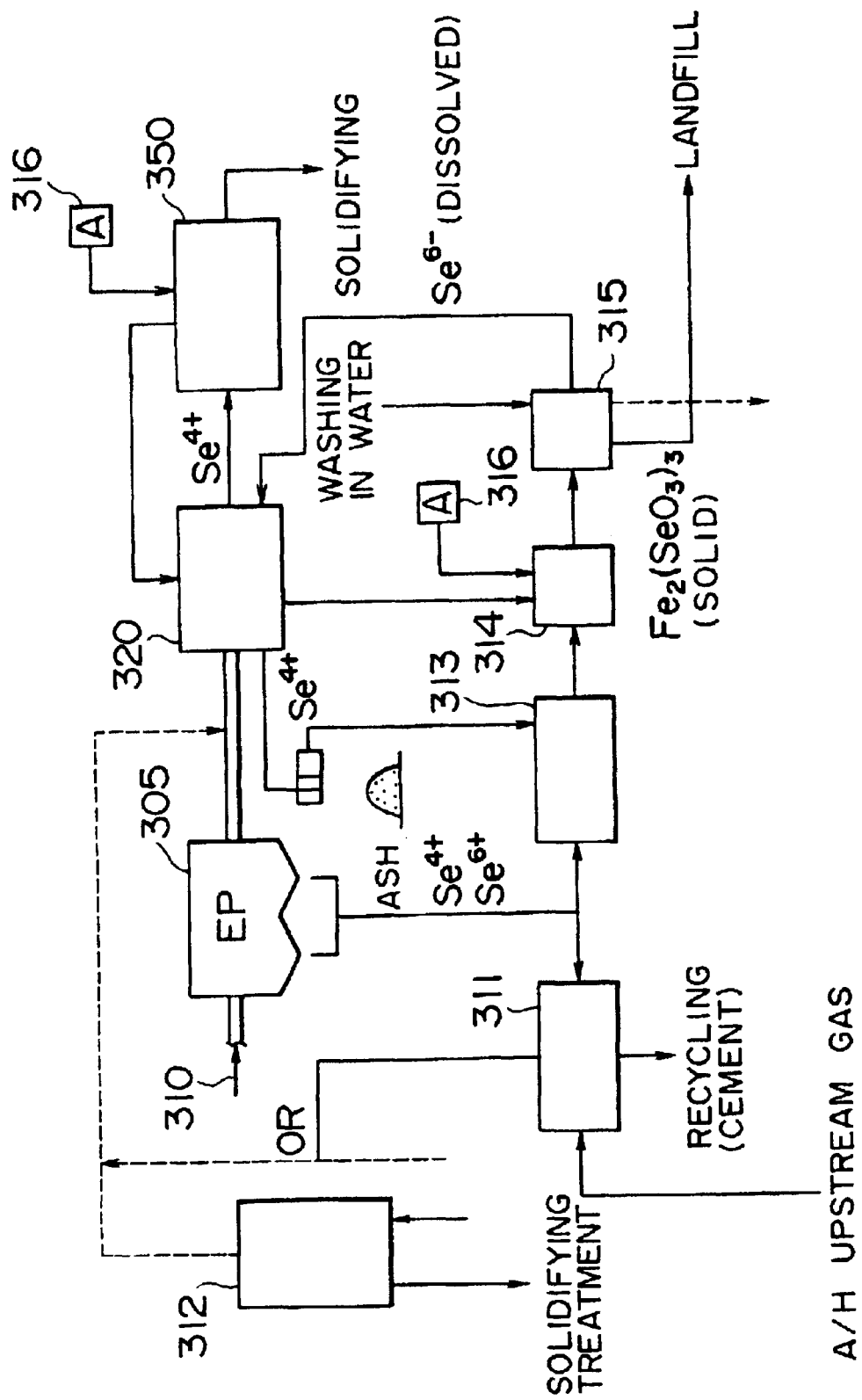
FIG. 9 is a schematic structural diagram of a combustion exhaust gas treatment system in embodiment 1 of the third invention.
Figure 10:
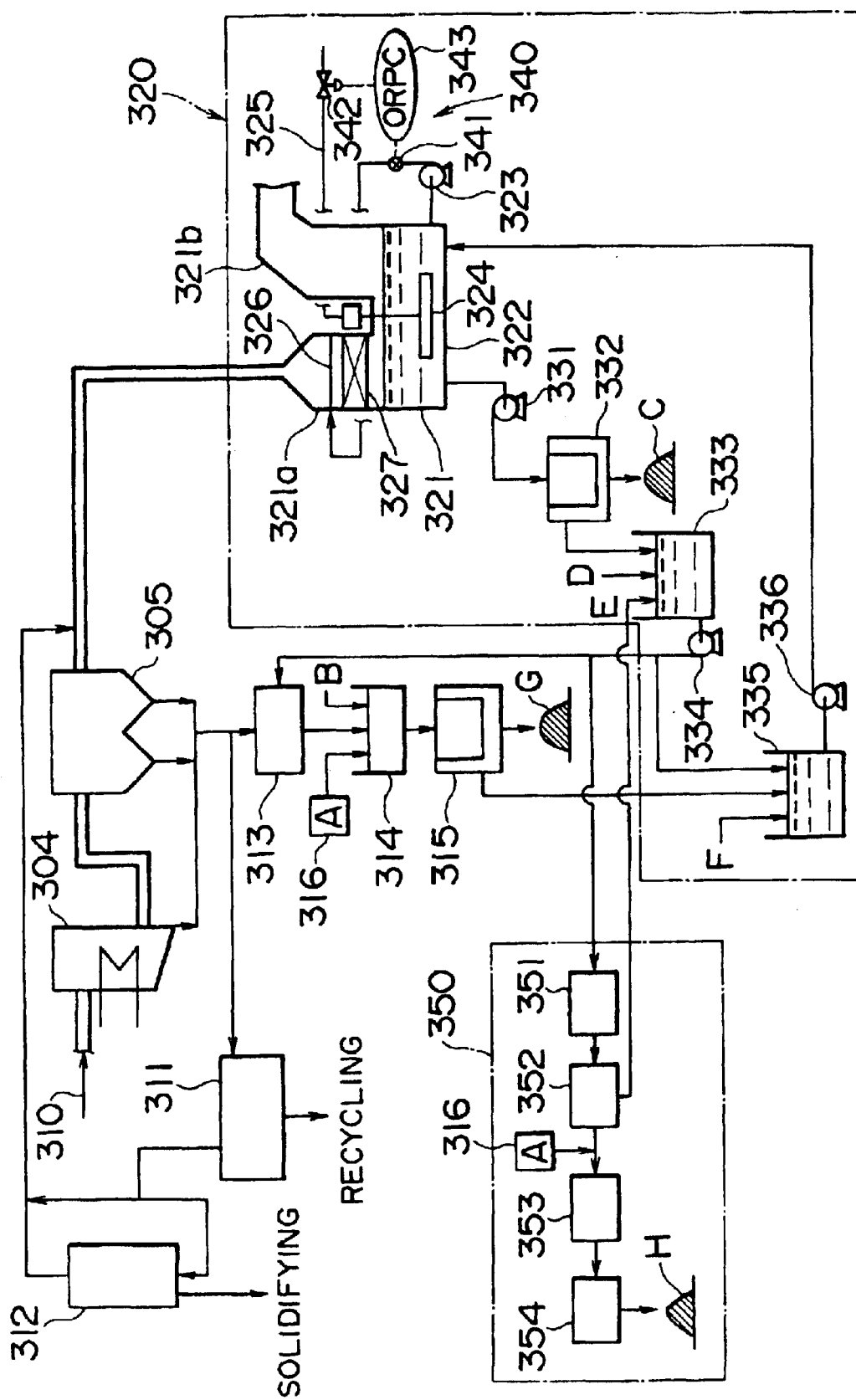
FIG. 10 is a more specific structural diagram of the constitution of the combustion exhaust gas treatment system in FIG. 1.

FIG. 9 is a schematic structural (principle) diagram showing an example of a combustion exhaust gas treatment system of the third invention (1) to (3), (6) and (9), and FIG. 10 is a structural diagram specifically showing the constitution of the combustion exhaust gas treatment system. In the following explanation, the combustion exhaust gas to be treated is supposed to contain both hexavalent Se and tetravalent Se.

In the combustion exhaust gas treatment system in the embodiment, as shown in FIG. 9, dust containing Se is removed from the combustion exhaust gas 310 by an electrostatic precipitator 305, and part of the dust (ash) removed by the electrostatic precipitator 305 is heated by heating means 311 making use of upstream gas of air heater or the like to sublimate Se in the dust (hexavalent Se and tetravalent Se), thereby adsorbing in an adsorption column 312.

On the other hand, the remaining dust is repulped (dissolved in water) by the liquid from a wet desulfurization apparatus 320 (ORP control: hereinafter desulfurization apparatus 320) by repulping means 313, and formed into slurry, and a treating agent A (such as $FeCl_3$) from treating agent feeding means 316 is charged by mixing means 314, and by separating into solid and liquid in separating means 315, tetravalent Se is solidified and separated into the solid-phase side. On the other hand, hexavalent Se dissolved in the liquid-phase side in the separating means 315 is led into the desulfurization apparatus 320, and nearly the whole volume is reduced by the so-called ORP control (oxidation-reduction potential control) to be transformed into tetravalent Se, thereby facilitating the treatment by making wastewater-free in the wastewater treating apparatus 350.

The heating means 311 is designed to heat the ash introduced from the electrostatic precipitator 305 up to a temperature for sublimating and gasifying hexavalent Se and tetravalent Se (100 to 1200° C., preferably 320 to 1000° C.), and part of produced gas is led into the absorption column 312, and the rest is sent into the combustion exhaust gas feed-in side of the desulfurization apparatus 320. The ash left over in the heating means 311 is deprived of Se components, and is recycled as cement material. The, adsorption column 312 is designed to absorb and capture part of Se in the produced gas from the heating means 311 so as to be solidified, and herein the gas containing Se which is not adsorbed is sent into the combustion exhaust gas feed-in side of the desulfurization apparatus 320.

To the repulping means 313, as shown in FIG. 10, the liquid in a filtrate tank 333 is supplied by means of a pump 334 of the desulfurization apparatus 320, and the dust introduced from the electrostatic precipitator 305 is made into slurry by this liquid. The mixing means 314 is, for example, composed of a mixing tank and an agitating mechanism for agitating the liquid in the mixing tank, and the dust slurry formed by the repulsing means 313, the treating agent A from the treating agent feeding means 316, and, if necessary, a filter additive B are charged, and they are mixed and sent into the separating means 315 at the downstream side. As the treating agent A, a chemical reacting at least with tetravalent Se (main form: selenious acid $SeO_3^{2-}$) to make insoluble is needed, and, for example, $FeCl_3$ or $Fe_2(SO_4)_3$ may be used. As the filter additive B, a chemical large in particle size and having a function for supporting solid-liquid separation is desired, and, for example, gypsum (gypsum C produced in the desulfurization apparatus 320) may be used. The separating means 315 is, for example, a centrifugal setting machine, and, in this case, only the filtrate is returned to the absorbent slurry column 335 of the desulfurization apparatus 320.

The desulfurization apparatus 320 is of tank oxidation type, and comprises an absorption column 321 for feeding an absorbent slurry (composed of limestone in this example) into a bottom tank 322, a circulation pump 323 for sending the absorbent slurry in the tank 322 into an upper part 321a (combustion exhaust gas feed-in unit) of the absorption tank 321 to contact with the combustion exhaust gas, a rotary arm type air sparger 324 supported in the tank 322 for rotation horizontally by means of a motor not shown, and agitating the slurry in the tank 322 and blowing in the supplied aid efficiently into the tank 322 as fine bubbles, and an air feed tube 325 for feeding air into this air sparger 324, and it is designed to obtain gypsum by totally oxidizing by efficient contact between air and the absorbent slurry absorbing sulfurous acid in the tank 322.

A slurry pump 331 for sucking out the slurry in the tank 322 is connected to the tank 322, and the slurry sucked out by this slurry pump 331 is concentrated through a thickener not shown, and is supplied into the solid-liquid separator 332 to be filtered, and the gypsum C in the slurry is taken out as solid cake (usually water content of about 10%). On the other hand, the separated water by the thickener and the filtrate (mainly water) from the solid-liquid separator 332 are once sent into the filtrate tank 333, and, as required, makeup water D or return liquid E from the wastewater treating apparatus 350 is added, and part of such liquid is sent into the absorbent slurry tank 335 by a pump 334, and mixed with limestone F ($CaCO_3$) supplied from a limestone silo not shown to be formed into an absorbent slurry, which is supplied again into the tank 322 by a slurry pump 336.

The desulfurization apparatus 320 is further provided with, as a preferred embodiment of the third invention, oxidation-reduction reaction control means 340 for controlling the oxidation-reduction reaction in the absorption column 321. This oxidation-reduction reaction control means 340 is composed of a sensor 341 disposed in the discharge side piping of the circulation pump 323 for detecting the oxidation-reduction potential of the slurry in the tank 322, a flow rate control valve 342 disposed in the midst of the air feed tube 325 for adjusting the air feed rate into the air sparger 324, and a controller 343 for controlling the action of the flow rate control valve 342 on the basis of the detection output of the sensor 341. Herein, the sensor 341 is composed by immersing an electrode, for example, made of platinum into slurry. The controller 343 is designed to control the opening degree of the flow rate control valve 342 continuously, so that the air feed rate into the air sparger 324 may be a minimum required limit for oxidizing and digesting the sulfurous acid dissolved in the slurry from the combustion exhaust gas. For example, more specifically, on the basis of the correlation of the concentration of sulfurous acid and oxidation-reduction potential, the oxidation-reduction potential when the concentration of sulfurous acid is nearly zero is predetermined as the reference potential, and, by proportional control, when the oxidation-reduction potential detected by the sensor 341 becomes lower than this reference potential, the air feed rate is increased according to the deviation, and when the oxidation-reduction potential detected by the sensor 341 becomes higher than this reference potential, the air feed rate is decreased according to the deviation.

Incidentally, since the oxidation-reduction reaction control means 340 is designed to feed a minimum required limit for oxidizing the total volume of sulfurous acid, it eventually has a function of inducing a newly total reduction reaction of the other acids contained in the slurry by the sulfurous acid.

That is, in this case, as mentioned later, the slurry supplied into the tank 322 from the absorbent slurry tank 335 contains hexavalent Se (main form: selenic acid $SeO_4^{2-}$), but by the control of the controller 343, it reacts with the sulfurous acid absorbed from the combustion exhaust gas to undergo reduction reaction to be transformed into tetravalent Se (main form: selenious acid $SeO_3^{2-}$), which takes place in the absorption column 321. This reaction is expressed in the following reaction formula (5).

$$SeO_4^{2-}+SO_3^{2-}\rightarrow SeO_3^{2-}+SO_4^{2-} \tag{5}$$

In this embodiment, the wastewater treating apparatus 350 is a so-called wastewater-free treating apparatus in a known constitution comprising a pretreatment facility 351, an electric dialysis facility 352, a secondary concentrating facility 353, and a solidifying facility 354. In this wastewater treating apparatus 350, part of the liquid in the filtrate tank 333 is supplied by the pump 334 of the desulfurization apparatus 320, and impurities in this liquid (for example, Se and Cl) are removed mainly by the function of the electric dialysis facility 352, and the residue after removal is returned to the filtrate tank 333 or absorbent slurry tank 335 of the desulfurization apparatus 320. The removed impurities are finally solidified in the solidifying facility 354, but at least prior to the solidifying process (for example, at a prior stage of the secondary concentrating facility 353), the treating agent A for reacting with tetravalent Se (main form: selenious acid $SeO_3^{2-}$) to make it insoluble is mixed into the removed impurities from the treating agent feeding means 316.

In thus constituted combustion exhaust gas treatment system, first, the sulfurous acid in the combustion exhaust gas after removing the dust, and gasified Se are removed, and gypsum is produced and collected in the following procedure.

That is, the combustion exhaust gas introduced into the absorption column 321 (including the gas sent from the heating means 311) contacts with the absorbent slurry sprayed form a header pipe 326 by the circulation pump 323, and the sulfurous acid and gasified Se are absorbed and removed, and discharged as treated combustion exhaust gas from a combustion exhaust gas lead-out unit 321b.

The sulfurous acid absorbed in the absorbent slurry sprayed from the header pipe 326 and flowing down through a filler 327 is agitated by the air sparger 324 in the tank 322, and contacts with multiple bubbles to be oxidized, and further undergoes neutralization reaction to become gypsum. In the absorption column 321, by the reaction in the reaction formula (5), nearly whole volume of hexavalent Se (main form: selenic acid $SeO_4^{2-}$) is transformed into tetravalent Se (main form: selenious acid $SeO_3^{2-}$). Principal reactions taking place in this process (other than reaction formula (5) are expressed in reaction formulas (6) to (8).

Absorption Column Combustion Exhaust Gas Lead-in Part $$SO_2+H_2O\rightarrow H^++HSO_3^- \tag{6}$$

Tank $$H^++HSO_3^-+1/2O_2\rightarrow 2H^++SO_4^{2-} \tag{7}$$

$$2H^++SO_4^{2-}+CaCO_3+H_2O\rightarrow CaSO_4\cdot 2H_2O + CO_2 \tag{8}$$

Thus, in the tank 322, gypsum ($CaSO_4\cdot 2H_2O$), a slight amount of limestone ($CaCO_3$), and tetravalent Se (main form: selenious acid $SeO_3^{2-}$) are suspended or dissolved, and they are sucked out by the slurry pump 331, and concentrated through a thickener not shown, and supplied into the solid-liquid separator 332 to be filtered, and gypsum C is obtained in a cake form of low water content (usually water content about 10%). At this time, meanwhile, tetravalent Se (main form: selenious acid $SeO_3^{2-}$), if not dissolved partly, may be slightly separated and mixed into the gypsum C, but is mostly sent into the filtrate tank 333 together with the separated water or filtrate.

Consequently, the dust removal treatment in the combustion exhaust gas and the treating action of Se contained much in the dust in this combustion exhaust gas treatment system are explained below.

Part of dust (ash) removed by the electrostatic precipitator 305 is heated by the heating means 311 to be gasified, and is partly adsorbed and solidified as mentioned above, while the rest is sent and treated in the absorption column 321 of the desulfurization apparatus 320. On the other hand, the remainder of the dust removed by the electrostatic precipitator 305 is repulped (dissolved in water) in the liquid sent from the filtrate tank 333 of the desulfurization apparatus 320 by the repulping means 313 to be formed into slurry, and treating agent A and, if necessary, filter additive B are added and mixed by the mixing means 314.

At this time, in the mixing means 314, the tetravalent Se (main form: selenious acid $SeO_3^{2-}$) contained in the slurry formed by the repulping means 313 (dust slurry) reacts with the treating agent A (e.g. $FeCl_3$ or $Fe_2(SO_4)_3$) in the following reaction formulas (1), (2), or (3), (4), and becomes insoluble in a form of iron selenite ($Fe_2(SeO_3)_3$).

$$FeCl_3 \rightarrow Fe_3 + + 3Cl^- \quad (1)$$

$$2Fe^{3+} + 3SeO_3^{2+} \rightarrow Fe_2(SeO_3)_3 \downarrow \quad (2)$$

or $$Fe_2(SO_4)_3 \rightarrow 2Fe^{3+} + 3SO_4^{2-} \quad (3)$$

$$2Fe^{3+} + 3SeO_3^{2+} \rightarrow Fe_2(SeO_3)_3 \downarrow \quad (4)$$

Accordingly, when the dust slurry is separated into solid and liquid by the separating means 315, the tetravalent Se is separated in the solid-phase side as iron selenite, and mixed in insoluble form into the dust cake G discharged from the separating means 315. On the other hand, the hexavalent Se in the dust slurry is dissolved in the liquid-phase side and is contained in the filtrate, and is mixed, in this case, into the absorbent slurry tank 335 of the desulfurization apparatus 320. In the separating means 315, by the function of the filter additive B (gypsum, etc.) charged in the mixing means 314, effective dehydration is realized, and a low water content in the dust cake G is achieved. At the same time, the hexavalent Se contained in the filtrate in the separating means 315 and mixed in the adsorbent slurry tank 335 of the desulfurization apparatus 320 is also contained in the absorbent slurry and sent into the absorption column 321 of the desulfurization apparatus 320 with the pump 336, and therefore almost all volume thereof is transformed into tetravalent Se in the reaction (reaction formula (5).

The function of the wastewater treating apparatus 350 in this combustion exhaust gas treatment system is described below. As mentioned above, mainly hexavalent Se is sequentially mixed into the slurry solution circulating in the desulfurization apparatus 320 as being contained in the separated water of the dust slurry, and when this hexavalent Se enters the absorption column 321, it is almost completely transformed into tetravalent Se by the above reaction (reaction formula 5), and in stationary state, therefore, much tetravalent Se mainly formed by reduction of hexavalent Se is present in the slurry solution circulating in the desulfurization apparatus 320. In this case, the wastewater treating apparatus 350 functions to remove this tetravalent Se, like other impurities (e.g. Cl), so as not to be accumulated excessively in the slurry solution circulating in the desulfurization apparatus 320.

That is, in the wastewater treating apparatus 350, part of the slurry solution circulating in the desulfurization apparatus 320 is extracted from the discharge side of the pump 334, and the impurities in this solution (Se, Cl, etc.) are removed mainly by the function of the electric dialysis facility 352, and returned to the filtrate tank 333 of the desulfurization apparatus 320. The removed impurities are mixed with the treating agent A charged from the treating agent feeding means 316, and concentrated in the secondary concentration apparatus 353, solidified by the solidifying facility 354, and discarded in the ash disposal yard or the like as impurity chip H. At this time, the tetravalent Se in the impurities reacts with the treating agent A in the formulas (1), (2), or (3), (4), and is transformed into iron selenite ($Fe_2(SeO_3)_3$), and is present in an insoluble form in the impurity chip H.

As described herein, according to the combustion exhaust gas treatment system of the embodiment, together with the conventional purification of combustion exhaust gas (removal of dust, removal of sulfurous acid), Se in the combustion exhaust gas is removed along with dust, and finally it is contained, in an insoluble form, in the dust cake G or impurity chip H, so as to be discarded. Moreover, hexavalent Se which is hard to be treated (made insoluble) is transformed into tetravalent Se which is easy to discard, by the treating agent by the oxidation-reduction reaction control means 340 in the absorption column 321 of the desulfurization apparatus 320, and therefore, as compared with the system comprising an independent reaction column for transforming hexavalent Se into tetravalent Se, for example, Se in combustion exhaust gas may be removed and made harmless easily and inexpensively.

Still more, as the solvent for repulping the dust captured by the electrostatic precipitator 305 by the repulping means 313, by using part of the circulation liquid of the desulfurization apparatus 320, the water flow (circulation volume) and consumption are saved as compared with the system of feeding water separately into the repulping means 313, and the running cost of the system is curtailed, and at the same time the required capacity of the wastewater treating apparatus 350 is decreased, so that the facility cost may be further reduced.

When the mixing means 314 is designed to charge filter additive B, the dehydration rate is heightened in the separating means 315, and dust cake G of lower water content is formed, so that carrying or handling of dust cake G may be easier.

Moreover, according to this combustion exhaust gas treatment system, by the function of the oxidation-reduction reaction control means 340, nearly all of hexavalent Se is eventually transformed into tetravalent Se, and is made insoluble and discarded, and hence the concentration of hexavalent Se remaining in the dust cake G or impurity chip H (not made insoluble) is very slight, and the elution standard is satisfied with a sufficient margin.

Embodiment 2

Figure 11:
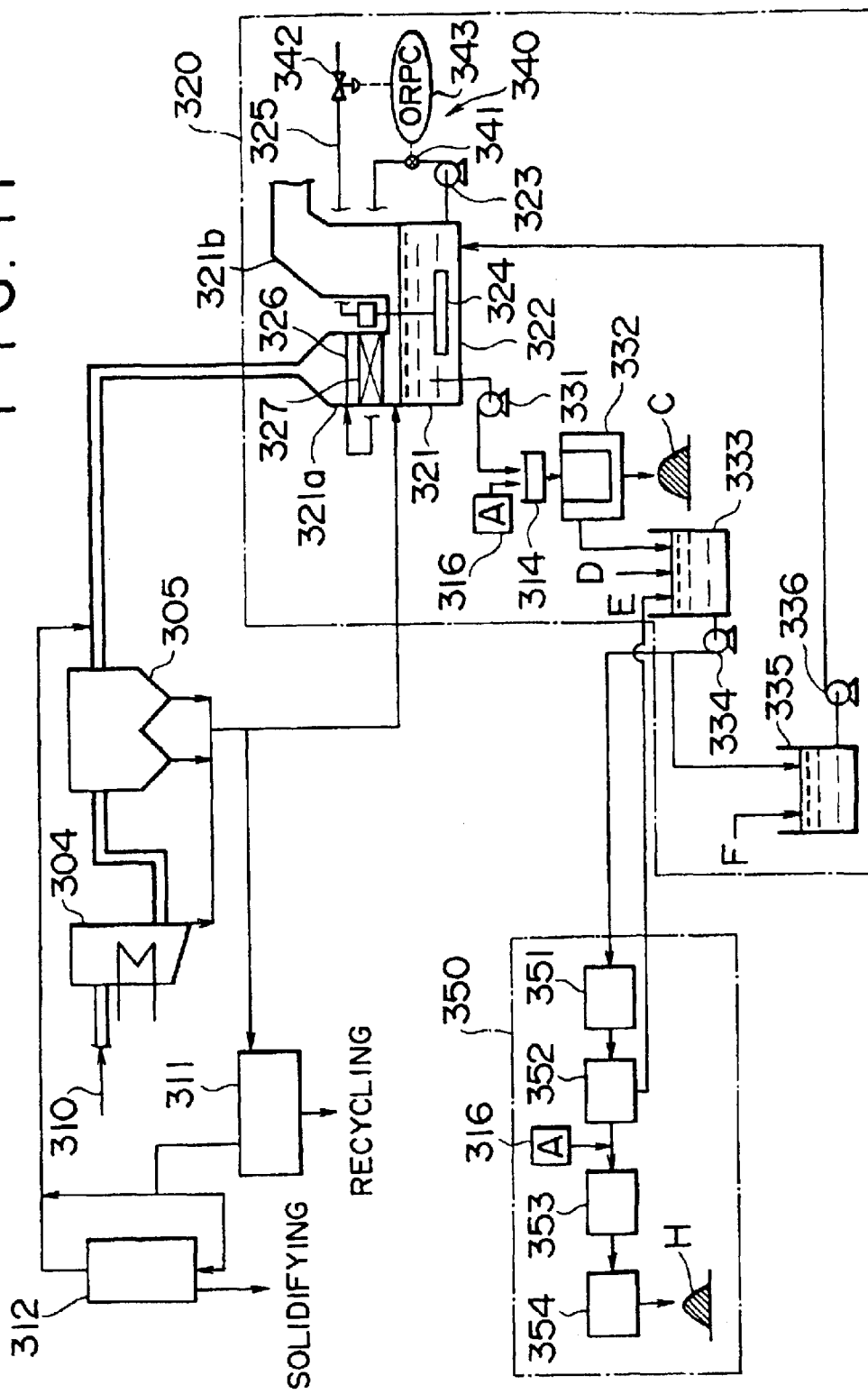
FIG. 11 is a schematic structural diagram of a combustion exhaust gas treatment system in embodiment 2 of the third invention.

FIG. 11 is a schematic structural diagram showing an example of a combustion exhaust gas treatment system of the third invention (4) and (9). Same constituent elements as in embodiment 1 are identified with same reference numerals, and their explanations are omitted. In the combustion exhaust gas treatment system of the embodiment, as shown in FIG. 11, the dust captured by the electrostatic precipitator 305 is directly introduced into the absorption column 321 of the desulfurization apparatus 320, and the treating agent A is charged into the slurry extracted from the absorption column 321 of the desulfurization apparatus 320 by the treating agent feeding means 316 in the mixing means 314.

In this case, all Se in the dust once enters the absorption column 321 except for the portion extracted by the heating means 311, and in the absorption column 321, too, the hexavalent Se is transformed into tetravalent Se, and this tetravalent Se is made insoluble by the treating agent A, and is mixed into the gypsum C or the impurity chip H in the wastewater treating apparatus 350. Herein, the absorption column 321 also functions as the repulping means 313 in embodiment 1 and the solid-liquid separator 332 also functions as the separating means 315 in embodiment 1, and as compared with the system in embodiment 1, therefore, the repulsing means 313 and separating means 315 are not necessary, thereby contributing further to reduction of the facility cost.

In this embodiment, meanwhile, although the cost may be further saved as compared with embodiment 1, but due to the effect of massive dust (impurities) mixing into the absorption column, it may be difficult to keep a high desulfurization rate or high quality of gypsum C, and where this problem is feared, embodiment 1 or embodiment 4 or 5 mentioned later may be preferable, and in this respect the constitution of embodiment 1 is superior. Incidentally, the treating agent A may be mixed into other position than the position shown in FIG. 11, as far as within the slurry system of the desulfurization apparatus 320, or may be directly mixed into the absorption column 321.

Embodiment 3

Figure 12:
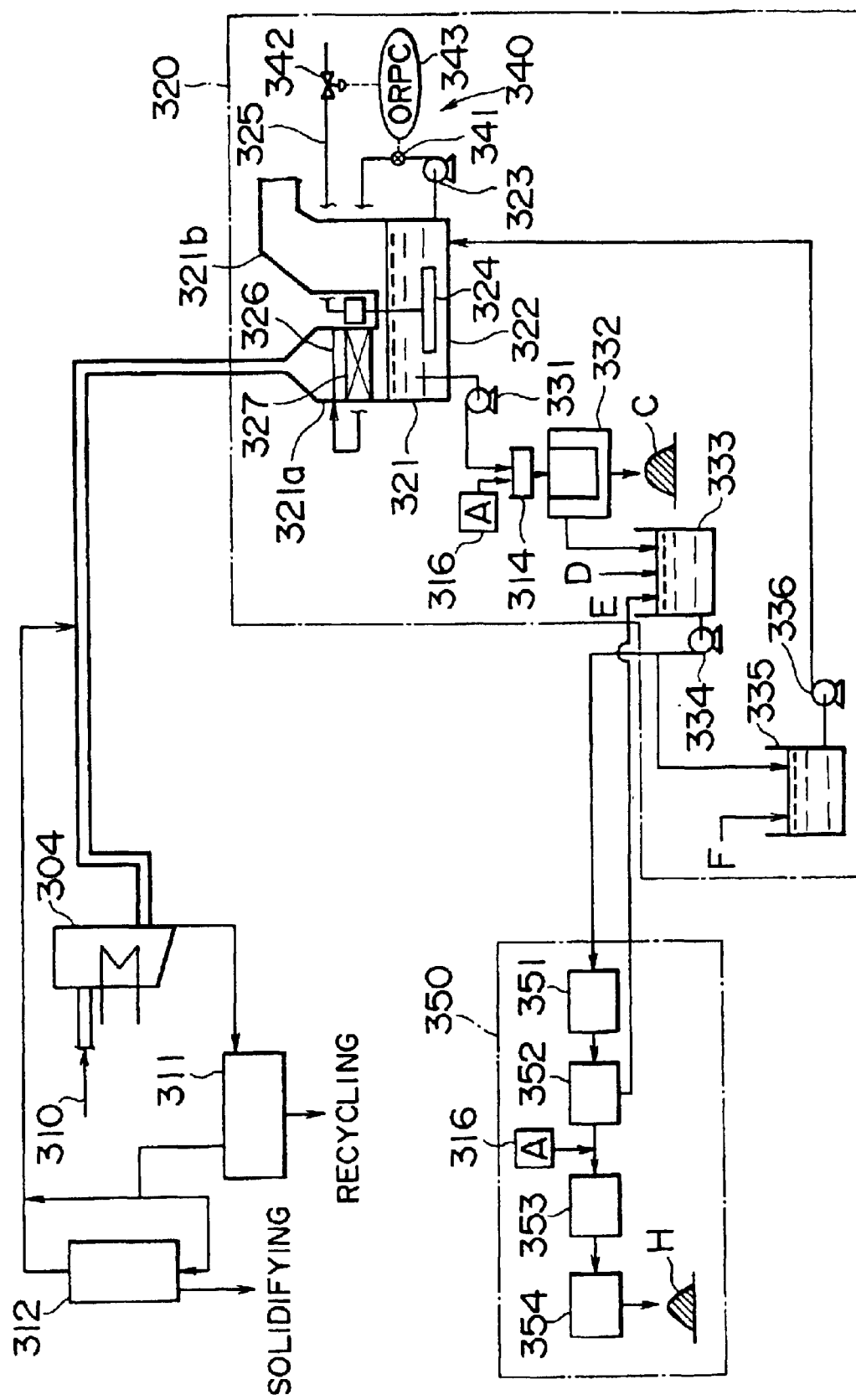
FIG. 12 is a schematic structural diagram of a combustion exhaust gas treatment system in embodiment 3 of the third invention.

FIG. 12 is a schematic structural diagram showing an example of a combustion exhaust gas treatment system of the third invention (5) and (9). Same constituent elements as in embodiment 1 are identified with same reference numerals, and their explanations are omitted. In the combustion exhaust gas treatment system of the embodiment, as shown in FIG. 12, without installing electrostatic precipitator 305, combustion exhaust gas is directly fed into the absorption column 321 of the desulfurization apparatus 320, together with fly ash and dust, and the treating agent A is charged into the slurry extracted from the absorption column 321 of the desulfurization apparatus 320 from the treating agent feeding means 316 in the mixing means 314.

In this case, all Se in the dust once enters the absorption column 321, and in the absorption column 321, the hexavalent Se is transformed into tetravalent Se, and this tetravalent Se is made insoluble by the treating agent A, and is mixed into the gypsum C or the impurity chip H in the wastewater treating apparatus 350. Herein, the absorption column 321 also functions as the electrostatic precipitator 305 and repulping means 313 in embodiment 1, and the solid-liquid separator 332 also functions as the separating means 315 in embodiment 1, and as compared with the system in embodiment 1, therefore, the electrostatic precipitator 305, repulping means 313 and separating means 315 are not necessary, thereby contributing further to reduction of the facility cost.

In this embodiment, meanwhile, although the cost may be further saved as compared with embodiment 1, but due to the effect of massive dust (impurities) mixing into the absorption column, it may be difficult to keep a high desulfurization rate or high quality of gypsum C, and where this problem is feared, embodiment 1 or embodiment 4 or 5 mentioned later may be preferable, and in this respect the constitution of embodiment 1 is superior.

Yet, since the electrostatic precipitator 305 is not provided, the byproduct obtained in the heating means 311 is slight, and where this problem is feared, the constitution of embodiment 1, 2 or 4 may be preferred, and in this respect the constitution of embodiment 1 or other may be superior. In this constitution, too, the mixing position of the treating agent A is not limited to the position shown in FIG. 12, but it may be mixed in any arbitrary position in the slurry system of the desulfurization apparatus 320, or may be directly charged into the absorption column 321.

Embodiment 4

Figure 13:
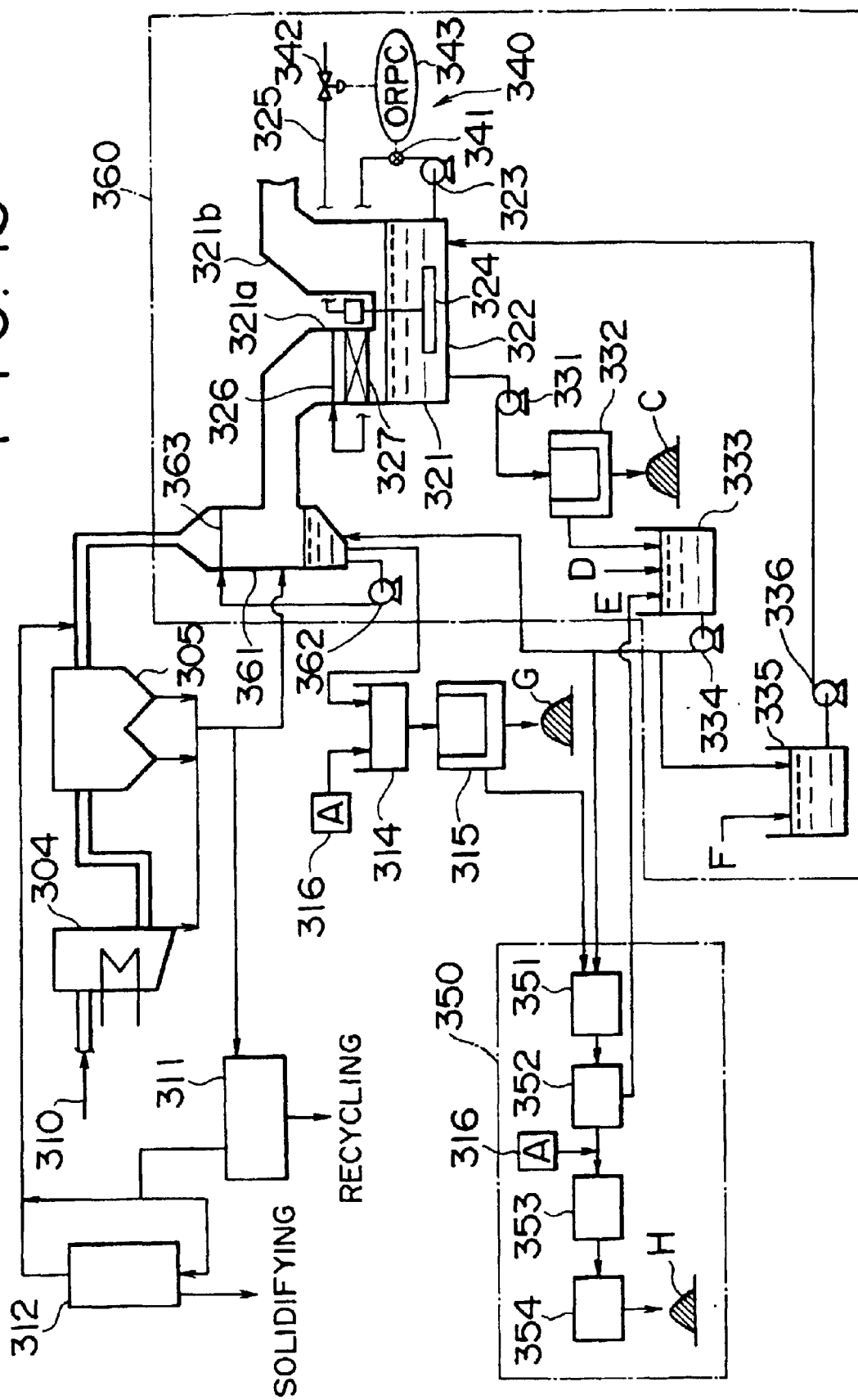
FIG. 13 is a schematic structural diagram of a combustion exhaust gas treatment system in embodiment 4 of the third invention.

FIG. 13 is a schematic structural diagram showing an example of a combustion exhaust gas treatment system of the third invention (7) and (9). Same constituent elements as in embodiment 1 are identified with same reference numerals, and their explanations are omitted. In the combustion exhaust gas treatment system of the embodiment, as shown in FIG. 13, a desulfurization apparatus 360 having a cooling and dust collecting column 361 for cooling the dust and removing dust is disposed at the upstream side of the absorption column 321, and the dust captured by the electrostatic precipitator 305 is directly fed into the cooling and dust collecting column 361 of the desulfurization apparatus 360, while the treating agent A is charged into the slurry extracted from the cooling and dust removing column 361 from the treating agent feeding means 316 in the mixing means 314. Herein, in the cooling and dust collecting column 361, the liquid from the filtrate tank 333 is supplied from-the pump 334, and this liquid is sprayed from an upper header pipe 363 by a circulation pump 362. Between the cooling and dust collecting column 361 and absorption column 321, a mist eliminator, not show, is provided.

In this case, all Se in dust once gets into the cooling and dust removing column 361, and the reaction in (reaction formula (5)) occurs in the cooling and dust collecting column 361, and hexavalent Se is almost totally transformed into tetravalent Se, and this tetravalent Se is made insoluble by the treating agent A, and is mixed into the dust cake G or impurity chip H. Herein, the cooling and dust collecting column 361 also functions as the repulping means 313 in embodiment 1, and therefore the repulping means 313 is not needed as compared with embodiment 1, and the facility cost may be reduced.

In this embodiment, moreover, different from embodiments 1 to 3, massive dust does not mix into the absorption column 321, and therefore the facility cost may be further reduced, and the high desulfurization rate may be kept and gypsum C of high quality may be realized.

In FIG. 13, meanwhile, the separated water of the separating means 315 is directly fed into the wastewater treating apparatus 350, but for further perfect transformation reaction from hexavalent Se into tetravalent Se, the separated water may be fed, for example, into the absorbent slurry tank 335 and then guided into the absorption column 321.

The treating agent A may be also charged directly into the cooling and dust collecting column 361.

Embodiment 5

Figure 14:
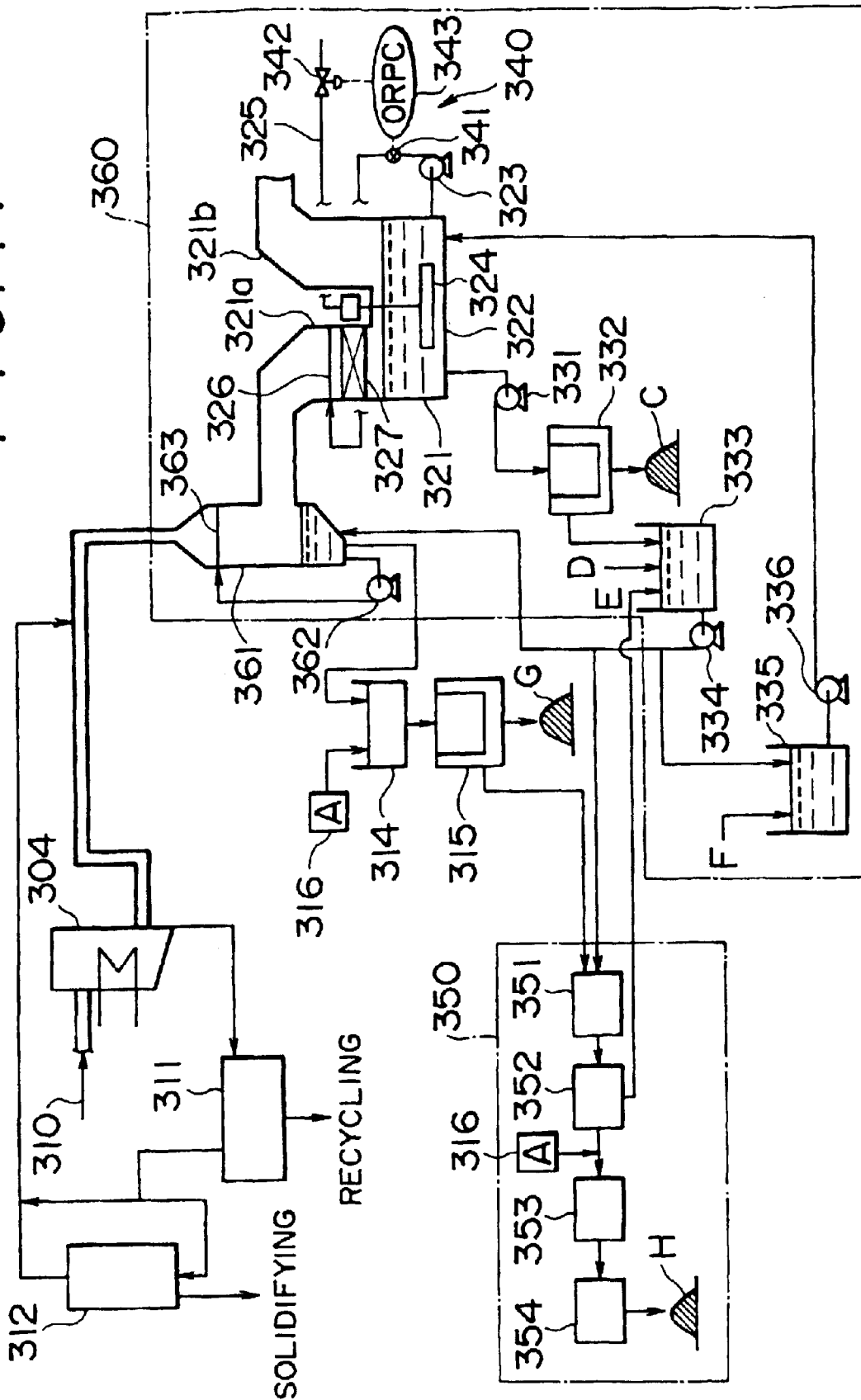
FIG. 14 is a schematic structural diagram of a combustion exhaust gas treatment system in embodiment 5 of the third invention.

FIG. 14 is a schematic structural diagram showing an example of a combustion exhaust gas treatment system of the third invention (8) and (9). Same constituent elements as in embodiment 1 are identified with same reference numerals, and their explanations are omitted. In the combustion exhaust gas treatment system of the embodiment, as shown in FIG. 14, a desulfurization apparatus 360 having a cooling and dust collecting column 361 for cooling the dust and removing dust is disposed at the upstream side of the absorption column 321, and the combustion exhaust gas not being rid of dust is directly fed into the cooling and dust collecting column 361 of the desulfurization apparatus 360, while the treating agent A is charged into the slurry extracted from the cooling and dust removing column 361 from the treating agent feeding means 316 in the mixing means 314.

In this case, all Se in dust once gets into the cooling and dust removing column 361, and the reaction in (reaction formula (5)) occurs in the cooling and dust collecting column 361, and hexavalent Se is almost totally transformed into tetravalent Se, and this tetravalent Se is made insoluble by the treating agent A, and is mixed into the dust cake G or impurity chip H. Herein, the cooling and dust collecting column 361 also functions as the electrostatic precipitator 305 and repulping means 313 in embodiment 1, and therefore the electrostatic precipitator 305 and repulping means 313 are not needed as compared with embodiment 1, and the facility cost may be reduced.

In this embodiment, moreover, different from embodiments 2 and 3, massive dust does not mix into the absorption column 321, and therefore the facility cost may be further reduced, and the high desulfurization rate may be kept and gypsum C of high quality may be realized.

In FIG. 14, meanwhile, the separated water of the separating means 315 is directly fed into the wastewater treating apparatus 350, but for further perfect transformation reaction from hexavalent Se into tetravalent Se, the separated water may be fed, for example, into the absorbent slurry tank 335 and then guided into the absorption column 321.

Yet, since the electrostatic precipitator 305 is not provided, the byproduct obtained in the heating means 311 is slight, and where this problem is feared, the constitution of embodiment 1, 2 or 4 may be preferred, and in this respect the constitution of embodiment 1 or other may be superior.

The third invention may be also realized in many other forms aside from the foregoing embodiments. For example, if hexavalent Se does not exist and only tetravalent Se is present in the combustion exhaust gas, the process or apparatus for reducing hexavalent Se into tetravalent Se is not needed. The process and apparatus for heating and recycling part of the dust removed by the dust collector by heating means may be provided only where necessary.

The constitution of the desulfurization apparatus is not limited to the tank oxidation type shown in the embodiments, and, for example, an oxidation column in which the slurry extracted from the absorption column is fed may be separately installed, and by blowing air into this oxidation column, final oxidation-reduction reaction may be performed herein. In this case, too, hexavalent Se is transformed into tetravalent Se in the absorption column or oxidation column.

The repulping means and mixing means in embodiment 1 are not always required to be composed of independent tank, but, for example, it may be also designed to repulp the dust and mix the treating agent in one tank (that is, the repulping means and mixing means of the invention may be composed of a single tank).

In embodiments 2 to 5, the charging position of the treating agent A may be a position in the wastewater treating apparatus 350. That is, since the slurry liquid in the absorption column or cooling and dust collecting column of the desulfurization apparatus is circulating in the wastewater treating apparatus 350, the entire Se can be made insoluble by charging the treating agent only in the wastewater treating apparatus 350.

Effects of the Third Invention

According to the combustion exhaust gas treatment system of the third invention (1), if hexavalent Se is contained in the combustion exhaust gas, all Se (both hexavalent and tetravalent) removed from the combustion exhaust gas as dust can be finally discharged as tetravalent Se, and the Se elution standard may be satisfied easily only by treating with the treating agent to be insoluble, and the absorption column of the desulfurization apparatus also functions as the reduction reaction facility of hexavalent Se, and the facility constitution of the entire system is facilitated as compared with the constitution of installing an independent reaction column for reducing Se.

According to the combustion exhaust gas treatment system of the third invention (2), since part of the circulation liquid of the desulfurization apparatus can be used as solvent in the repulping means, the water flow (circulation) and consumption can be saved as compared with the constitution for feeding water separately.

According to the combustion exhaust gas treatment system of the third invention (3), since filter additive is charged into the mixing means or separating means, the dehydration performance in the separating means is enhanced, the solid matter (dust cake) of low water content and easy to handle is obtained.

According to the combustion exhaust gas treatment system of the third invention (4), the Se elution standard may be easily satisfied, and the desulfurization apparatus functions also as hexavalent Se reduction reaction facility or as dust repulping means, so that the constitution of the entire system is simplified as compared with the system comprising Se reduction reaction column or repulping means separately.

According to the combustion exhaust gas treatment system of the third invention (5), the Se elution standard may be easily satisfied, and the desulfurization apparatus functions also as dust collector, or hexavalent Se reduction reaction facility, or dust repulsing means, so that the constitution of the entire system is simplified as compared with the system comprising dust collector, Se reduction reaction column or repulping means separately.

According to the combustion exhaust gas treatment system of the third invention (6), the oxidation-reduction reaction control means controls the oxidation-reduction reaction of the slurry in the desulfurization apparatus, so that the hexavalent Se mixed in the slurry in the desulfurization apparatus may be almost completely reduced into tetravalent form by the sulfurous acid in the slurry. Accordingly, if hexavalent Se is contained in the combustion exhaust gas, this hexavalent Se can be almost completely transformed into tetravalent form in the desulfurization apparatus, so that the Se in the combustion exhaust gas may be made insoluble more easily and perfectly.

According to the combustion exhaust gas treatment system of the third invention (7), the Se elution standard may be easily satisfied, and moreover since the desulfurization apparatus functions also as hexavalent Se reducing reaction facility, the constitution of the entire system is simplified as compared with the system comprising reaction column for reducing Se separately. Also in this case, since the cooling and dust removing column also function as dust repulping means, the constitution of the entire system is more simplified as compared with the system comprising repulping means separately. More preferably, since much dust (Se and other impurities) does not mix into the slurry in the absorption column of the desulfurization apparatus, the performance such as desulfurization rate in the desulfurization apparatus can be maintained high.

According to the combustion exhaust gas treatment system of the third invention (8), the Se elution standard may be easily satisfied, and the desulfurization apparatus functions also as dust collector, or hexavalent Se reduction reaction facility, or dust repulping means, so that the constitution of the entire system is simplified as compared with the system comprising dust collector, Se reduction reaction column or repulping means separately. More preferably, since much dust (Se and other impurities) does not mix into the slurry in the absorption column of the desulfurization apparatus, the performance such as desulfurization rate in the desulfurization apparatus can be maintained high.

According to the combustion exhaust gas treatment system of the third invention (9), the Se eluting into wastewater in the desulfurization apparatus can be also made insoluble, and more perfect Se insoluble treatment is realized, and Se-free gypsum can be collected. Depending on the treating conditions, moreover, the insoluble treating agent may be charged only into the wastewater treating apparatus, so that the entire system can be simplified.

D: Fourth Invention

Referring now to the drawings, embodiments of the fourth invention are described below.

Embodiment 1

Figure 15:
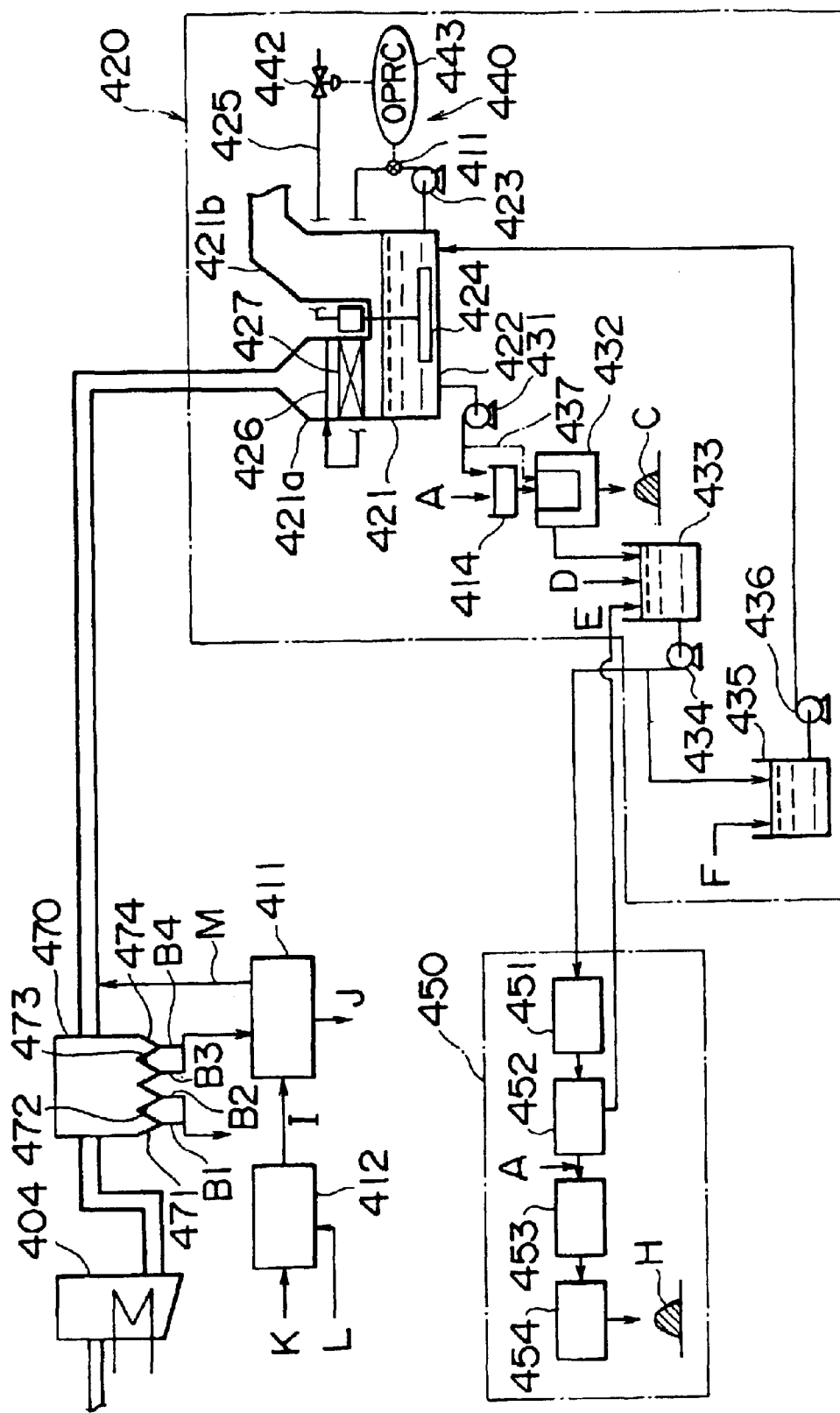
FIG. 15 is a schematic structural diagram of a combustion exhaust gas treatment system in embodiment 1 of the fourth invention.

FIG. 15 is a schematic structural diagram showing an example of a combustion exhaust gas treatment system according to the fourth invention (1) to (3), and (5) to (7).

In the combustion exhaust gas treatment system of this embodiment, as shown in FIG. 15, the dust containing Se is removed by an electrostatic precipitator 470, the dust (ash) removed by the electrostatic precipitator 470 is heated by heating means 411 to sublimate and gasify the Se in the dust, and this gas is fed into a wet desulfurization apparatus 420 (hereinafter, desulfurization apparatus 420), together with the combustion exhaust gas being rid of dust, to be treated.

In the desulfurization apparatus, as shown in reaction formulas (9) and (10), tetravalent Se (main form: selenious acid $SeO_3^{2-}$) and hexavalent Se (main form: selenic acid $SeO_4^{2-}$) are present. This hexavalent Se is almost completely reduced in the desulfurization apparatus 420 by so-called ORP control (oxidation-reduction potential control) to be transformed into tetravalent Se.

$$SeO_{2(g)} + H_2O \rightarrow 2H^+ + SeO_3^{2-} \tag{9}$$

$$SeO_3^{2-} + 1/2O_2 \rightarrow SeO_4^{2-} \tag{10}$$

Herein, the heating means 411 is, for example, a kiln, which is designed to heat the ash B3, B4 introduced from the electrostatic precipitator 470 until Se is sublimated and gasified by the supplied hot air I, and produced gas M is fed into the absorption column 421 of the desulfurization apparatus together with the combustion exhaust gas, while the remaining ash J is taken out to be recycled as cement material or the like. As means for feeding hot air I into the heating means 411, in this case, a heavy oil fired boiler 412 is provided, and by burning heavy oil K and heating the air L, hot air I at about, for example, 1000° C. is supplied.

The treating temperature in the heating means 411 may be 100 to 1200° C., but in order to gasify the Se in the dust more perfectly and efficiently, it is preferred to set in a range of 320 to 1000° C. For instance, when the flow and temperature of the dust introduced into the heating means 411 from the electrostatic precipitator 470 are 15 t/h and 90° C., to heat to about 320° C., the flow and temperature of hot air I, and the kiln specification for composing the heating means 411 may be set, for example, as follows. That is, the flow rate of hot air I is 3100 m³ N/h, temperature of hot air I is 1000° C., the filling rate in the kiln is 8%, the ash density in kiln is 0.5, and the residence time in the kiln is 0.5 hr.

The electrostatic precipitator 470 comprises plural hoppers 471 to 474 for separating and collecting the dust, and these hoppers 471 to 474 are formed sequentially from the inlet side (upstream side) to the outlet side (downstream side) of the combustion exhaust gas, and in this constitution, dust of larger particle size is collected from the inlet side hopper, and dust of smaller particle size is collected from the outlet side hopper. In this case, only the dust B3, B4 separated and collected from the specific hoppers 473, 474 at the outlet side are fed into the heating means 411, and the remaining dust B1, B2 are recycled as cement material or discarded directly. In this embodiment, meanwhile, the electrostatic precipitator 470 functions as the dust collecting means and sorting means of the fourth invention.

The desulfurization apparatus 420 is of tank oxidation type in this embodiment, and comprises an absorption tank 421 in which an absorbent slurry (composed of limestone in this case) is supplied into a bottom tank 422, a circulation pump 423 for sending the absorbent slurry in the tank 422 into an upper part 421a (combustion exhaust gas lead-in part) of the absorption tank 421 to contact with combustion exhaust gas, an arm-rotary type air sparger 424 supported in the tank 422 for rotating horizontally by a motor not shown, agitating the slurry in the tank 422, and blowing the supplied air efficiently into the tank 422 as fine bubbles, and an air feed pipe 425 for feeding air into the air sparger 424, in which the absorbent slurry absorbing sulfurous acid and the air are brought into contact efficiently in the tank 422, and the whole volume is oxidized to obtain gypsum.

In this tank 422, a slurry pump 431 for sucking out the slurry in the tank 422 is connected, and the treating agent A is charged by the mixing means 414 into the slurry sucked out by this slurry pump 431, and the mixture is supplied into a solid-liquid separator 432 to be filtered, and the gypsum C in the slurry is taken out as solid cake (usually water content about 10%). On the other hand, the filtrate (mainly water) from the solid-liquid separator 432 is once sent into the filtrate tank 433, and, if necessary, makeup water D or return liquid E from the wastewater treating apparatus 450 is added, and part of the liquid is sent into the adsorbent slurry tank 435 by the pump 434, and mixed with limestone F ($CaCO_3$) supplied from limestone silo not shown, and is supplied as absorbent slurry again into the tank 422 by the slurry pump 436. The mixing means 414 is composed of, for example, a mixing tank and an agitating mechanism for agitating the liquid in the mixing tank. As the treating agent A, a chemical at least reacting with tetravalent Se (main form: selenious acid $SeO_3^{2-}$) to make it insoluble is needed, and for example, $FeCl_3$ or $Fe_2(SO_4)_3$ may be used.

The desulfurization apparatus 420 is further equipped with oxidation-reduction reaction control means 440 for controlling the oxidation-reduction reaction in the absorption column 421. The oxidation-reduction reaction control means 440 consists, in this case, of a sensor 441 provided in the discharge side piping of the circulation pump 423 for detecting the oxidation-reduction potential of the slurry in the tank 422, a flow control valve 442 provided on the way of air feed pipe 425 for adjusting the air supply flow into the air sparger 424, and a controller 443 for controlling the action of the flow control valve 442 on the basis of the detection output of the sensor 441. Herein, the sensor 441 is realized by immersing an electrode made of, for example, platinum in the slurry. The controller 443 is designed to control continuously the opening degree of the flow control valve 442, so that the air feed rate into the air sparger 424 may be a minimum required limit for oxidizing and digesting the sulfurous acid dissolved in the slurry from the combustion exhaust gas. More specifically, on the basis of the correlation of the sulfurous acid concentration and oxidation-reduction potential, the oxidation-reduction potential when the sulfurous acid concentration is nearly zero is predetermined as the reference potential, and the proportional control is effected to increase the air feed rate depending on the deviation when the oxidation-reduction potential detected by the sensor 441 is lower than this reference potential, and to decrease the air feed rate depending on the deviation when the oxidation-reduction potential detected by the sensor 441 is higher than the reference potential.

Incidentally, since the oxidation-reduction reaction control means 440 is designed to supply air of the minimum required limit for oxidizing the total volume of sulfurous acid, it eventually has a function of inducing the reaction for reducing almost whole volume of other acids contained in the slurry by the sulfurous acid.

That is, the gas M containing vaporized Se released from the heating means 411 is fed into the absorption column 421 together with combustion exhaust gas, and becomes tetravalent Se (main form: selenious acid $SeO_3^{2-}$) and hexavalent Se (main form: selenic acid $SeO_4^{2-}$), but by the control of the controller 443, the hexavalent Se reacts with the sulfurous acid absorbed from the combustion exhaust gas to become tetravalent Se (main form: selenious acid $SeO_3^{2-}$) in the reduction reaction, which takes place in the absorption column 421. This reaction is expressed in the following reaction formula (11).

$$SeO_4^{2-}+SO_3^{2-}\rightarrow SeO_3^{2-}+SO_4^{2-} \tag{11}$$

The wastewater treating apparatus 450 is a so-called wastewater-free treating apparatus, comprising a pretreatment facility 451, an electric dialysis facility 452, a secondary concentrating facility 453, and a solidifying facility 454. In this wastewater treating apparatus 450, part of the liquid in the filtrate tank 433 is supplied by the pump 434 of the desulfurization apparatus 420, and impurities in this liquid (for example, Cl) are removed mainly by the function of the electric dialysis facility 452, and the residue after removal is returned to the filtrate tank 433 or absorbent slurry tank 435 of the desulfurization apparatus 420. The removed impurities are finally solidified in the solidifying facility 454, but at least prior to the solidifying process (for example, at a prior stage of the secondary concentrating facility 453), the treating agent A for reacting with tetravalent Se (main form: selenious acid $SeO_3^{2-}$) to make it insoluble is mixed in.

In thus constituted combustion exhaust gas treatment system, the combustion exhaust gas is sufficiently cooled upstream of the electrostatic precipitator 470, and Se in the combustion exhaust gas is mostly condensed and deposits on the fly ash or other dust (particularly on small particles), and therefore most Se in combustion exhaust gas is captured once by the electrostatic precipitator 470 together with the dust. In this case, of the captured dust B1 to B4, dust B1 and B2 of large particle size are small in Se content, and may be hence directly used as cement material or discarded, while only dust B3 and B4 of small particle size are heated in the heating means 411, and the Se in the dust B3, B4 is gasified, and fed into the absorption column 421 of the desulfurization apparatus 420 together with the combustion exhaust gas released from the electrostatic precipitator 470.

The combustion exhaust gas introduced into the absorption column 421 (including the gas sent from the heating means 411 and others) contacts with the absorbent slurry sprayed from a spray valve 426 by the circulation pump 423, and the sulfurous acid and gasified Se are absorbed and removed, and is discharged from the combustion exhaust gas lead-out part 421b as treated combustion exhaust gas.

The sulfurous acid sprayed from the spray valve 426 and absorbed in the absorbent slurry flowing down through a filler 427 is agitated by the air sparger 424 in the tank 422 and contacts with multiple bubbles blown in to be oxidized, and further undergoes neutralization reaction to become gypsum. In the absorption column 421, by the reaction of the reaction formula (11), nearly whole volume of hexavalent Se (main form: selenic acid $SeO_4^{2-}$) is transformed into tetravalent Se (main form: selenious acid $SeO_3^{2-}$). Principal reactions (except for reaction formula 11) taking place in this process are expressed in the following reaction formulas (12) to (14).

Absorption Column Combustion Exhaust Gas Lead-in Part $$SO_2+H_2O\rightarrow H^++HSO_3^- \tag{12}$$

Tank $$H^++HSO_3^-+1/2O_2\rightarrow 2H^++SO_4^{2-} \tag{13}$$

$$2H^++SO_4^{2-}+CaCO_3+H_2O\rightarrow CaSO_4.2H_2O+CO_2 \tag{14}$$

Thus, in the tank 422, gypsum ($CaSO_4.2H_2O$), a small amount of limestone ($CaCO_3$) as absorbent, and mainly tetravalent Se (main form: selenious acid $SeO_3^{2-}$) are suspended, and they are sucked out by the slurry pump 431, and the treating agent A is mixed by the mixing means 414, and the mixture is supplied into the solid-liquid separator 432 to be filtered, and gypsum C is obtained as cake form of low water content (usually water content about 10%).

Most of tetravalent Se (main form: selenious acid $SeO_3^{2-}$) undergoes the reaction expressed in reaction formulas 1, 2, or 3, 4, and is made insoluble in a form of iron selenite ($Fe_2(SeO_3)_3$), and is mixed in the separated gypsum c.

$$FeCl_3\rightarrow Fe^{3+}+3Cl^- \tag{1}$$

$$2Fe^{3+}+3SeO_3^{2-}\rightarrow Fe_2(SeO_3)_3\downarrow \tag{2}$$

or $$Fe_2(SO_4)_3\rightarrow 2Fe^{3+}+3SO_4^{2-} \tag{3}$$

$$2Fe^{3+}+3SeO_3^{2-}\rightarrow Fe_2(SeO_3)_3\downarrow \tag{4}$$

If, however, it is not desired that iron selenite ($Fe_2(SeO_3)_3$) is mixed in the separated and collected gypsum C, the slurry from the slurry pump 431 is supplied directly into the solid-liquid separator 432 through a line 437 (shown in FIG. 15), and gypsum C of high purity is recovered. In this case, Se is treated to be insoluble in the wastewater treating apparatus 450 shown below.

The function of the wastewater treating apparatus 450 in the combustion exhaust gas treatment system is described below.

As mentioned above, the vaporized Se is absorbed in the slurry in the desulfurization apparatus 420 together with the sulfurous acid in the combustion exhaust gas, and the hexavalent Se thereof reacts (reaction formula (11) in the absorption column 421 and is almost completely transformed into tetravalent Se. This tetravalent Se is treated same as other impurities (e.g. Cl) in the wastewater treating apparatus 450, and this Se and other impurities are removed so as not to be accumulated excessively in the slurry solution circulating in the desulfurization apparatus 420.

That is, in the wastewater treating apparatus 450, part of the filtrate of the filtrate tank 433 in the desulfurization apparatus 420 is extracted from the discharge side of the pump 434, and the impurities in this solution (Cl, etc.) are removed mainly by the function of the electric dialysis facility 452, and returned to the filtrate tank 433 of the desulfurization apparatus 420. The liquid leaving the electric dialysis facility 452 is mixed with the treating agent, and the mixture is concentrated in the secondary concentration apparatus 453, solidified by the solidifying facility 454, and discarded in the ash disposal yard or the like as impurity chip H. At this time, the tetravalent Se in the impurities reacts with the treating agent A in the formulas (1), (2), or (3), (4), and is transformed into iron selenite ($Fe_2(SeO_3)_3$), and is present in an insoluble form in the impurity chip H.

As described herein, according to the combustion exhaust gas treatment system of the embodiment, in addition to the conventional purification of combustion exhaust gas (removal of dust, removal of sulfurous acid), Se in the combustion exhaust gas is removed along with dust, and finally it is contained, in an insoluble form, in the dust cake G or impurity chip H, so as not to be eluted when recycled or discarded. Moreover, hexavalent Se which is hard to be treated (made insoluble) is transformed into tetravalent Se which is easy to discard, by the treating agent by the oxidation-reduction reaction control means 440 in the absorption column 421 of the desulfurization apparatus 420, and therefore, as compared with the system comprising an independent reaction column for transforming hexavalent Se into tetravalent Se, for example, Se in combustion exhaust gas may be removed and made harmless easily and inexpensively.

What is more, according to the combustion exhaust gas treatment system, by the function of the oxidation-reduction reaction control means 440, nearly whole volume of hexavalent Se is eventually transformed into tetravalent Se in the absorption column 421, and is finally made insoluble and discarded, and therefore the concentration of Se (not made insoluble) remaining in the gypsum cake C or impurity chip H is trifling, and the elution standard may be satisfied with an ample margin.

In this case, moreover, by applying Se insoluble treatment only on the dust B3, B4 separated and collected from the specific hoppers 473, 474 at the outlet side of the combustion exhaust gas in the electrostatic precipitator 470, the required amount of the treating agent A and the required capacity of the heating means 411 may be reduced, so that the Se may be made harmless more easily and inexpensively.

That is, according to the study by the present inventors, it is known that more Se is contained (deposited) in the smaller particle size dust (ash) separated and collected from the specific recovery unit at the outlet side, and the Se is made harmless on the whole only by applying insoluble treatment on the dust of smaller particle size, thereby contributing to reduction of facility cost and running cost.

Below are explained the results of dusts heating experiment, dust capturing test, and elution experiment, in the same apparatus as in the above embodiment.

The heating experiment was conducted by heating the dust containing 84 mg/kg of Se at various temperatures (200 to 1200° C.) for various durations (5 to 30 minutes). Before and after heating experiment, the Se elution test of dust was conducted in a method conforming to ordinance No. 13 of the Environmental Agency of Japan, and the Se concentration in the elution solution was analyzed by the atomic absorption photometry by the hydrogen compound generating method.

Figure 18:
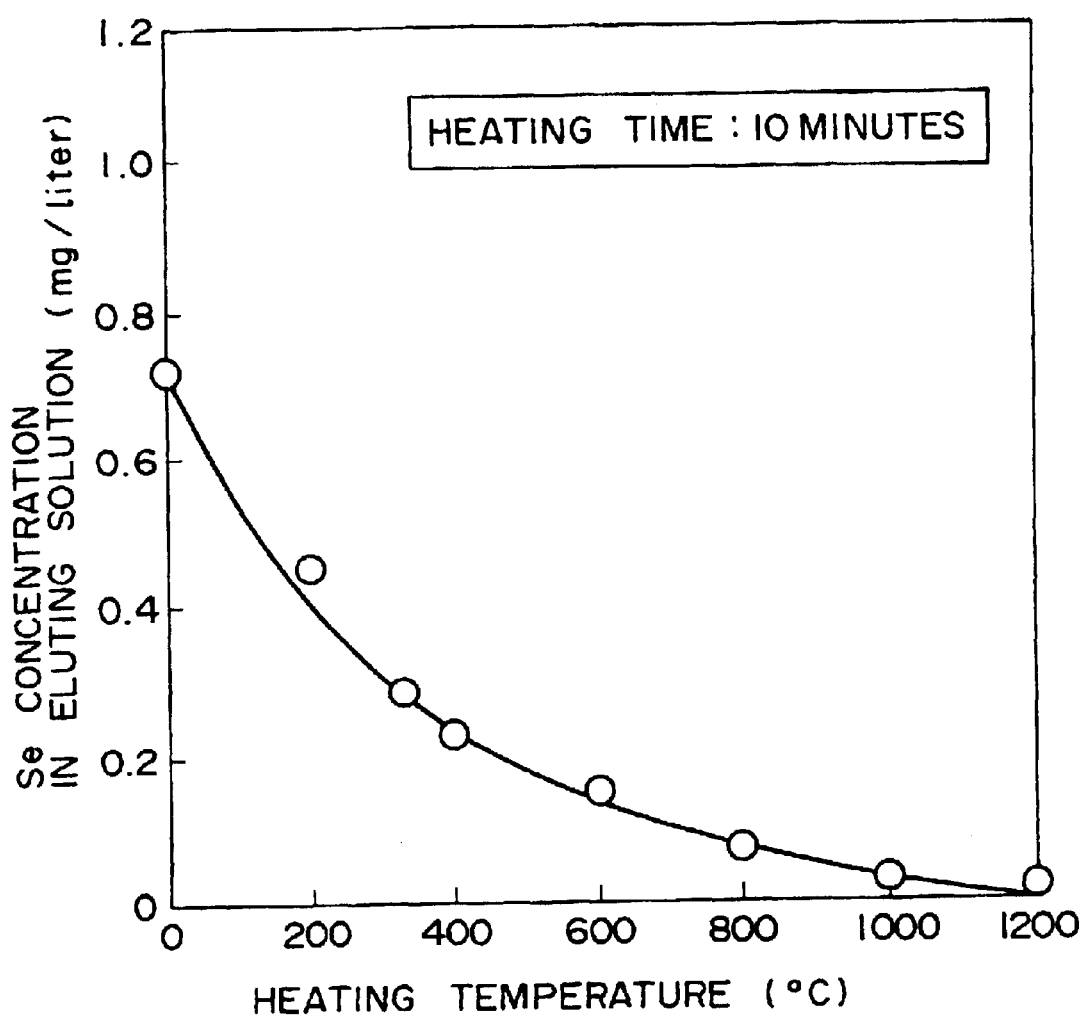
FIG. 18 is a graph showing the relation between dust heating temperature and Se concentration in elution liquid in an elution test in embodiment 1 of the fourth invention.
Figure 19:
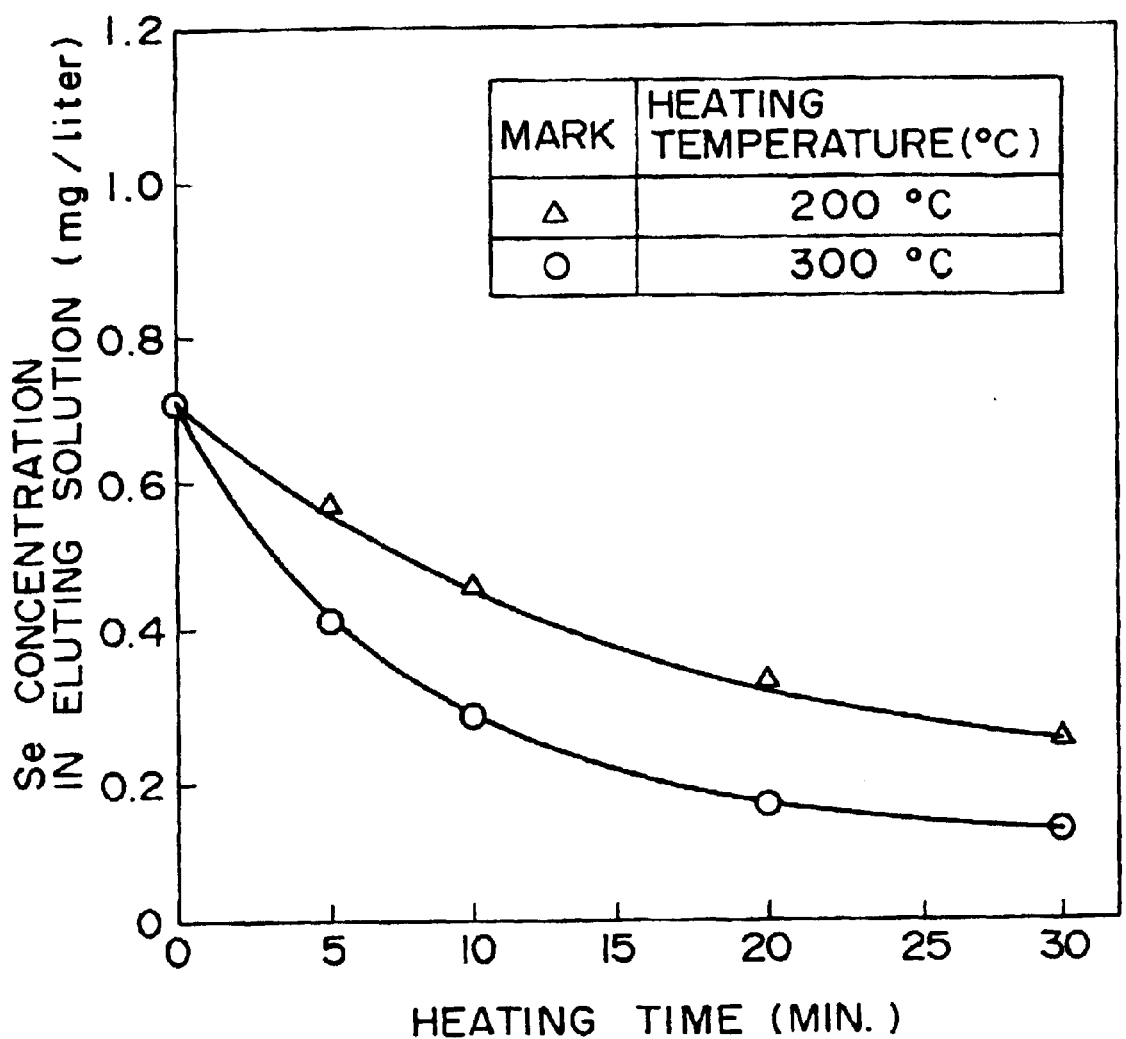
FIG. 19 is a graph showing the relation between dust heating temperature and Se concentration in elution liquid in an elution test in embodiment 1 of the fourth invention.

The results by heating temperature are shown in FIG. 18, and effects of heating time are given in FIG. 19. When heated for 10 to 30 minutes at temperature of 320° C. or more, the Se elution in the dust was less than the elution standard of 0.3 mg/liter concerning the landfill regulation, and it is known that Se is mostly gasified. At temperature of 200° C., by extending the heating time to 30 minutes, the Se elution from the dust was below the elution standard concerning landfill.

Therefore, when gasifying the Se in dust by heating, as the temperature not allowing the gasified Se to condense again, by heating the dust temperature to 100 to 1200° C., preferably 320 to 1000° C., the Se in the dust can be removed. That is, in this embodiment, the dust J after being heated by the heating means 411 is proved to be recycled or discarded directly.

In the dust capturing and elution test, coal containing 3 mg/kg of Se was supplied into a combustion furnace at a rate of 25 kg/h, and the combustion exhaust gas exhausted at 200 $m^3$ N/h from the combustion furnace was cooled to 150° C., and fed into the electrostatic precipitator. In this case, more than 99% of the dust was captured by the electrostatic precipitator, and the total volume collected from all hoppers was 3.4 kg/h. Discharge, mean particle size, and eluting Se concentration in the dust B1, B2 (collected ash) collected from the upstream hoppers 471, 472, and dust B3, B4 collected from downstream hoppers 473, 474 were measured, of which results are shown in Table 9.

TABLE 9

| | Collected ash | |
|---|---|---|
| Item | Collected ash discharged from hoppers 471, 472 (combustion exhaust gas inlet side) | Collected ash discharged from hoppers 473, 474 (combustion exhaust gas outlet side) |
| Discharge amount kg/h | 2.27 | 1.14 |
| Mean particle size of collected ash $\mu$m | 12 | 5 |
| Eluting selenium concentration in collected ash mg/liter | 0.20 | 0.49 |

More specifically, the discharge amount of the dust B3, B4 separated and collected from the hoppers 473, 474 at the outlet side of the combustion exhaust gas was slight, 1.14 kg/h, but the eluting Se concentration was 0.49 mg/liter, high above the standard. On the other hand, the discharge amount of the dust B1, B2 separated and collected from the hoppers 471, 472 at the inlet side of combustion exhaust gas was large, 2.27 kg/h, but the eluting Se concentration was 0.20 mg/liter, far below the standard. Accordingly, it is known that the dust B1, B2 separated and collected from the hoppers 471, 472 at the inlet side of the combustion exhaust gas can be directly discarded. That is, Se insoluble treatment is not needed in the dust at the inlet side of the combustion exhaust gas which is about twice larger in the discharge amount, and hence it is evident that the required amount of the treating agent A and the required capacity of the heating means 411 can be substantially saved.

Incidentally, such difference in eluting Se concentration is regarded to be due to the particle size of dust (ash). That is, when gaseous Se ($SeO_2$) is condensed and deposits on the surface of the ash forming the dust, ash of smaller particle size is greater in the specific surface area per unit weight, and hence more Se deposits. On the other hand, in the dust collector such as the electrostatic precipitator mentioned above, coarse ash particles are likely to be captured at the inlet side of the combustion exhaust gas, and fine ash particles are likely to be captured at the outlet side of the combustion exhaust gas, and in other words there is a sorting function, and it is hence considered that the eluting Se concentration is high in the dust captured at the outlet side of the combustion exhaust gas.

In this embodiment, due to the effect of Se mixing into the absorption column, it may be difficult to realize a high quality (purity) of gypsum C, and if this is a problem, as mentioned above, Se insoluble treatment may be done only in the wastewater treating apparatus 450.

Incidentally, the treating agent A may be mixed in other position than the position shown in FIG. 15 as far as within the slurry system of the desulfurization apparatus 420, or may be directly charged into the absorption column 421. Or the treating agent A may be mixed only in the wastewater treating apparatus 450 of the desulfurization apparatus 420, and hence the mixing means 414 in FIG. 15 may be omitted. In this case, in the desulfurization apparatus 420, all Se (especially tetravalent Se) circulates as being dissolved in the slurry solution, and part of the Se is sequentially led into the wastewater treating apparatus 450 to be made insoluble, and hence does not mix into the gypsum C, so that it is beneficial when desired to keep a high purity of gypsum.

Moreover, if it is not necessary to reduce the charging amount of the treating agent A or required capacity of the heating means 411, all of the dust B1 to B4 collected in the electrostatic precipitator 470 may be fed into the heating means 411 and treated.

Embodiment 2

Figure 16:
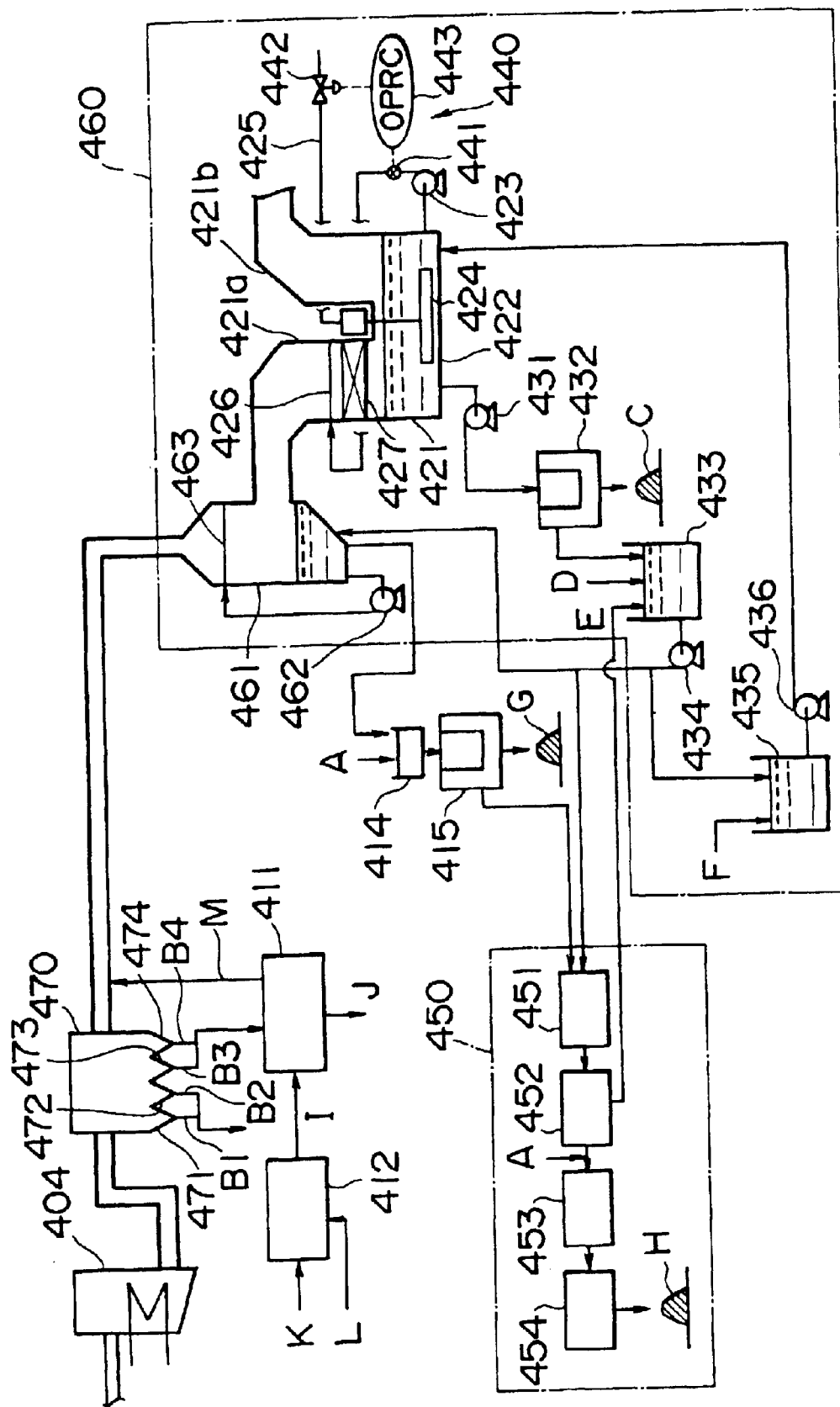
FIG. 16 is a schematic structural diagram of a combustion exhaust gas treatment system in embodiment 2 of the fourth invention.

FIG. 16 is a schematic structural diagram showing an example of a combustion exhaust gas treatment system of the fourth invention (4). Same constituent elements as in embodiment 1 are identified with same reference numerals, and their explanations are omitted.

In the combustion exhaust gas treatment system of the embodiment, as shown in FIG. 16, a desulfurization apparatus 460 having a cooling and dust collecting column 461 for cooling the dust and removing dust is disposed at the upstream side of the absorption column 421, and the gas including Se generated in heating means 411, together with combustion exhaust gas, is fed into the cooling and dust collecting column 461 of the desulfurization apparatus 460, while the treating agent A is charged into the slurry extracted from the cooling and dust removing column 461 by the mixing means 414. and it is separated into solid and liquid by the separating means 415.

Herein, in the cooling and dust collecting column 461, the liquid from the filtrate tank 433 is supplied from the pump 434, and this liquid is sprayed from an upper header pipe 463 by a circulation pump 462. Between the cooling and dust collecting column 461 and absorption column 421, a mist eliminator, not show, is provided.

In this case, the Se separated from the dust by heating once gets into the cooling and dust removing column 461, and the reaction in (reaction formula (11)) occurs in the cooling and dust collecting column 461, and hexavalent Se is almost totally transformed into tetravalent Se, and this tetravalent Se is made insoluble by the treating agent A, and is mixed into the dust cake G or impurity chip H in the wastewater treating apparatus 450. Herein, different from embodiment 1, fine dust not captured by the electrostatic precipitator does not mix into the absorption column 421, and therefore a high desulfurization rate may be kept and gypsum C of high quality may be easily obtained.

In FIG. 16, meanwhile, the separated water of the separating means 415 is directly fed into the wastewater treating apparatus 450, but for further perfect transformation reaction from hexavalent Se into tetravalent Se, the separated water may be fed, for example, into the absorbent slurry tank 435 and then guided into the absorption column 421.

The treating agent A may be also charged directly into the cooling and dust collecting column 461, or same as in embodiment 1, the treating agent A may be charged only into the wastewater treating apparatus 450, and the mixing means 414 and separating means 415 may be omitted.

Embodiment 3

Figure 17:
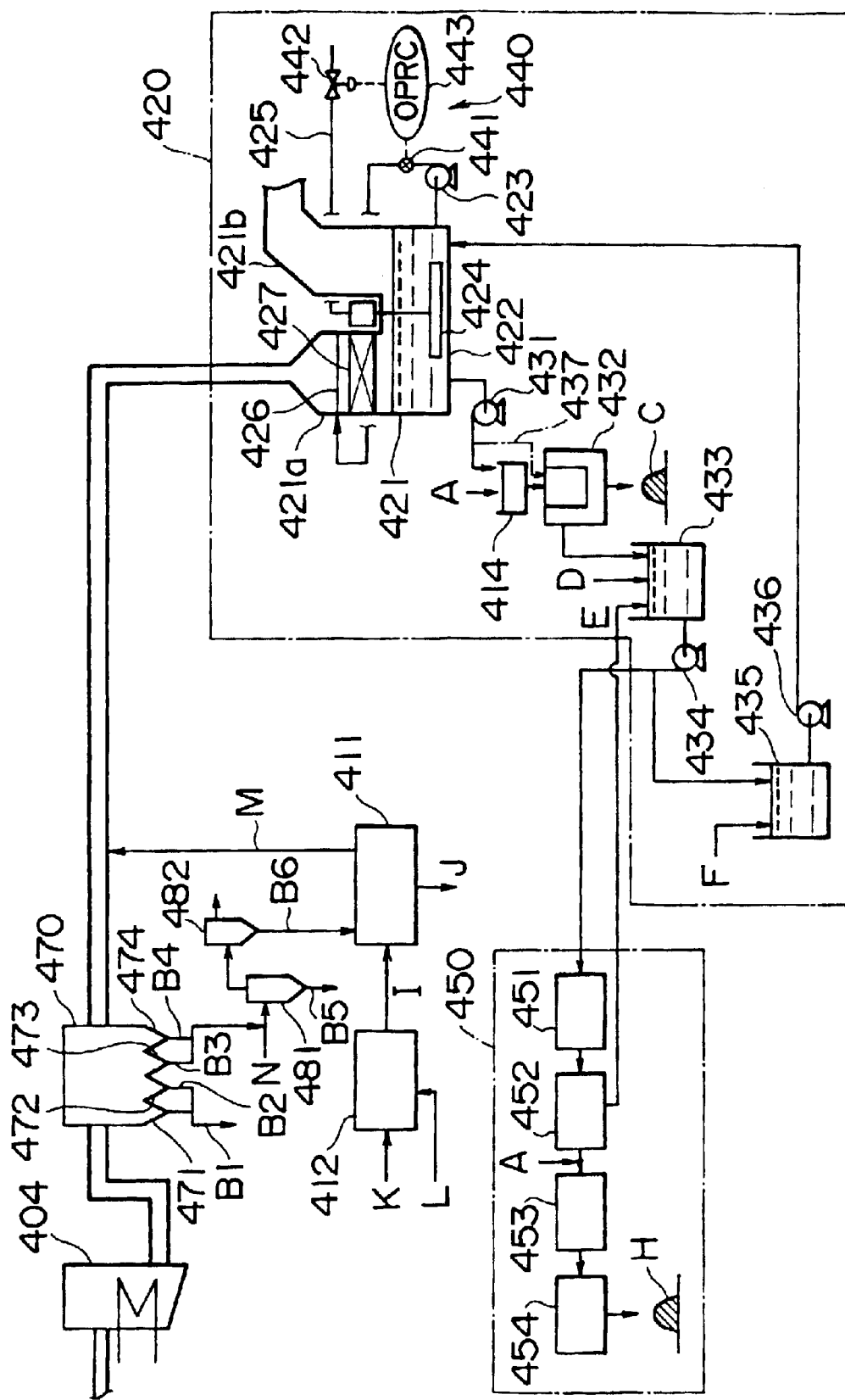
FIG. 17 is a schematic structural diagram of a combustion exhaust gas treatment system in embodiment 3 of the fourth invention.

FIG. 17 is a schematic structural diagram showing an example of a combustion exhaust gas treatment system of the fourth invention (6). Same constituent elements as in embodiment 1 are identified with same reference numerals and their explanations are omitted.

This combustion exhaust gas treatment system, as shown in FIG. 17, comprises a sorter 481 (sorting means) for classifying the dust B1 to B4 captured by the electrostatic precipitator 470 and conveyed in batch into large particle size (coarse ash) B5 and small particle size (fine ash) B6, and only fine ash B6 sorted by the sorter 481 is captured by a fine particle capturing apparatus 482, and fed into the heating means 411.

Meanwhile, in this case, the dust B1 to B4 are conveyed in batch by air N and led into the sorter 481. The sorter 481 may be constituted by, for example, a cyclone, and it is convenient when it is designed to adjust the degree of sorting. As the fine particle capturing apparatus 482, in this case, a bag filter is used.

In this case, only the fine ash B6 is gasified and fed into the desulfurization apparatus 420 to be made, and therefore, same as in embodiment 1, the required amount of treating agent A and required capacity of heating means 411 can be reduced, so that the Se may be made harmless more easily and inexpensively.

In this combustion exhaust gas treatment system, only by adding the heating means and sorter to the conventional combustion exhaust gas treatment system (capable of conveying the dust from the electrostatic precipitator in bath), the combustion exhaust gas treatment system can be realized without modifying the conveyor for conveying the dust from the electrostatic precipitator and other structures, and the Se in the combustion exhaust gas is made harmless, and modification of the existing combustion exhaust gas treatment system is easy, and when newly installing this system, the conventional design or equipment may be used as it is.

The result of dust heating experiment, dust capturing test, and elution experiment by the same apparatus as in the embodiment is described below.

In the experiment, coal containing 3 mg/kg of Se was supplied into a combustion furnace at a rate of 25 kg/h, and the combustion exhaust gas exhausted from the combustion furnace at a rate of 200 m$^3$ N/h was cooled to 150° C. and fed into the electrostatic precipitator. In this case, more than 99% of the dust was captured by the electrostatic precipitator, and the amount of dust collected by the conveyor (the total collected from the hoppers) was 3.4 kg/h. The capturing amount of coarse ash B5 and fine ash B6, mean particle size, and eluting Se concentration are shown in Table 10.

TABLE 10

| | Collected ash | |
|---|---|---|
| Item | Coarse ash B5 | Fine ash B6 |
| Capturing amount kg/h | 2.05 | 1.30 |
| Mean particle size of captured ash μm | 13 | 5.4 |
| Eluting selenium concentration in captured ash mg/liter | 0.26 | 0.36 |

That is, in the fine ash B6, the mean particle size was 5.4 μm, and the capturing amount was small, 1.30 kg/h, but the eluting Se concentration exceeded the standard, 0.36 mg/liter. In coarse ash B5, the mean particle size was 13 μm, the capturing amount was large, 2.0 kg/h, but the eluting Se concentration was below the standard, 0.26 mg/liter. Accordingly, it is known that the coarse ash B5 can be directly discarded. Hence, Se insoluble treatment is not needed in the coarse ash B5 which is very large in output, and it is evident that the required amount of treating agent A and required capacity of heating means 411 can be saved substantially.

The fourth invention may be also realized in many other forms aside from the foregoing embodiments. For example, if hexavalent Se does not exist and only other Se than hexavalent is present in the combustion exhaust gas in the desulfurization apparatus, the process or apparatus for reducing hexavalent Se into tetravalent Se is not needed.

The constitution of the desulfurization apparatus is not limited to the tank oxidation type shown in the embodiments, and, for example, an oxidation column in which the slurry extracted from the absorption column is fed may be separately installed, and by blowing air into this oxidation column, final oxidation-reduction reaction may be performed herein. In this case, too, hexavalent Se is transformed into tetravalent Se in the absorption column or oxidation column.

In the embodiments, as mentioned above, the charging position of the treating agent A may be a position in the wastewater treating apparatus 450. That is, since the slurry liquid in the absorption column or cooling and dust collecting column of the desulfurization apparatus is circulating in the wastewater treating apparatus 450, the entire Se can be made insoluble by charging the treating agent only in the wastewater treating apparatus 450.

As the treating agent for making tetravalent Se insoluble, for example, aside from $FeCl_3$, $Fe_2(SO_4)_3$, chelating agent (e.g. Epolus MX-7 of Miyoshi Resin), or high molecular heavy metal capturing agent (e.g. Epofloc L-1 of Miyoshi Resin) may be used.

Effects of the Fourth Invention

According to the combustion exhaust gas treatment system of the fourth invention (1), most of Se in flue is removed by the dust collector in a state being contained in the dust, and is heated and gasified by the heating means. Accordingly, almost no Se is left over in the dust after treatment, which can be directly recycled or discarded, and the Se elution standard is easily satisfied.

According to the combustion exhaust gas treatment system of the fourth invention (2), the Se removed together with the dust from the combustion exhaust gas is heated and gasified, and introduced into the desulfurization apparatus, and eventually all of hexavalent Se can be treated as tetravalent Se, and only by insoluble treatment by treating agent, the Se elution standard is easily satisfied, and moreover the absorption column of the desulfurization apparatus also functions as the Se reducing reaction facility, and hence the constitution of the entire system is simple as compared with the constitution for providing the reaction column for reducing Se separately. Still more, owing to the constitution designed for separating Se from the dust by heating means and feeding into the desulfurization apparatus, so that the entire dust may not fed into the desulfurization apparatus, recycling of dust is easy, and lowering of desulfurization performance in the desulfurization apparatus can be avoided.

According to the combustion exhaust gas treatment system of the fourth invention (3), the oxidation-reduction reaction control means controls the oxidation-reduction reaction of the slurry in the desulfurization apparatus, so that the hexavalent Se mixed in the slurry in the desulfurization apparatus may be almost entirely reduced by the sulfurous acid in the slurry to be tetravalent. Hence, the hexavalent Se can be almost completely transformed into tetravalent form in the desulfurization apparatus, and Se insoluble treatment in the combustion exhaust gas is done more easily and perfectly.

According to the combustion exhaust gas treatment system of the fourth invention (4), the Se elution standard can be satisfied easily, and the desulfurization apparatus functions also as hexavalent Se reducing reaction facility, and therefore the constitution of the entire system is simplified as compared with the constitution for comprising reaction column for reducing Se separately. In this case, the gasified Se and combustion exhaust gas are fed and treated in the cooling and dust collecting column in the desulfurization apparatus, and not only dust but also impurities such as Se may not be mixed passively into the slurry in the absorption column of the desulfurization apparatus, and therefore the desulfurization rate in the desulfurization apparatus is maintained high, and gypsum of high quality can be obtained.

According to the combustion exhaust gas treatment system of the fourth invention (5), only the dust separated and collected from the specific recovery unit at the outlet side of the combustion exhaust gas in the dust collecting means is heated, and only the gasified Se is fed into the desulfurization apparatus to be made insoluble, and therefore the required amount of treating agent and required capacity of heating means may be reduced, so that the Se may be made harmless more easily and economically.

According to the combustion exhaust gas treatment system of the fourth invention (6), only the dust of small particle size sorted by the sorting means is heated, and only the gasified Se is fed into the desulfurization apparatus to be made insoluble, and therefore the required amount of treating agent and required capacity of heating means may be reduced, so that the Se may be made harmless more easily and economically.

According to the combustion exhaust gas treatment system of the fourth invention (6), the heating temperature of the dust by the heating means is 100 to 1200° C., and hence the gasified Se will not be condensed again in the dust, so that the Se can be removed efficiently from the dust, and therefore the Se elution standard of dust can be satisfied easily.

E: Fifth Invention

Embodiments of the fifth invention are described below by reference to the drawings.

Embodiment 1

Embodiment 1 of the fifth invention (1) and (3) is described in the first place.

Figure 20:
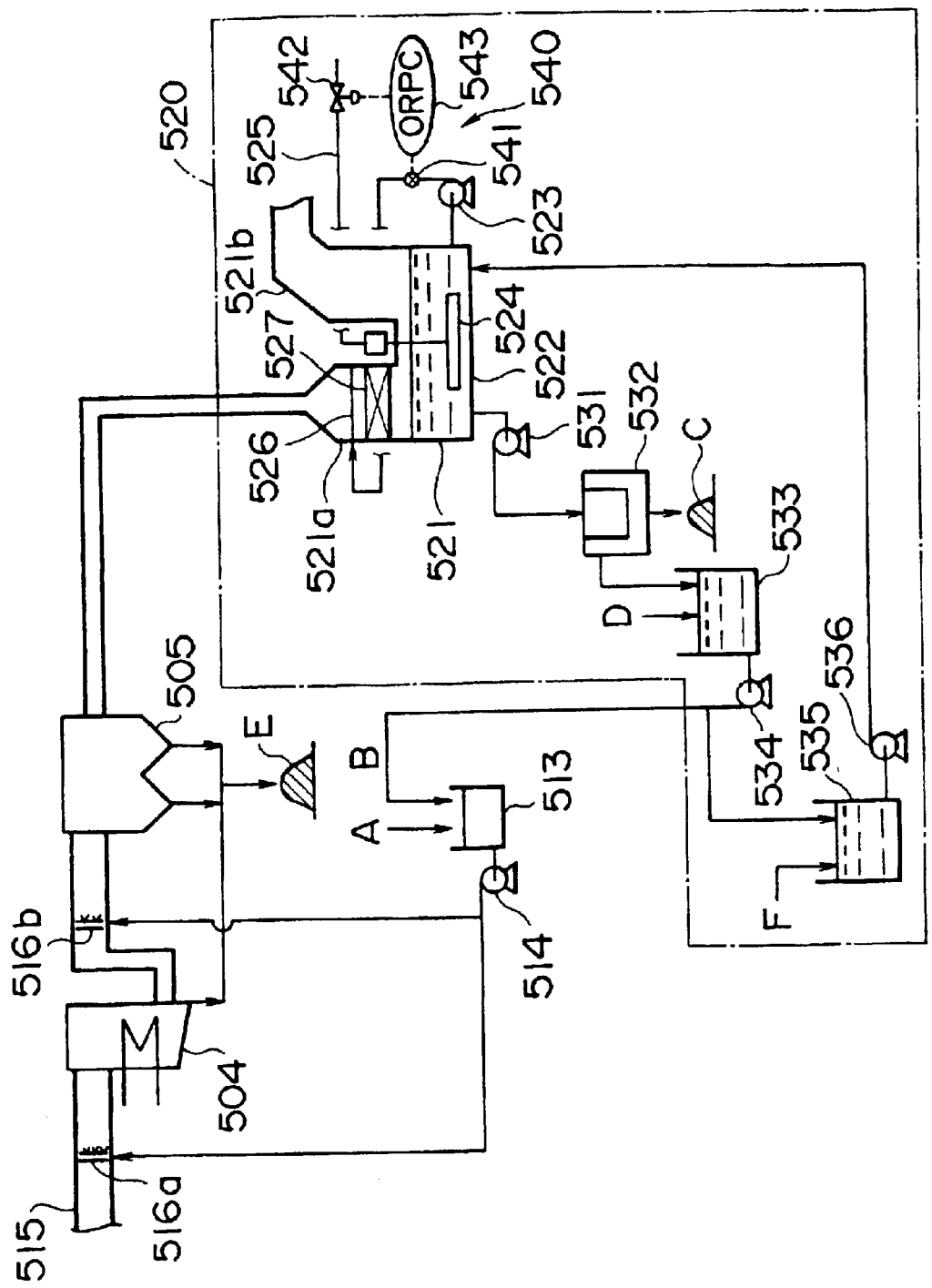
FIG. 20 is a schematic structural diagram showing a constitution of a combustion exhaust gas treatment system in embodiment 1 of the fifth invention.

FIG. 20 is a schematic structural diagram showing a constitution of a combustion exhaust gas treatment system in embodiment 1 of the fifth invention. Constituent elements same as in the prior art are identified with same reference numerals, and their explanations are omitted. In the combustion exhaust gas treatment system of this embodiment, as shown in FIG. 20, circulation liquid B (liquid discharged from a pump 534 described below) extracted from a wet combustion exhaust gas desulfurization apparatus 520 (hereinafter desulfurization apparatus 520) is mixed with treating agent A by mixing means 513, and the circulation liquid B mixed with the treating agent A is sprayed by a pump 514 from a spray pipe 516*a* or 516*b* provided in a combustion exhaust gas lead-in passage 515 upstream of an electrostatic precipitator 505, and the Se contained in the dust is made insoluble by the treating agent A, discharged as dust E, while the wastewater discharged from the desulfurization apparatus 520 is evaporated to eliminate the wastewater. Herein, the pump 514, spray pipe 516*a* or 516*b*, and the piping system for connecting them compose the spray means of the fifth invention.

In this embodiment, since the electrostatic precipitator 505 is provided, as described below, most Se in combustion exhaust gas is removed as being contained in the dust, and very little Se mixes into the desulfurization apparatus 520, but in the desulfurization apparatus, as shown in reaction formulas 9 and 10, there are tetravalent Se (main form:

selenious acid $SeO_3^{2-}$) and hexavalent Se (main form: selenic acid $SeO_4^{2-}$). In this constitution, the hexavalent Se is almost completely reduced by the so-called ORP control (oxidation-reduction potential control) in the desulfurization apparatus 520, and is transformed into tetravalent Se.

$$SeO_{2(g)} + H_2O \rightarrow 2H^+ + SeO_3^{2-} \quad (9)$$

$$SeO_3^{2-} + 1/2O_2 \rightarrow SeO_4^{2-} \quad (10)$$

The mixing means 513 is composed of, for example, a mixing tank, and an agitating mechanism for agitating the liquid in the mixing tank. The circulation liquid B extracted from the desulfurization apparatus 520 and the treating agent A are charged and mixed, and extracted by the pump 514, and sent into the spray pipe 516a or 516b. Herein, as the treating agent, a chemical at least reacting with tetravalent Se (main form: selenious acid $SeO_3^{2-}$) to make it insoluble is needed, and for example, $FeCl_3$ or $Fe_2(SO_4)_3$ may be used.

The spray pipe 516a or 516b is composed of a pipe main body installed in the combustion exhaust gas lead-in passage (duct) 515 and connected to the pump 514, and a spray nozzle formed in the pipe main body. The location of the spray pipe 516a or 516b (the position for spraying the liquid) in FIG. 20 is in the upstream of a heat recovery unit 504 and in the upstream of the electrostatic precipitator 505, but it may be also installed in the upstream side of an air heater, not shown, installed in the upstream side of the combustion exhaust gas lead-in passage 515, as far as the sprayed liquid may splash in the combustion exhaust gas and be gasified by the heat of the combustion exhaust gas, and the treating agent A in the liquid may efficiently contact with the dust in the combustion exhaust gas.

The desulfurization apparatus 520 is of tank oxidation type, and comprises an absorption column 521 for feeding an absorbent slurry (composed of limestone in this example) into a bottom tank 522, a circulation pump 523 for sending the absorbent slurry in the tank 522 into an upper part 521a (combustion exhaust gas feed-in unit) of the absorption tank 521 to contact with the combustion exhaust gas, a rotary arm type air sparger 524 supported in the tank 522 for rotation horizontally by means of a motor not shown, and agitating the slurry in the tank 522 and blowing in the supplied aid efficiently into the tank 522 as fine bubbles, and an air feed tube 525 for feeding air into this air sparger 524, and it is designed to obtain gypsum by totally oxidizing by efficient contact between air and the absorbent slurry absorbing sulfurous acid in the tank 522.

A slurry pump 531 for sucking out the slurry in the tank 522 is connected to the tank 522, and the slurry sucked out by this slurry pump 531 is supplied into a solid-liquid separator 532 to be separated into solid and liquid, and gypsum C in the slurry is taken out as solid cake (usually water content of about 10%). On the other hand, the separated liquid (mainly water) from the solid-liquid separator 532 are once sent into a separated liquid tank 533, and, as required, makeup water D is added, and part of such liquid is sent into an absorbent slurry tank 535 by a pump 534, and mixed with limestone F ($CaCO_3$) supplied from a limestone silo not shown to be formed into an absorbent slurry, which is supplied again into the tank 522 by a slurry pump 536.

The desulfurization apparatus 520 is further provided with, as a preferred embodiment of the fifth invention, oxidation-reduction reaction control means 540 for controlling the oxidation-reduction reaction in the absorption column 521. This oxidation-reduction reaction control means 540 is composed of a sensor 541 disposed in the discharge side piping of the circulation pump 523 for detecting the oxidation-reduction potential of the slurry in the tank 522, a flow rate control valve 542 disposed in the midst of the air feed tube 525 for adjusting the air feed rate into the air sparger 524, and a controller 543 for controlling the action of the flow rate control valve 542 on the basis of the detection output of the sensor 541. Herein, the sensor 541 is composed by immersing an electrode, for example, made of platinum into slurry. The controller 543 is designed to control the opening degree of the flow rate control valve 542 continuously, so that the air feed rate into the air sparger 524 may be a minimum required limit for oxidizing and digesting the sulfurous acid dissolved in the slurry from the combustion exhaust gas. For example, more specifically, on the basis of the correlation of the concentration of sulfurous acid and oxidation-reduction potential, the oxidation-reduction potential when the concentration of sulfurous acid is nearly zero is predetermined as the reference potential, and, by proportional control, when the oxidation-reduction potential detected by the sensor 541 becomes lower than this reference potential, the air feed rate is increased according to the deviation, and when the oxidation-reduction potential detected by the sensor 541 becomes higher than this reference potential, the air feed rate is decreased according to the deviation.

Incidentally, since the oxidation-reduction reaction control means 540 is designed to feed a minimum required limit for oxidizing the total volume of sulfurous acid, it eventually has a function of inducing a nearly total reduction reaction of the other acids contained in the slurry by the sulfurous acid.

That is, the slight Se not removed by the electrostatic precipitator 505 is fed into the absorption column 521 together with combustion exhaust gas, and tetravalent Se (main form: selenious acid $SeO_3^{2-}$) and, hexavalent Se (main form: selenic acid $SeO_4^{2-}$) exist, and the hexavalent Se is controlled by the controller 543, and reacts with the sulfurous acid absorbed from the combustion exhaust gas to undergo reduction reaction to be transformed into tetravalent Se (main form: selenious acid $SeO_3^{2-}$), which takes place in the absorption column 521. This reaction is expressed in the reaction formula (11).

$$SeO_4^{2-} + SO_3^{2-} \rightarrow SeO_3^{2-} + SO_4^{2-} \quad (11)$$

In thus constituted combustion exhaust gas treatment system, in the upstream of the electrostatic precipitator 505, the combustion exhaust gas is sufficiently cooled, and most Se in the combustion exhaust gas is condensed and deposits on the fly ash and other dust (of smaller particle size in particular), and hence most of Se in the combustion exhaust gas is captured by the electrostatic precipitator 505 together with the dust. Moreover, at the upstream side of the electrostatic precipitator 505, the liquid containing treating agent A is sprayed from the spray pipe 561a or 516b, and reacts with Se depositing on the dust in the combustion exhaust gas. Accordingly, tetravalent Se (main form: selenious acid $SeO_3^{2-}$) almost completely reacts as shown in reaction formulas (1), (2), or (3), (4), and becomes iron selenite ($Fe_2(SeO_3)_3$) to be insoluble, and is mixed in the removed dust.

$$FeCl_3 \rightarrow Fe_{3+} + 3Cl^- \quad (1)$$

$$2Fe^{3+} + 3FeO_3^{2-} \rightarrow Fe_2(SeO_3)_3\downarrow \quad (2)$$

or $$Fe_2(SO_4)_3 \rightarrow 2Fe^{3+} + 3SO_4^{2+} \quad (3)$$

$$2Fe^{3+} + 3SeO_3^{2-} \rightarrow Fe_2(SeO_3)_3 \downarrow \quad (4)$$

In this case, the Se in the captured dust E is made insoluble by the treating agent A, and can be directly recycled as the cement material or discarded, while the Se elution standard is satisfied.

On the other hand, the combustion exhaust gas fed into the absorption column 521 contacts with the absorbent slurry sprayed from the spray pipe 526 by the circulation pump 523, and sulfurous acid and Se are absorbed and removed, and the treated combustion exhaust gas is discharged from a combustion exhaust gas lead-out unit 521b.

The sulfurous acid absorbed in the absorbent slurry sprayed from the spray pipe 526 and flowing down through a filler 527 is agitated by the air sparger 524 in the tank 522, and contacts with multiple bubbles sucked in to be oxidized, and further undergoes neutralization reaction to become gypsum. In the absorption column 521, by the reaction in the reaction formula (11), nearly whole volume of hexavalent Se (main form: selenic acid $SeO_4^{2-}$) is transformed into tetravalent Se (main form: selenious acid $SeO_3^{2-}$). Principal reactions taking place in this process (other than reaction formula (11)) are expressed in reaction formulas (15) to (17). Absorption Column Combustion Exhaust Gas Lead-in Part $$SO_2 + H_2O \rightarrow H^+ + HSO_3^- \quad (15)$$

Tank $$H^+ + HSO_3^- + 1/2O_2 \rightarrow 2H + SO_4^{2-} \quad (16)$$

$$2H^+ + SO_4^{2-} + CaCO_3 + H_2O \rightarrow CaSO_4 \cdot 2H_2O + CO_2 \quad (17)$$

Thus, in the tank 522, gypsum ($CaSO_4 \cdot 2H_2O$), a slight amount of limestone ($CaCO_3$), and tetravalent Se (main form: selenious acid $SeO_3^{2-}$) are suspended or dissolved, and they are sucked out by the slurry pump 531, and supplied into the solid-liquid separator 532 to be separated into solid and liquid, and is taken out as gypsum C in a cake form of low water content (usually water content about 10%). At this time, if not dissolved partly, tetravalent Se (main form: selenious acid $SeO_3^{2-}$) may be slightly mixed into the separated gypsum C, but the majority is sent into the separated liquid tank 533 together with the separated liquid.

The liquid in the separated liquid tank 533 is blended with, if necessary, makeup water D as mentioned above, and partly sent into the absorbent slurry tank 535 by the pump 534 to be mixed with limestone F, and is supplied again as absorbent slurry into the tank 522 to circulate, and in this case, further, part of the liquid in the separated liquid tank 533 is sent into the mixing means 513, and blended with the treating agent A, and sprayed into the combustion exhaust gas.

Accordingly, as mentioned above, the Se mainly composed of tetravalent form fed into the desulfurization apparatus 520, and other impurities (Cl, etc.) mixing into the circulation liquid in the desulfurization apparatus from the combustion exhaust gas are prevented from being accumulated excessively in the circulation liquid system in the desulfurization apparatus 520, and hence the high desulfurization performance and gypsum quality are not impaired, which eliminates the requirement of installation of wastewater treating apparatus (composed of electric dialysis machine, etc.) for the desulfurization apparatus. That is, part of the circulation liquid in the desulfurization apparatus 520 is extracted sequentially as stated above, and blended with the treating agent, then sprayed into the combustion exhaust gas, and therefore the tetravalent Se in the circulation liquid is sequentially made insoluble, and is removed by the electrostatic precipitator 505 as being contained in the dust, together with the tetravalent Se in the combustion exhaust gas newly introduced from the lead-in passage 515. At the same time, other impurities mixing in the circulation liquid are sent into the combustion exhaust gas lead-in passage 515 in the route of mixing means 513 and pump 514, and returned to the combustion exhaust gas, and hence they are partly removed by the electrostatic precipitator 505 together with the dust, or pass through the absorption column 521 to be discharged from the combustion exhaust gas lead-out unit 521b together with the treated combustion exhaust gas, so that the may not be accumulated in the circulation liquid in the desulfurization apparatus 520.

As described herein, according to the combustion exhaust gas treatment system of embodiment 1, aside from the conventional combustion exhaust gas purification (removal of dust, removal of sulfurous acid), most of Se in the combustion exhaust gas can be contained in the dust in an insoluble form, so that it may be directly recycled or discarded. What is more, the hard-to-treat (make insoluble) hexavalent Se is transformed into an easy-to-discard tetravalent Se by the treating agent by the oxidation-reduction reaction control means 540 in the absorption column 521 of the desulfurization apparatus 520, and therefore, as compared with the system comprising an independent reaction column for transforming hexavalent Se into tetravalent Se, for example, the Se in the combustion exhaust gas can be removed and made harmless by a simple and inexpensive system.

According to this combustion exhaust gas treatment system, moreover, almost all of hexavalent Se is eventually transformed into tetravalent Se in the absorption column 21 by the function of the oxidation-reduction reaction control means 540, and is finally made insoluble and discarded, and therefore the concentration of the remaining hexavalent Se (not made insoluble) is extremely slight, and the elution standard may be satisfied with an ample margin.

In this case, furthermore, since the circulation liquid discharged from the desulfurization apparatus 520 is sprayed into the combustion exhaust gas lead-in passage, without particularly requiring the wastewater treating apparatus as mentioned above, impurities including Se are prevented from being accumulated excessively in the circulation liquid in the desulfurization apparatus 520, and the water in the desulfurization can be treated in a simple constitution, and the system can be further reduced in cost and size, while the desulfurization performance and gypsum quality may be maintained high.

Embodiment 2

Figure 21:
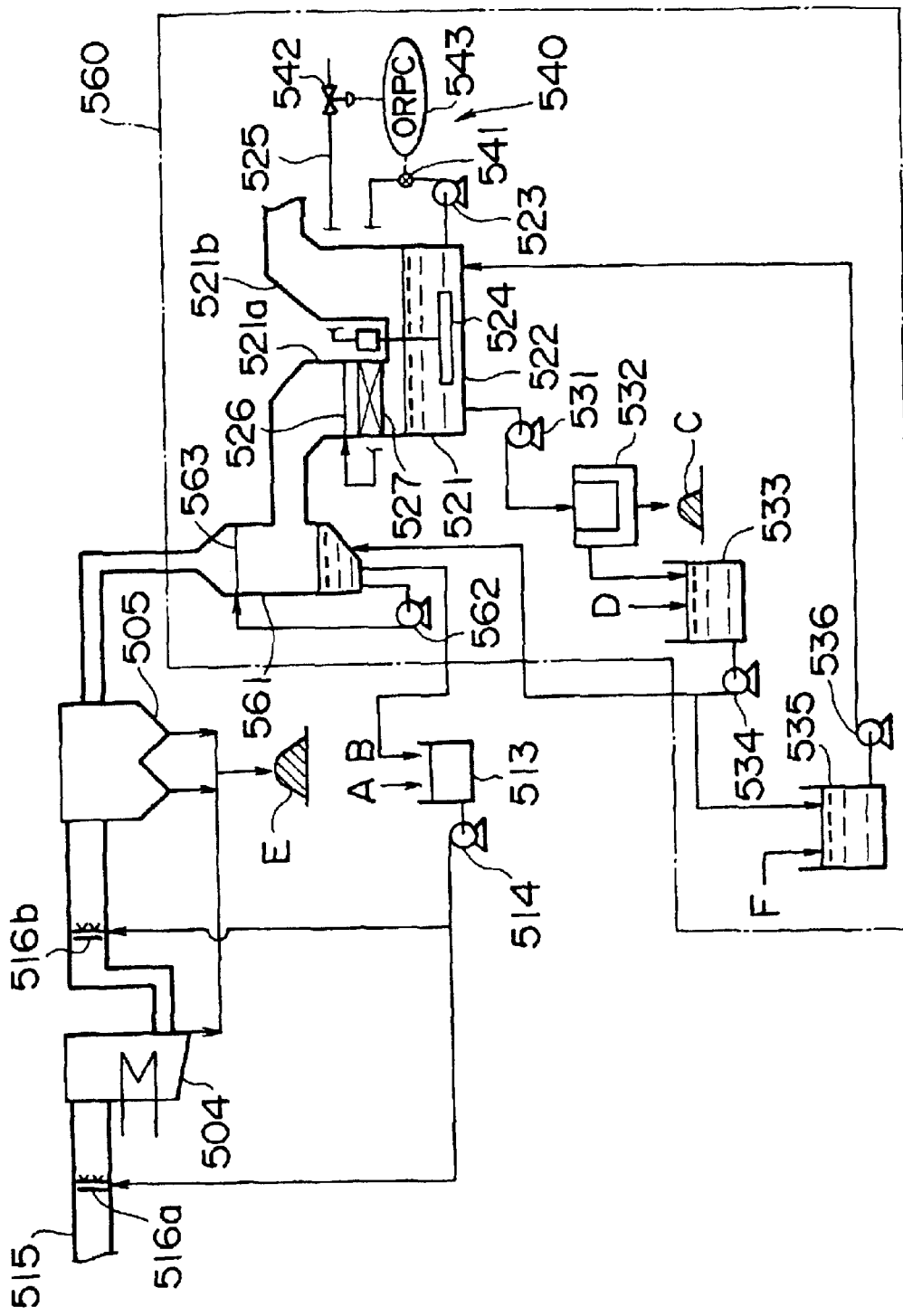
FIG. 21 is a schematic structural diagram showing a constitution of a combustion exhaust gas treatment system in embodiment 2 of the fifth invention.

Embodiment 2 of the fifth invention (1) is described below. FIG. 21 is a schematic structural diagram showing a constitution of a combustion exhaust gas treatment system of embodiment 2. In FIG. 21, same constituent elements as in embodiment 1 are identified with same reference numerals, and their explanations are omitted.

In the combustion exhaust gas treatment system of this embodiment, as shown in FIG. 21, a desulfurization apparatus 560 comprising a cooling and dust collecting column 561 for cooling the flue and collecting dust is disposed at the upstream side of an absorption column 521, and combustion exhaust gas containing Se and others is fed into the cooling and dust collecting column 561 of the desulfurization apparatus 560, and the liquid extracted from the cooling and dust collecting column 561 is fed into mixing means 513 as discharge circulation liquid B.

In the cooling and dust collecting column 561, the liquid in a separated liquid tank 533 is supplied by a pump 534, and this liquid is sprayed from an upper header pipe 563 by a circulation pump 562. Between the cooling and dust collecting column 561 and the absorption column 521, a mist eliminator, not shown, is provided.

In this constitution, impurities including Se getting into the desulfurization apparatus 560, that is, fine dust particles not captured by the electrostatic precipitator hardly mix into the absorption column 521, but are mainly absorbed in the cooling and dust collecting column 561, and are extracted as being contained in the circulation liquid B, and consequently mixed with the treating agent A and sprayed into the combustion exhaust gas lead-in passage 515 same as in embodiment 1.

Therefore, in addition to the action and effect of embodiment 1, it is further effective to maintain a high desulfurization rate and a high quality (purity) of gypsum C.

Embodiment 3

Figure 22:
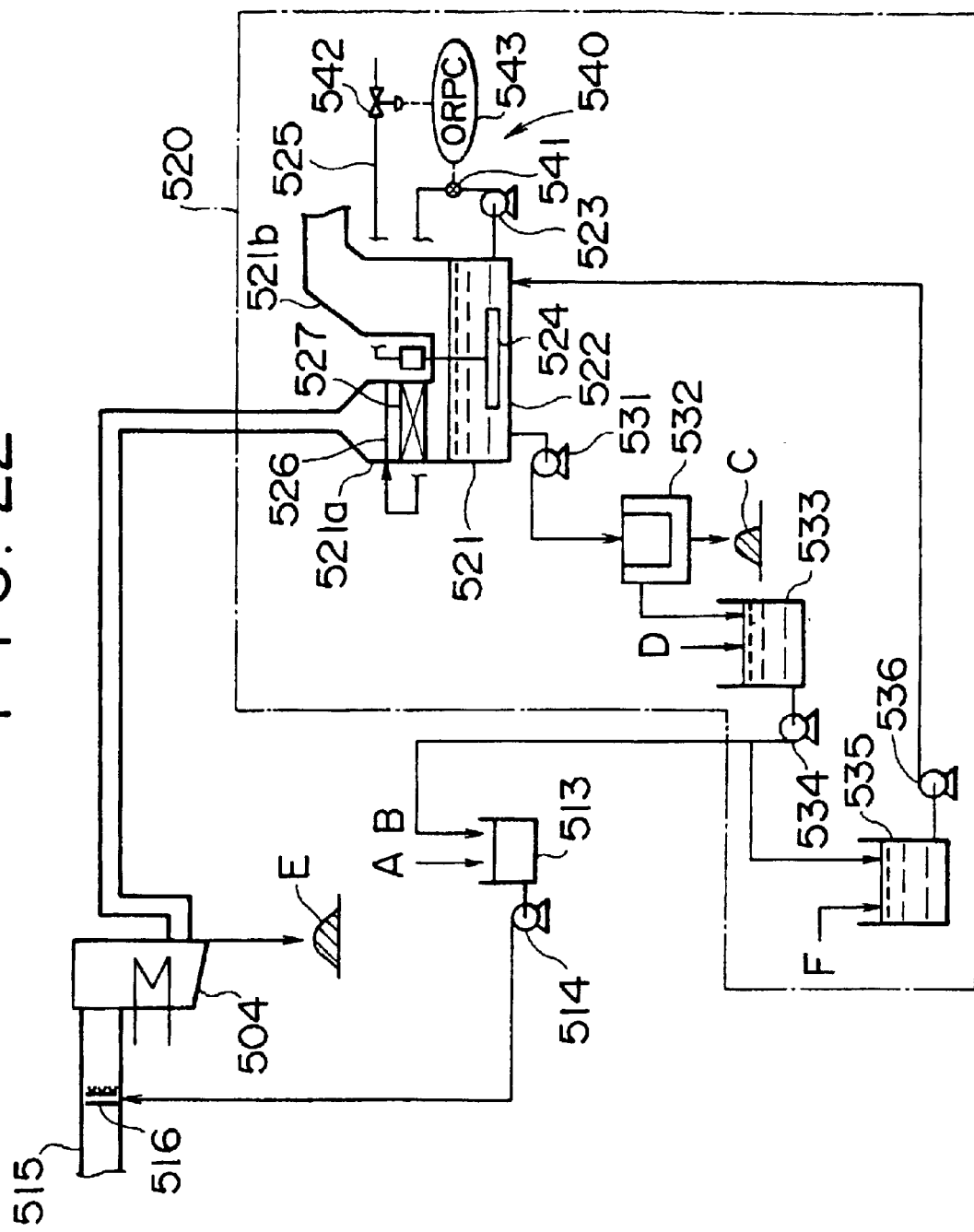
FIG. 22 is a schematic structural diagram showing a constitution of a combustion exhaust gas treatment system in embodiment 3 of the fifth invention.

Embodiment 3 of the fifth invention (2) is described below. FIG. 22 is a schematic structural diagram showing a constitution of a combustion exhaust gas treatment system of embodiment 3. In FIG. 22, same constituent elements as in embodiment 1 are identified with same reference numerals, and their explanations are omitted.

In the combustion exhaust gas treatment system of this embodiment, as shown in FIG. 22, without installing electrostatic precipitator, it is characterized by feeding the combustion exhaust gas containing fly ash and dust directly into the absorption column 521 of the desulfurization apparatus 520.

In this case, most of Se in the combustion exhaust gas is contained in the dust, and enters the absorption column 521 entirely, and at least tetravalent Se thereof reacts with the sprayed treating agent A in the combustion exhaust gas lead-in passage 515 to be insoluble, and is separated in the solid-phase side by the solid-liquid separator 532, and is mixed into the gypsum C in insoluble state. If hexavalent Se is present, it is transformed into tetravalent Se in the absorption column 521 same as in embodiment 1, and is sequentially extracted as being contained in the discharge circulation liquid B, and is mixed with the treating agent A and sprayed into the combustion exhaust gas lead-in passage 515, and fed again into the desulfurization apparatus 520, and ultimately, therefore, almost all of Se is transformed into an insoluble form as tetravalent Se and is mixed in the gypsum C.

In this case, the absorption column 521 also functions as the electrostatic precipitator 505 in embodiment 1, and hence the facility cost may be lower than in the system of embodiment 1.

In this embodiment, as compared with embodiment 1, the cost may be further lowered, but due to the effects of the dust (impurities) massively mixing into the absorption column, it may be difficult to realize high desulfurization rate or high quality of gypsum C, and if this is a problem, it is preferred to constitute as in embodiment 1 or 2 or embodiment 4 described below.

Incidentally, the dust E discharged from the heat recovery unit 504 is slight, and the Se contained in the dust E is made insoluble by the treating agent A, and hence it may be discarded directly.

Embodiment 4

Figure 23:
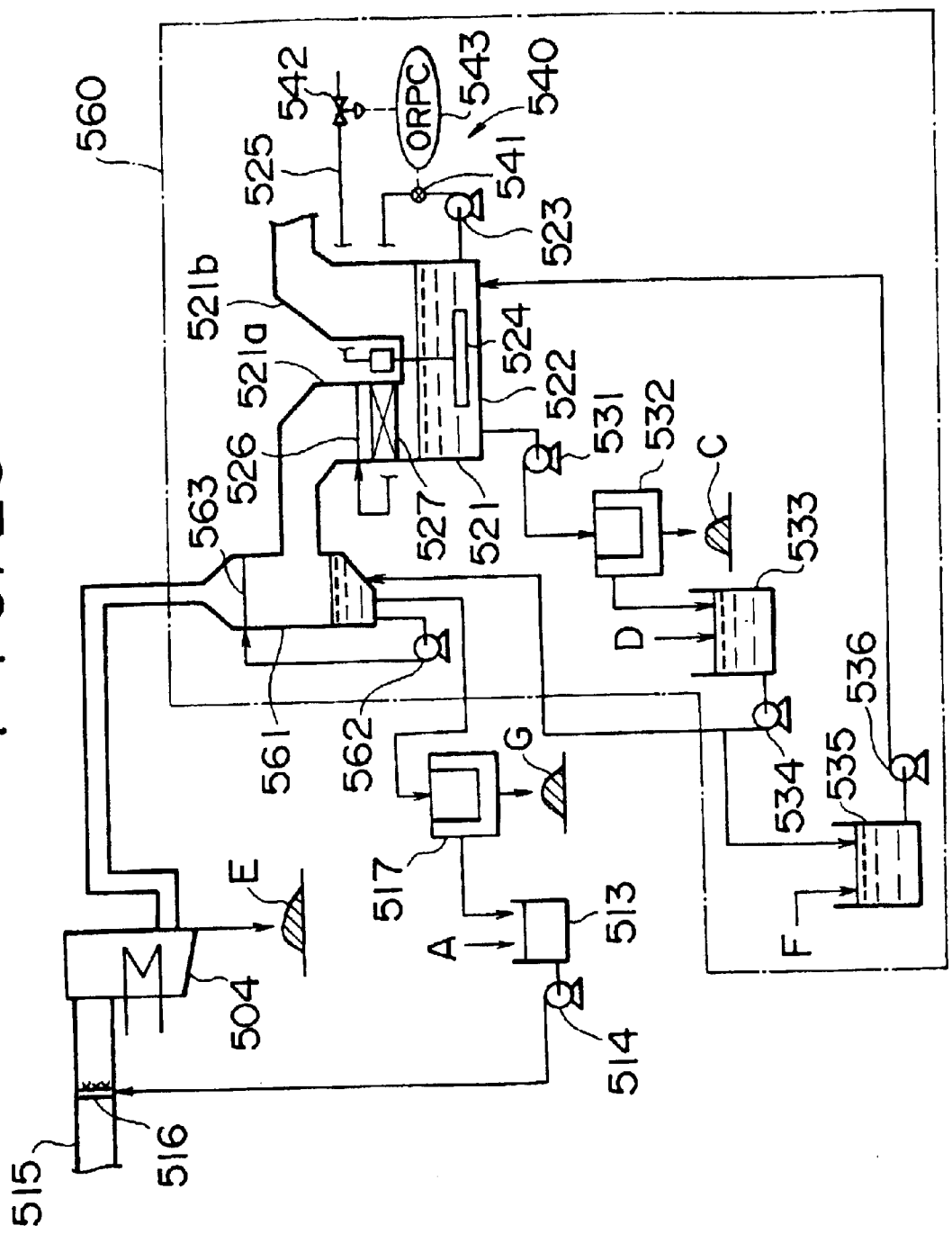
FIG. 23 is a schematic structural diagram showing a constitution of a combustion exhaust gas treatment system in embodiment 4 of the fifth invention.

Embodiment 4 of the fifth invention (3) is described below. FIG. 23 is a schematic structural diagram showing a constitution of a combustion exhaust gas treatment system of embodiment 4. In FIG. 23, same constituent elements as in embodiment 1 are identified with same reference numerals, and their explanations are omitted.

In the combustion exhaust gas treatment system of this embodiment, as shown in FIG. 23, a desulfurization apparatus 560 comprising a cooling and dust collecting column 561 for cooling the flue and collecting dust is disposed at the upstream side of an absorption column 521, and the combustion exhaust gas not deprived of dust is directly fed into the cooling and dust collecting column 561 of the desulfurization apparatus 560, and the dust slurry extracted from the cooling and dust collecting column 561 is separated into solid and liquid in the separating means 517, and the separated liquid discharged from the separating means 517 is led into the mixing means 513. The separating means 517 is, for example, composed of a centrifugal settling machine, and it discharges the dust slurry led into the dust in the cooling and dust collecting column 561 as cake of low water content (dust cake G).

In this case, most of Se in combustion exhaust gas is fed into the cooling and dust collecting column 561 as being contained in the dust, and at least tetravalent Se thereof reacts with the sprayed treating agent A in the combustion exhaust gas lead-in passage 515 to be insoluble, and it is separated in the solid phase side in the separating means 517, and is mixed in the dust cake G in insoluble state. If hexavalent Se is present, it is transformed into tetravalent Se in the cooling and dust collecting column 561 same as in embodiment 2, and is sequentially extracted as being contained in the discharge slurry, and is blended with the treating agent A and sprayed into the combustion exhaust gas lead-in passage 515, and is led into the desulfurization apparatus 520 again, and finally almost all Se is made insoluble as tetravalent Se, and is mixed in the dust cake G. Therefore, in this case, too, if the dust cake G is directly discarded, the Se elution standard is satisfied.

Moreover, the cooling and dust collecting column 561 also function as the electrostatic precipitator 505 in embodiment 2, and it is effective to reduce the cost of equipment as compared with the system of embodiment 2. Still more, in this embodiment, different from embodiment 3, much dust does not mix into the absorption column 521, and hence the equipment cost may be further decreased, while high desulfurization rate and high quality of gypsum C may be realized.

The fifth invention is not limited to the illustrated embodiments alone, but various modifications are possible. For example, if hexavalent Se does not exist and only other Se than hexavalent is present in the combustion exhaust gas in the desulfurization apparatus, the process or apparatus for reducing hexavalent Se into tetravalent Se is not needed.

The constitution of the desulfurization apparatus is not limited to the tank oxidation type shown in the embodiments, and, for example, an oxidation column in which the slurry extracted from the absorption column is fed may be separately installed, and by blowing air into this oxidation column, final oxidation-reduction reaction may be performed herein. In this case, too, hexavalent Se is transformed into tetravalent Se in the absorption column or oxidation column.

As the treating agent for making tetravalent Se insoluble, for example, aside from $FeCl_3$, $Fe_2(SO_4)_3$, chelating agent (e.g. Epolus MX-7 of Miyoshi Resin), or high molecular heavy metal capturing agent (e.g. Epofloc L-1 of Miyoshi Resin) may be used.

Effects of the Fifth Invention

According to the combustion exhaust gas treatment system of the fifth invention (1), at least the tetravalent Se in the combustion exhaust gas reacts with the treating agent sprayed into the combustion exhaust gas lead-in passage by the spraying means and becomes insoluble before it is removed by the dust collector. Accordingly, at least the content of other Se than tetravalent Se is less, if the dust after treatment is directly recycled or discarded, the Se elution standard is satisfied.

Incidentally, if Se or other impurities may be mixed slightly into the circulation liquid in the desulfurization apparatus without being removed by the dust collector, most of Se becomes tetravalent, and is contained in the circulation liquid together with other impurities by the function of the mixing means and spraying means, and extracted, blended with treating agent, and sprayed into the combustion exhaust gas lead-in passage. Accordingly, Se and impurities mixing into the circulation liquid of the desulfurization apparatus mix into the dust to be removed by the dust collector, and are sequentially discharged, thereby preventing excessive accumulation of these impurities into the circulation liquid in the desulfurization apparatus. Therefore, not requiring to install wastewater treating apparatus for the desulfurization apparatus, the system may be reduced in cost and size, while the desulfurization performance in the desulfurization apparatus and byproduct purity may be maintained high.

According to the combustion exhaust gas treatment system of the fifth invention (2), although most Se in the combustion exhaust gas is absorbed in the desulfurization apparatus, at least tetravalent Se thereof reacts with the treating agent sprayed into the flue lead-in passage to be insoluble, and is discharged as being mixed in the solid matter (gypsum, etc.) separated and formed from the slurry in the desulfurization apparatus. The hexavalent Se is transformed into tetravalent Se by reduction reaction in the desulfurization apparatus, and is contained in the circulation liquid in the desulfurization apparatus, and is sequentially extracted together with other impurities, and is sprayed into the combustion exhaust gas lead-in passage together with the treating agent, so that it is finally discharged as being mixed in the solid matter (gypsum, etc.) separated and formed in the desulfurization apparatus, and thereby Se and other impurities are not accumulated in the circulation liquid.

Therefore, by this system, too, the Se elution standard may be satisfied easily, and moreover the desulfurization performance of the desulfurization apparatus and byproduct purity can be maintained high without using wastewater treating apparatus.

According to the combustion exhaust gas treatment system of the fifth invention (3), although most Se in the combustion exhaust gas is absorbed in the cooling and dust collecting column of the desulfurization apparatus, at least tetravalent Se thereof reacts with the treating agent sprayed by the spraying means into the flue lead-in passage to be insoluble, and is discharged as being mixed in the solid matter (dust cake) separated and formed by the separating means for separating the dust slurry in the cooling and dust collecting column into solid and liquid. The hexavalent Se is mostly transformed into tetravalent Se by reduction reaction with the sulfurous acid absorbed in the liquid in the cooling and dust collecting column, and is contained in the filtrate in the separating means, and is sequentially extracted together with other impurities, and is sprayed into the combustion exhaust gas lead-in passage together with the treating agent, so that it is finally discharged as being mixed in the solid matter separated and formed by the separating means, and thereby Se and other impurities are not accumulated in the circulation liquid.

Therefore, by this system, too, the Se elution standard may be satisfied easily, and moreover the desulfurization performance of the desulfurization apparatus and byproduct purity can be maintained high without using wastewater treating apparatus. Moreover, in this system, since almost no impurity such as dust mixes into the slurry in the absorption column in the desulfurization apparatus, the desulfurization rate in the desulfurization apparatus, gypsum purity and other performances may be maintained high.

According to the combustion exhaust gas treatment system of the fifth invention (4), if hexavalent Se is present, this hexavalent Se may be almost completely transformed into tetravalent Se in the desulfurization apparatus, and hence the Se in the combustion exhaust gas may be treated more easily and perfectly.

What is claimed is:

1. A combustion exhaust gas treatment system for treating combustion exhaust gas containing sulfurous acid, dust and Se components, comprising a dry dust collector for removing dust in the combustion exhaust gas, a desulfurization apparatus having a desulfurization column for circulating an absorbent slurry for absorbing and removing sulfurous acid, repulping means for dissolving the dust removed by the dry dust collector in water to form slurry, treating agent feeding means for feeding a treating agent into the dust slurry obtained in the repulping means, for transforming tetravalent Se into an insoluble, means for separating the dust slurry into solid and liquid, and a piping system for introducing the liquid portion from the separating means into the absorbent slurry.

2. A combustion exhaust gas treatment system of claim 1, wherein a part of the circulating liquid in a form of the slurry in the desulfurization system is introduced into the repulping means, and is used as solvent in the repulping means.

3. A combustion exhaust gas treatment system of claim 1 or 2, further comprising means far feeding filter additive agent into the dust slurry.

* * * * *

UNITED STATES PATENT AND TRADEMARK OFFICE
CERTIFICATE OF CORRECTION

PATENT NO. : 6,740,297 B2
DATED : May 25, 2004
INVENTOR(S) : Taku Shimizu et al.

It is certified that error appears in the above-identified patent and that said Letters Patent is hereby corrected as shown below:

Column 56,
Line 52, "far" should be -- for --.

Signed and Sealed this

Seventh Day of December, 2004

JON W. DUDAS
*Director of the United States Patent and Trademark Office*